United States Patent
Dellinger et al.

(10) Patent No.: US 9,471,200 B2
(45) Date of Patent: Oct. 18, 2016

(54) DEVICE, METHOD, AND GRAPHICAL USER INTERFACE FOR ORGANIZING AND PRESENTING A COLLECTION OF MEDIA ITEMS

(71) Applicant: Apple Inc., Cupertino, CA (US)

(72) Inventors: Richard R. Dellinger, San Jose, CA (US); Gregory Christie, San Jose, CA (US); Justin S. Titi, Morgan Hill, CA (US)

(73) Assignee: APPLE INC., Cupertino, CA (US)

( * ) Notice: Subject to any disclaimer, the term of this patent is extended or adjusted under 35 U.S.C. 154(b) by 174 days.

(21) Appl. No.: 14/183,405

(22) Filed: Feb. 18, 2014

(65) Prior Publication Data

US 2014/0282011 A1    Sep. 18, 2014

Related U.S. Application Data

(60) Provisional application No. 61/801,448, filed on Mar. 15, 2013.

(51) Int. Cl.
  *G06F 3/048*  (2013.01)
  *G06F 3/0482*  (2013.01)
  *G06F 17/30*  (2006.01)

(52) U.S. Cl.
  CPC ....... *G06F 3/0482* (2013.01); *G06F 17/30256* (2013.01)

(58) Field of Classification Search
  CPC .................................................. G06F 3/04817
  USPC ................................................ 715/730, 731
  See application file for complete search history.

(56) References Cited

U.S. PATENT DOCUMENTS

| | | | |
|---|---|---|---|
| 6,950,989 B2 * | 9/2005 | Rosenzweig | G06F 3/0481 707/E17.026 |
| 7,779,358 B1 * | 8/2010 | Gupta | G06F 17/30274 715/730 |
| 7,970,240 B1 * | 6/2011 | Chao | G06F 17/30274 382/305 |
| 2008/0052945 A1 | 3/2008 | Matas et al. | |
| 2009/0178008 A1 | 7/2009 | Herz et al. | |

(Continued)

OTHER PUBLICATIONS

Forhad, "Camera ICS: Control Existent Camera App for Android," http://thetechjournal.com/electronics/android/camera-ics-control-existent-camera-app-for-android.xhtml, 5 pages.

(Continued)

*Primary Examiner* — Matthew Ell
(74) *Attorney, Agent, or Firm* — Morgan, Lewis & Bockius LLP

(57) ABSTRACT

An electronic device with a display and, optionally, a touch-sensitive surface obtains a collection of media items. In some embodiments, the device determines one or more patterns in the collection based on a comparison between properties of sequentially adjacent items and divides the collection into multiple events that includes a plurality of multi-item events. In some embodiments, the device receives a first request to display a first portion of the collection organized in accordance with a first detailed-granularity level and, in response to the first request, displaying a first plurality of representations of the items. The device receives a second request to display a second portion of the collection organized in accordance with a respective overview-granularity level that corresponds to multiple detailed-granularity levels and, in response to the second request, displays a second plurality of representations of the items.

30 Claims, 36 Drawing Sheets

(56) References Cited

U.S. PATENT DOCUMENTS

2011/0074824 A1 3/2011 Srinivasan et al.
2011/0319138 A1 12/2011 Noh

OTHER PUBLICATIONS

Samsung, "GT-19300 User Manual," http://downloadcenter.samsung.com/content/UM/201302/20130228184012484/GT-19300_UM_EU_Jellybean_Eng_Rev.1.1_130288_screen.pdf, Feb. 28, 2013, 18 pages.
Windows Phone Central, "Sketch Camera, Windows Phone App Review," https://www.youtube.com/watch?v=KC3CMUwof9U, Mar. 7, 2012, 1 page.
International Search Report, dated Sep. 4, 2014, received in International Patent Application No. PCT/US2014,040413, which corresponds with U.S. Appl. No. 14/290,922, 4 pages.
International Search Report and Written Opinion received for PCT Patent Application No. PCT/US2014/018908, mailed on Jun. 25, 2014, 17 pages.
Graham et al., "Time as Essence for Photo Browsing Through Personal Digital Libraries", JCDL, Jul. 13-17, 2002, 10 pages.
Mulhem et al., "Home Photo Retrieval: Time matters", Lecture Notes in Computer Science/Computational Science, Jul. 24, 2003, 10 pages.
Platt et al., "PhotoTOC: Automatic Clustering for Browsing Personal Photographs", Proceedings of the 2003 Joint Conference of the Fourth International Conference on Information, Communications and Signal Processing, 2003 and Fourth Pacific Rim Conference on Multimedia, Dec. 2003, 5 pages.
Radhakrishnan et al., "A Time Series Clustering based Framework for Multimedia Mining and Summarization", Proceedings of the 6th ACM SIGMM International Workshop on Multimedia Information Retrieval, Oct. 15-16, 2004, pp. 157-164.
Reuter et al., "Event-based Classification of Social Media Streams", Proceedings of the 2nd ACM International Conference on Multimedia Retrieval, Jun. 5-8, 2012, 8 pages.
Sharara et al., "Finding Prominent Actors in Dynamic Affiliation Networks", ASE, 2012, 14 pages.

* cited by examiner

DEVICE, METHOD, AND GRAPHICAL USER INTERFACE FOR ORGANIZING AND PRESENTING A COLLECTION OF MEDIA ITEMS

RELATED APPLICATIONS

This application claims priority to U.S. Provisional Patent Application No. 61/801,448 filed Mar. 15, 2013, which application is incorporated by reference herein in its entirety.

TECHNICAL FIELD

This relates generally to electronic devices with touch-sensitive surfaces, including but not limited to electronic devices with touch-sensitive surfaces that organize a collection of media items.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more images or viewing images that are associated with an album of images. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But methods for performing these manipulations are cumbersome and inefficient. For example, using a sequence of mouse based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for organizing and presenting a collection of media items. Such methods and interfaces optionally complement or replace conventional methods for organizing and presenting a collection of media items. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at an electronic device with a display, one or more processors and memory. The method includes: obtaining a collection of media items, where the media items are ordered in a chronological order in accordance with a time indicator associated with each of the media items; and determining one or more patterns in the collection of media items based at least in part on a comparison between properties of sequentially adjacent media items in the collection of media items. The method further includes dividing the collection of media items into multiple events that includes a plurality of multi-item events, where: each multi-item event includes a plurality of the media items with time indicators within a corresponding event time range; and the event time range for a multi-item event is selected in accordance with the one or more patterns determined in the collection of media items.

In accordance with some embodiments, an electronic device includes a display unit configured to display a graphic user interface; and a processing unit coupled to the display unit. The processing unit is configured to obtain a collection of media items, where the media items are ordered in a chronological order in accordance with a time indicator associated with each of the media items. The processing unit is further configured to: determine one or more patterns in the collection of media items based at least in part on a comparison between properties of sequentially adjacent media items in the collection of media items; and divide the collection of media items into multiple events that includes a plurality of multi-item events, where: each multi-item event includes a plurality of the media items with time indicators within a corresponding event time range; and the event time range for a multi-item event is selected in accordance with the one or more patterns determined in the collection of media items.

In accordance with some embodiments, a method is performed at an electronic device with a display, a touch-sensitive surface, one or more processors and memory. The method includes obtaining a collection of media items, where the media items are organized into a hierarchy of granularity levels that includes one or more detailed-granularity levels within one or more overview-granularity levels.

The method further includes: receiving a first request to display a first portion of the collection organized in accordance with a first detailed-granularity level; and in response to the first request, displaying a first plurality of representations of the media items, where: the first plurality of representations are displayed at a detailed-granularity size; and the first plurality of representations are spaced apart from each other by a detailed-granularity distance. The method further includes: receiving a second request to display a second portion of the collection organized in accordance with a respective overview-granularity level that corresponds to multiple detailed-granularity levels; and in response to the second request, displaying a second plurality of representations of the media items, where: the second plurality of representations are displayed at a overview-granularity size, smaller than the detailed-granularity size; and the second plurality of representations are spaced apart from each other by a overview-granularity distance, smaller than the detailed-granularity distance.

In accordance with some embodiments, an electronic device includes a display unit configured to display a graphic user interface, a touch-sensitive surface unit configured to receive contacts; and a processing unit coupled to the display unit and the touch-sensitive surface unit. The processing unit is configured to obtain a collection of media items, where the media items are organized into a hierarchy of granularity levels that includes one or more detailed-granularity levels within one or more overview-granularity levels. The processing unit is further configured to: receive a first request to display on the display unit a first portion of the collection organized in accordance with a first detailed-granularity level; and in response to the first request, enable display of a first plurality of representations of the media items, where: the first plurality of representations are displayed at a detailed-granularity size; and the first plurality of representations are spaced apart from each other by a detailed-granularity distance. The processing unit is further configured to: receive a second request to display on the display unit a second portion of the collection organized in accordance with a respective overview-granularity level that corresponds to multiple detailed-granularity levels; and in response to the second request, enable display of a second plurality of representations of the media items, where: the second plurality for representations are displayed at a overview-granularity size, smaller than the detailed-granularity size; and the second plurality of representations are spaced apart from each other by a overview-granularity distance, smaller than the detailed-granularity distance.

In accordance with some embodiments, an electronic device includes a display, optionally a touch-sensitive surface, one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device with a display, optionally a touch-sensitive surface, a memory, and one or more processors to execute one or more programs stored in the memory includes one or more of the elements displayed in any of the methods described above, which are updated in response to inputs, as described in any of the methods described above. In accordance with some embodiments, a computer readable storage medium has stored therein instructions which when executed by an electronic device with a display, optionally a touch-sensitive surface, cause the device to perform the operations of any of the methods referred described above. In accordance with some embodiments, an electronic device includes: a display, optionally a touch-sensitive surface; and means for performing the operations of any of the methods described above. In accordance with some embodiments, an information processing apparatus, for use in an electronic device with a display and optionally a touch-sensitive surface, includes means for performing the operations of any of the methods described above.

Thus, electronic devices with displays and touch-sensitive surfaces are provided with faster, more efficient methods and interfaces for organizing and presenting a collection of media items, thereby increasing the effectiveness, efficiency, and user satisfaction with such devices. Such methods and interfaces may complement or replace conventional methods for organizing and presenting a collection of media items.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
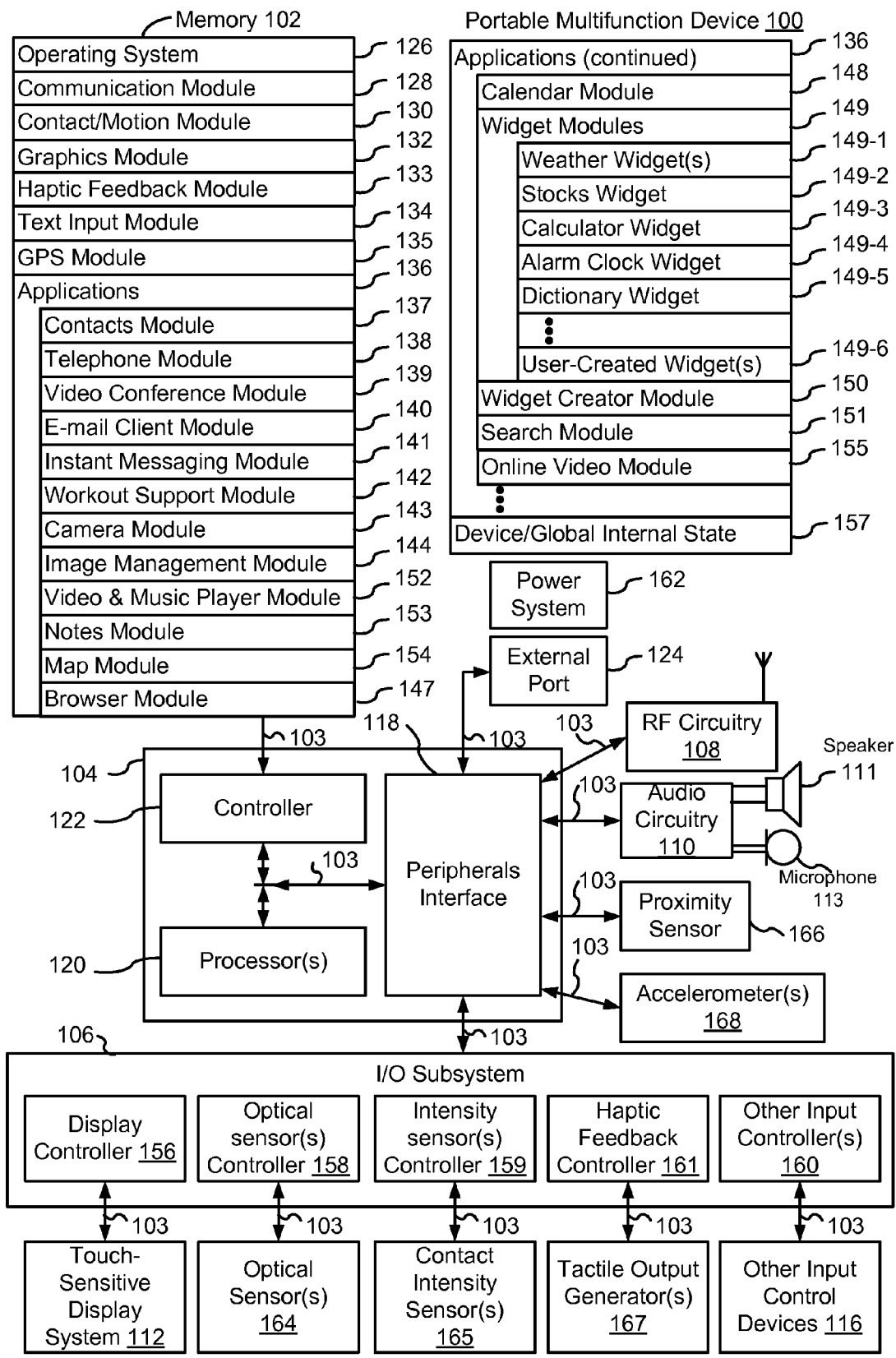
FIG. 1A is a block diagram illustrating a portable multifunction device with a touch-sensitive display in accordance with some embodiments.

Many electronic devices have graphical user interfaces that organize a plurality of images. For example, the plurality of images is organized according to the capture dates of the respective images. The device described below improves on these methods by obtaining a collection of media items ordered in a chronological order in accordance with a time indicator associated with each of the media items. The device determines one or more patterns in the collection of media items based at least in part on a comparison between properties (e.g., metadata including time, date, location, altitude, speed, network connections, weather, biometrics, facial recognition, etc.) of sequentially adjacent media items in the collection of media items and divides the collection of media items into multiple events that includes a plurality of multi-item events.

In some embodiments, the device obtains a collection of media items organized into a hierarchy of granularity levels that includes one or more detailed-granularity levels within one or more overview-granularity levels. The device receives a receiving a first request to display a first portion of the collection organized in accordance with a first detailed-granularity level and displays a first plurality of representations of the media items in response to the first request. The device also receives a second request to display a second portion of the collection organized in accordance with a respective overview-granularity level that corresponds to multiple detailed-granularity levels and displays a second plurality of representations of the media items in response to the second request.

Below, FIGS. 1A-1B, 2, and 3 provide a description of exemplary devices. FIGS. 4A-4B and 5A-5S illustrate exemplary user interfaces for organizing and presenting a collection of media items. FIGS. 6A-6E are flow diagrams illustrating a method of dividing a collection of media items into a plurality of multi-item events. FIGS. 7A-7D are flow diagrams illustrating a method of organizing a collection of media items into a hierarchy of granularity levels. The user interfaces in FIGS. 5A-5S are used to illustrate the processes in FIGS. 6A-6E and 7A-7D.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
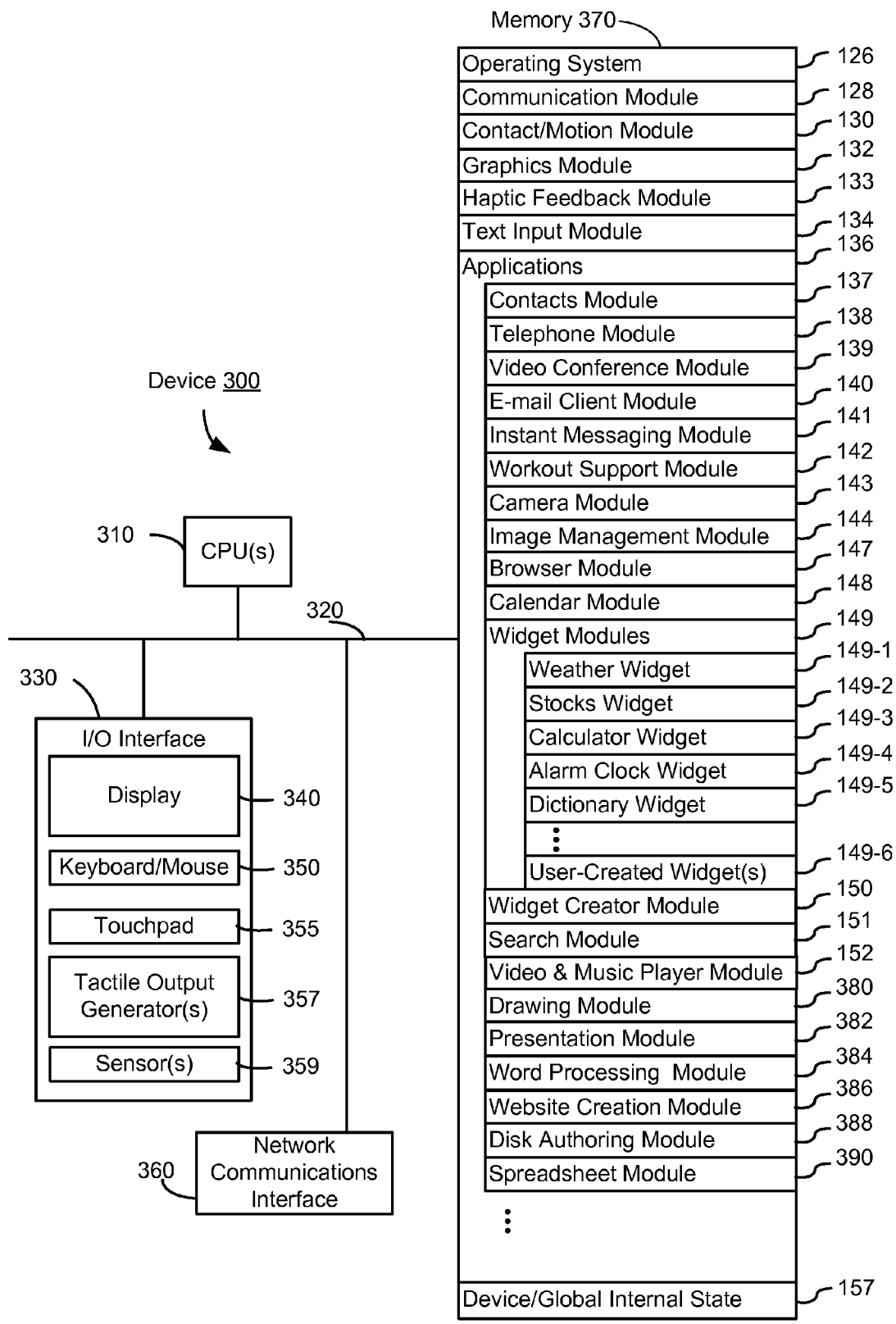
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
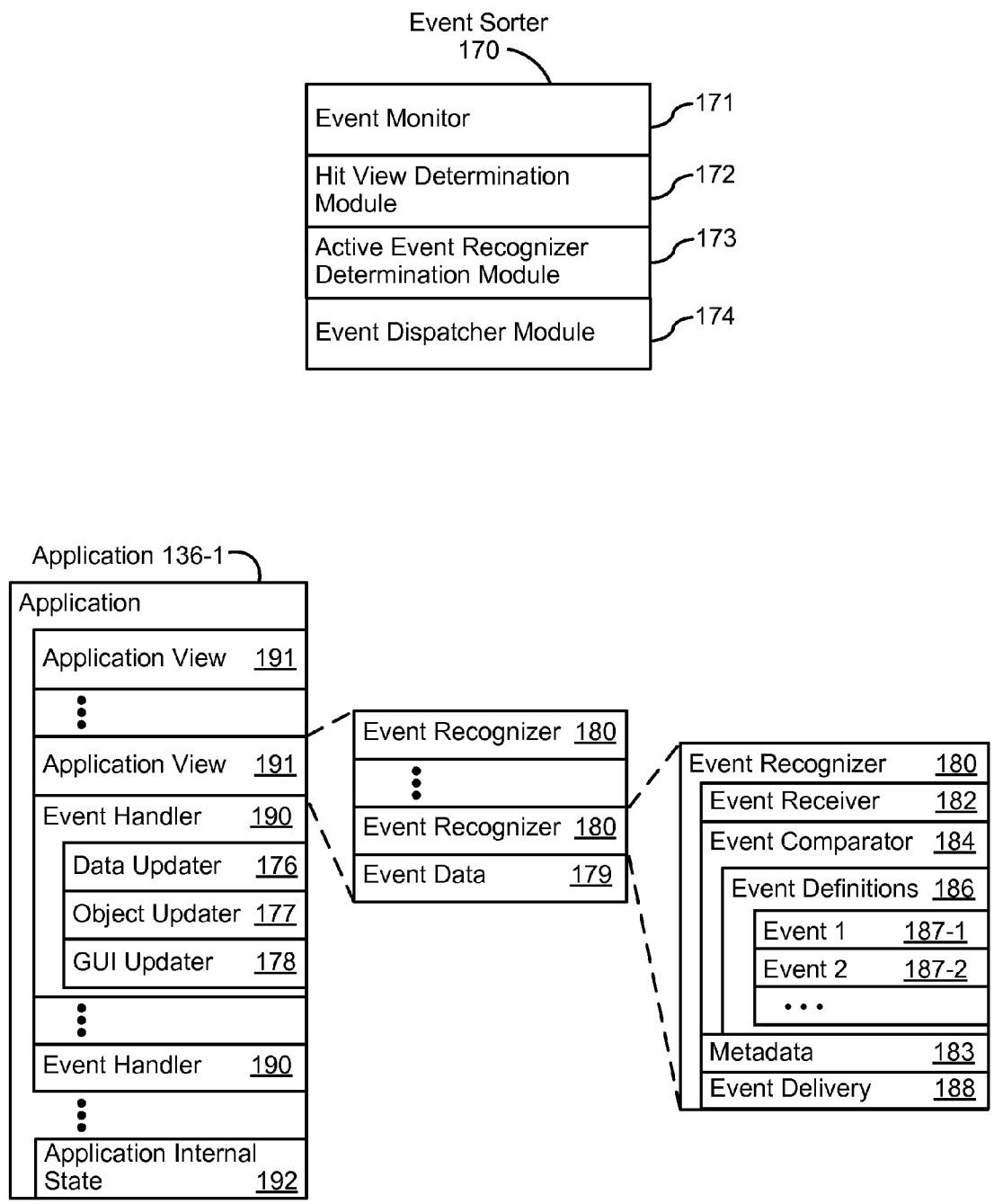
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predefined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
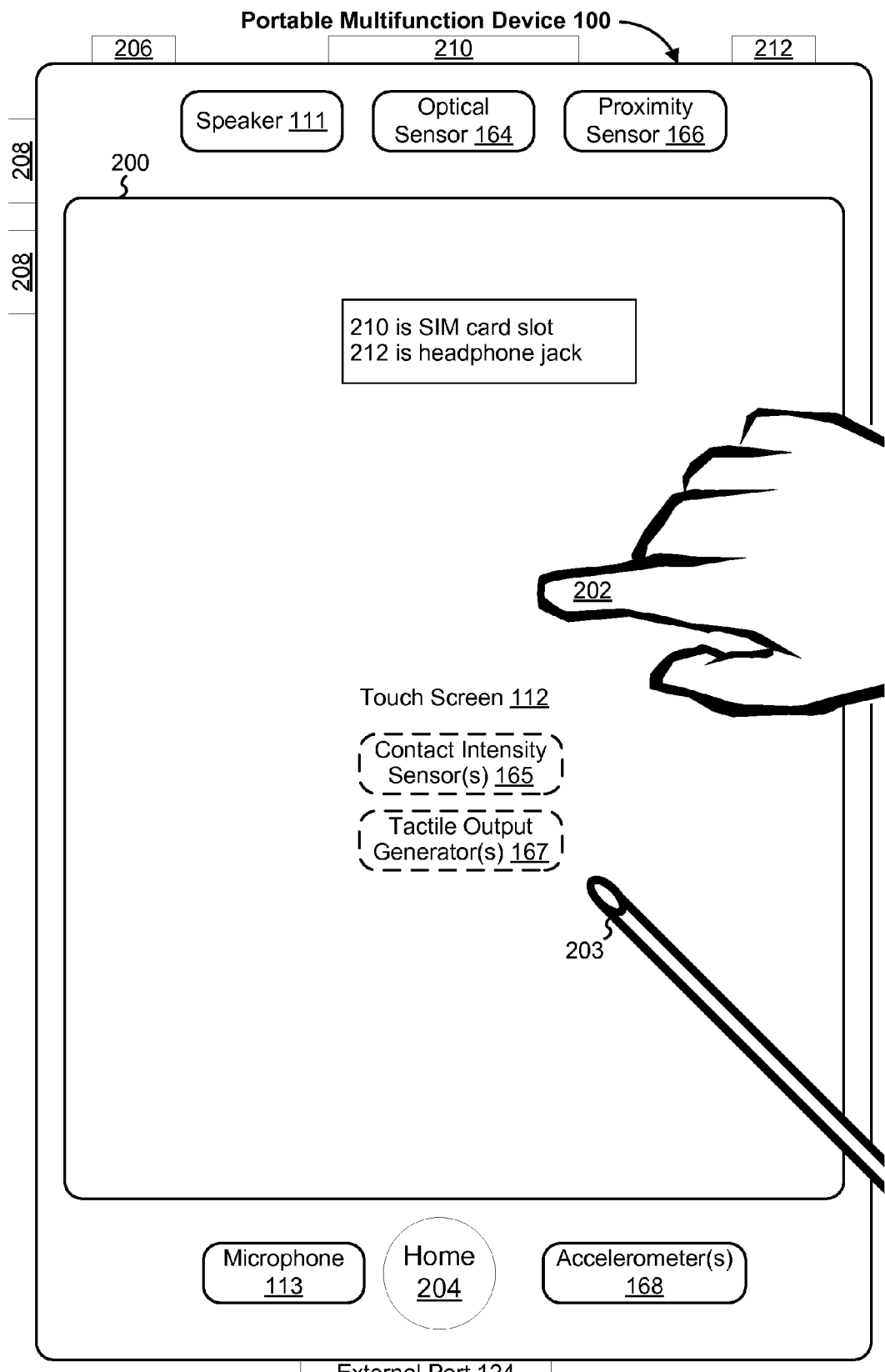
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
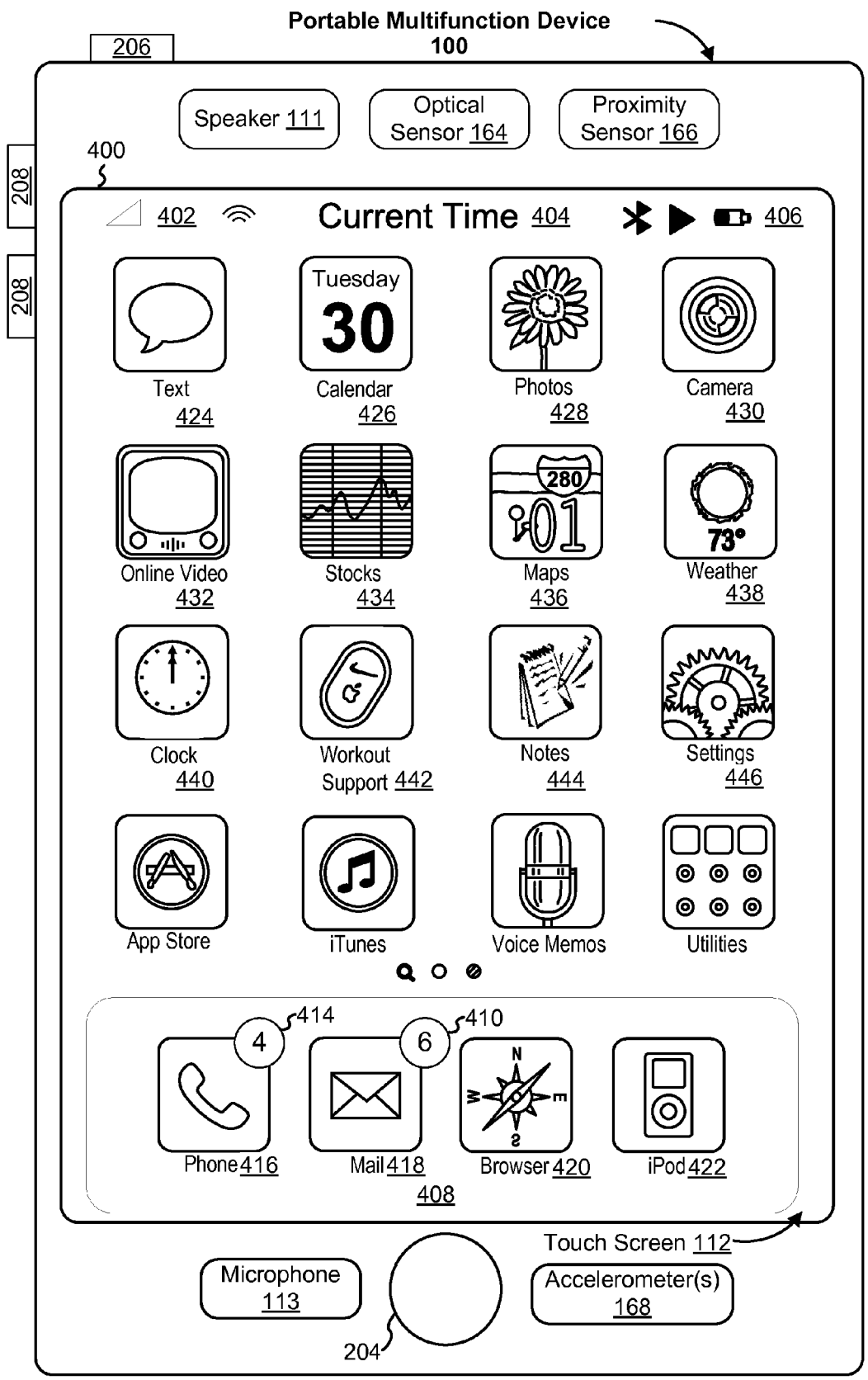
FIG. 4A illustrates an exemplary user interface for a menu of applications on a portable multifunction device in accordance with some embodiments.
Figure 5A:
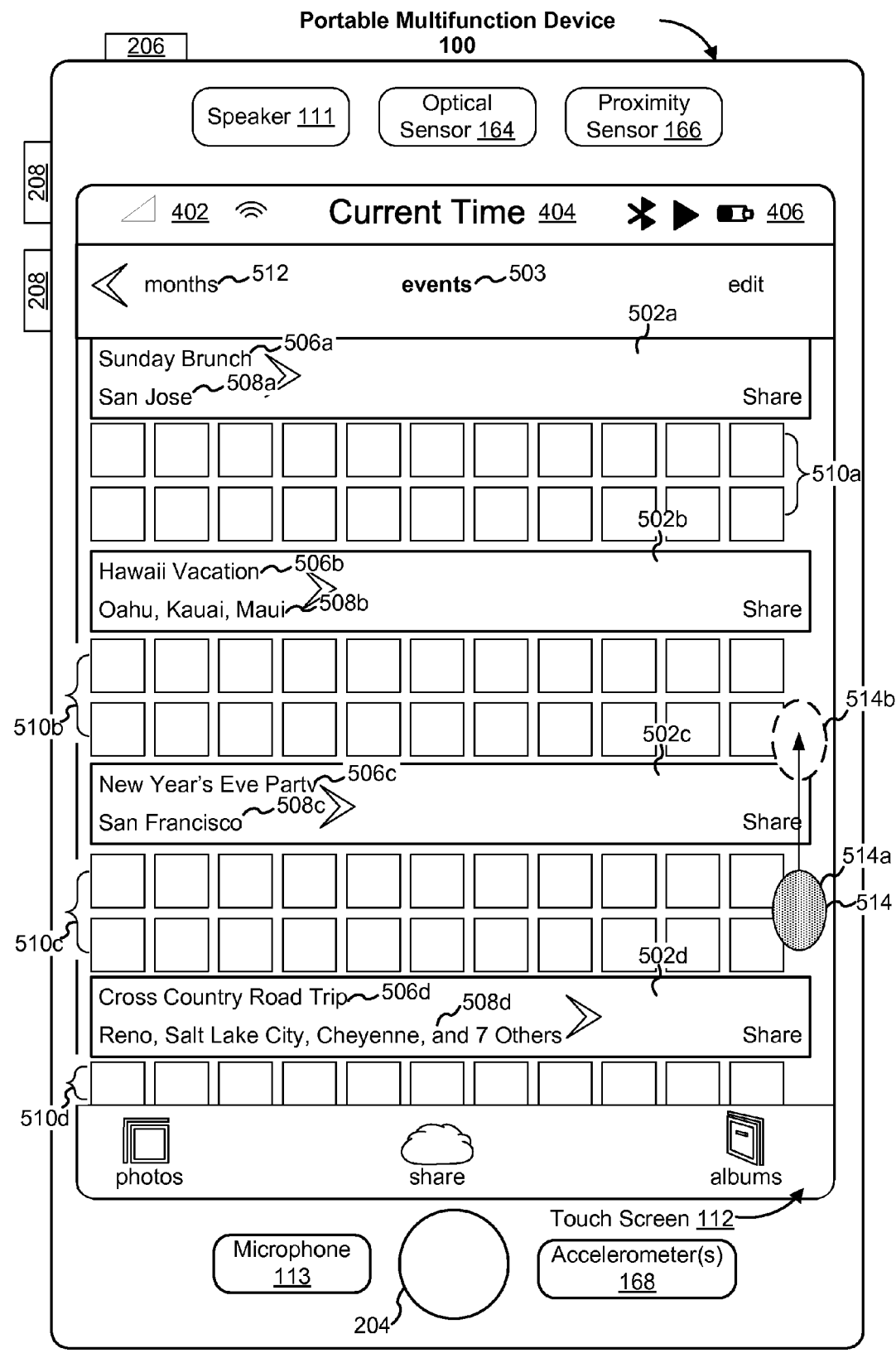
FIGS. 5A-5S illustrate exemplary user interfaces for organizing and presenting a collection of media items in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
   Icon 416 for telephone module 138, labeled "Phone," which optionally includes an indicator 414 of the number of missed calls or voicemail messages;
   Icon 418 for e-mail client module 140, labeled "Mail," which optionally includes an indicator 410 of the number of unread e-mails;
   Icon 420 for browser module 147, labeled "Browser;" and
   Icon 422 for video and music player module 152, also referred to as iPod (trademark of Apple Inc.) module 152, labeled "iPod;" and
Icons for other applications, such as:
   Icon 424 for IM module 141, labeled "Text;"
   Icon 426 for calendar module 148, labeled "Calendar;"
   Icon 428 for image management module 144, labeled "Photos;"
   Icon 430 for camera module 143, labeled "Camera;"
   Icon 432 for online video module 155, labeled "Online Video"
   Icon 434 for stocks widget 149-2, labeled "Stocks;"
   Icon 436 for map module 154, labeled "Map;"
   Icon 438 for weather widget 149-1, labeled "Weather;"
   Icon 440 for alarm clock widget 149-4, labeled "Clock;"
   Icon 442 for workout support module 142, labeled "Workout Support;"
   Icon 444 for notes module 153, labeled "Notes;" and
   Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
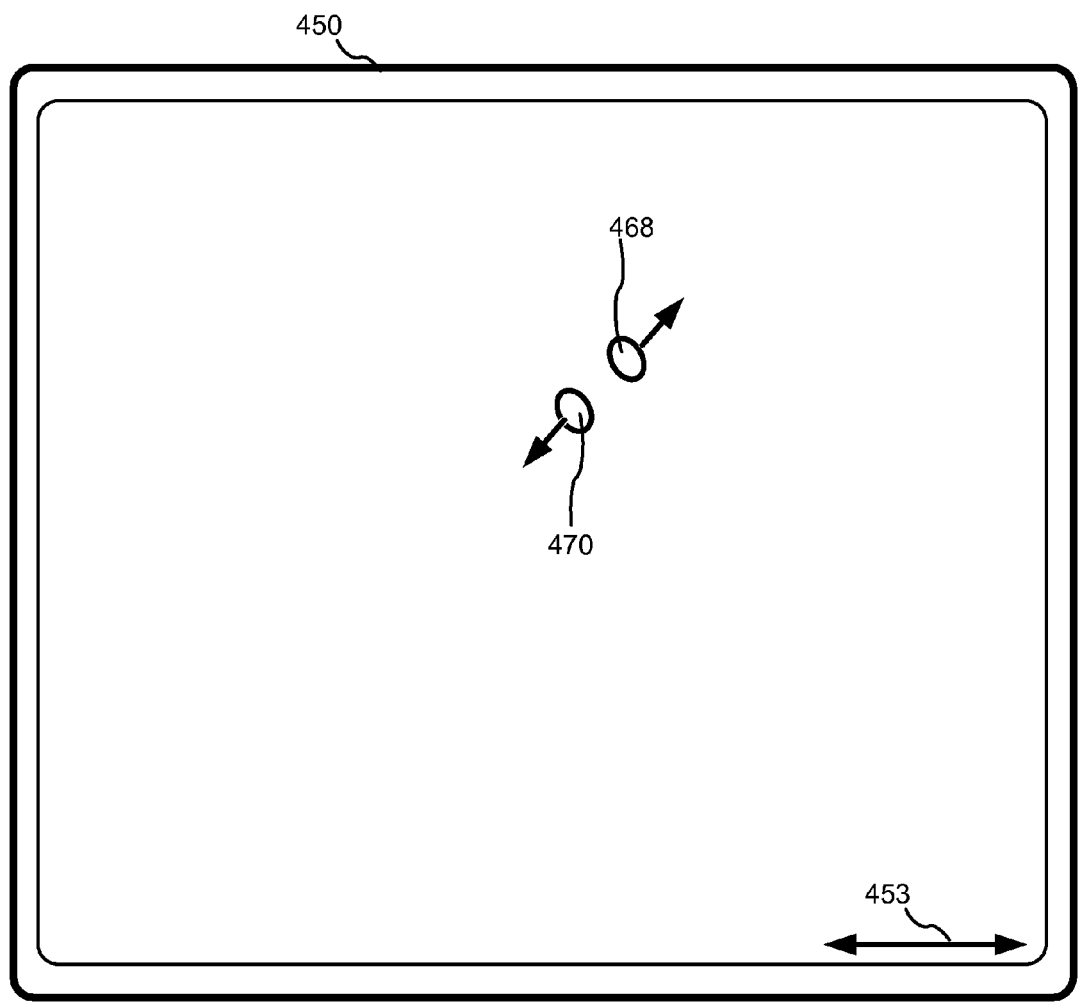
FIG. 4B illustrates an exemplary user interface for a multifunction device with a touch-sensitive surface that is separate from the display in accordance with some embodiments.
Figure 4B:
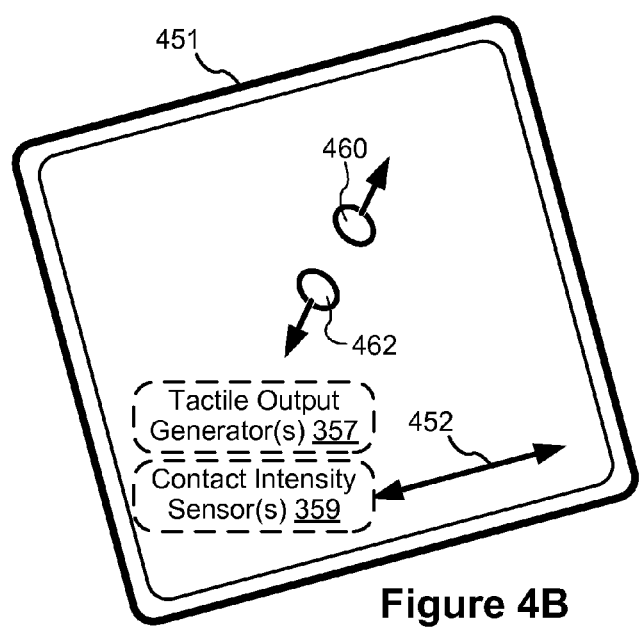

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5S illustrate exemplary user interfaces for organizing and presenting a collection of media items in accordance with some embodiments. The user interfaces in these figures are used to illustrate the processes described below, including the processes in FIGS. 6A-6E and 7A-7D.

FIG. 5A illustrates portable multifunction device 100 displaying a plurality of media items obtained from a collection of media items. FIG. 5A illustrates a plurality of selectable multi-item events 502a, 502b, 502c, 502d within an events view 503. In some embodiments, the device automatically divides the collection of media items into multi-item events by determining one or more patterns in the collection of media items and identifying transitions points in the collection of the media items, where a transition point corresponds to a change in a pattern of the collection of media items. In some embodiments, the transition point is based on a change in metadata (e.g., time, date, location, altitude, speed, network connections, weather, biometrics, facial recognition, etc.) between sequentially adjacent media items. FIG. 5A further illustrates a months affordance 512 which enables the device to display a months view 513 (described in more detail below with reference to FIG. 5H) in response to a tap gesture on the affordance 512.

In FIG. 5A, each of the plurality of events includes an associated event title 506 (e.g., Sunday Brunch 506a, Hawaii Vacation 506b, New Year's Eve Party 506c, and Cross Country Road Trip 506d), event location(s) 508 (e.g., San Jose 508a and Oahu, Kauai, Maui 508b), and one or more representations of media items 510 (e.g., 510a, 510b, 510c, 510d) within the respective event. In some embodiments, the device is configured to automatically populate an event title and event location for a respective event in accordance with metadata associated with media items within the respective event. FIG. 5A illustrates displaying the one or more representations of media items within the events at a detailed-granularity level. In some embodiments, a respective representation of a media item includes a thumbnail associated with a photo or a still or a gif image associated with a video. In some embodiments, the event locations are truncated (e.g., event locations 508d), whereby less than all of the event locations associated with the event are displayed. For example, frequently visited event locations are truncated from the event location field 508 in favor of unique or less frequented event locations. FIG. 5A further illustrates detection of a swipe or drag gesture on touch screen 112, including movement of contact 514 from position 514a to position 514b.

Figure 5B:
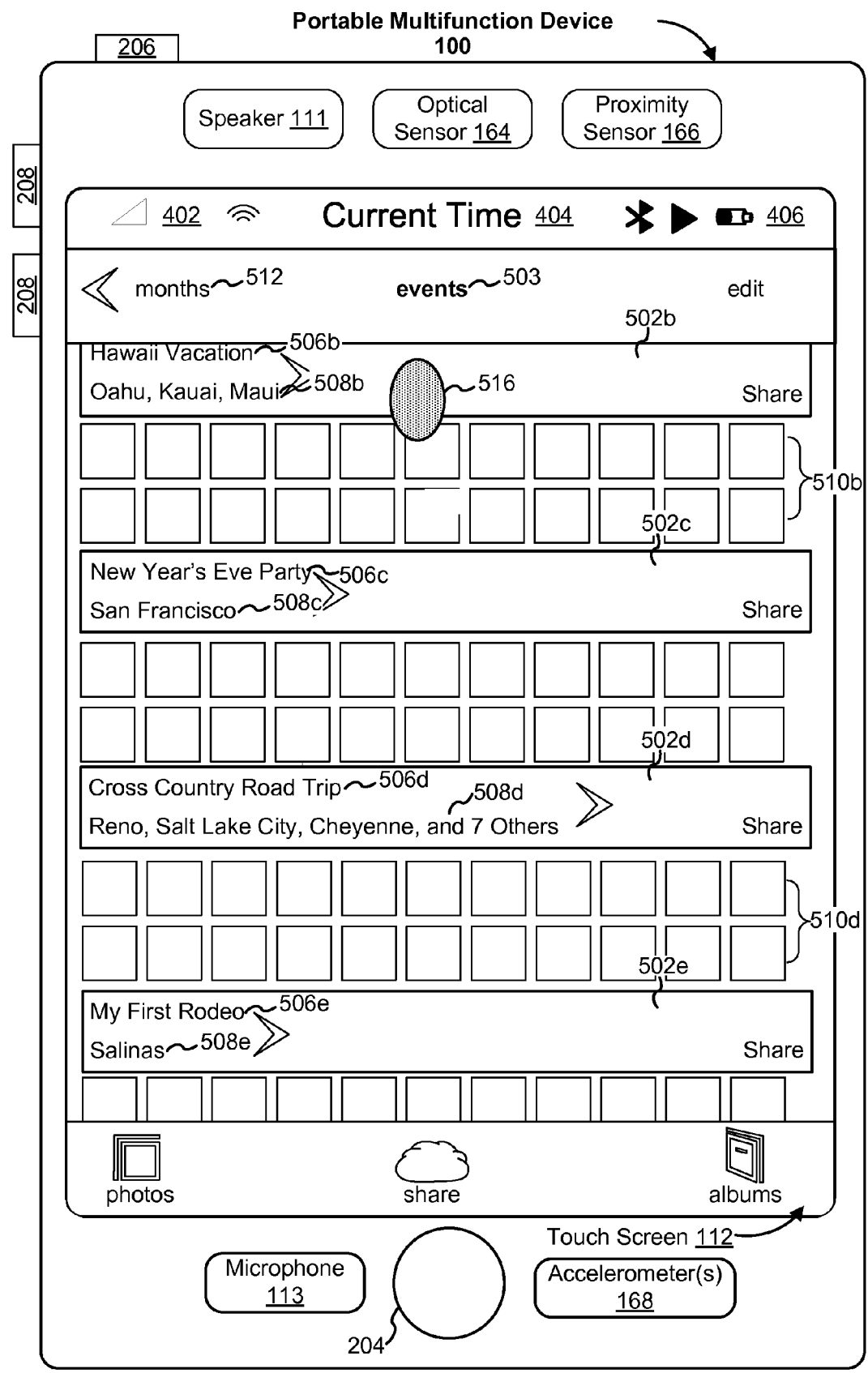

FIG. 5B illustrates scrolling the event view 503 upward in response to detecting the drag gesture with contact 514 in FIG. 5A (e.g., by an amount corresponding to the speed and/or amount of movement of contact 514). In FIG. 5B, Event 502e (e.g., related to My First Rodeo in Salinas) is displayed and event 502a is no longer displayed. FIG. 5B further illustrates detecting a tap gesture with contact 516 over a respective representation in the one or more representations of media items 510b related to event 502b on touch screen 112.

Figure 5C:
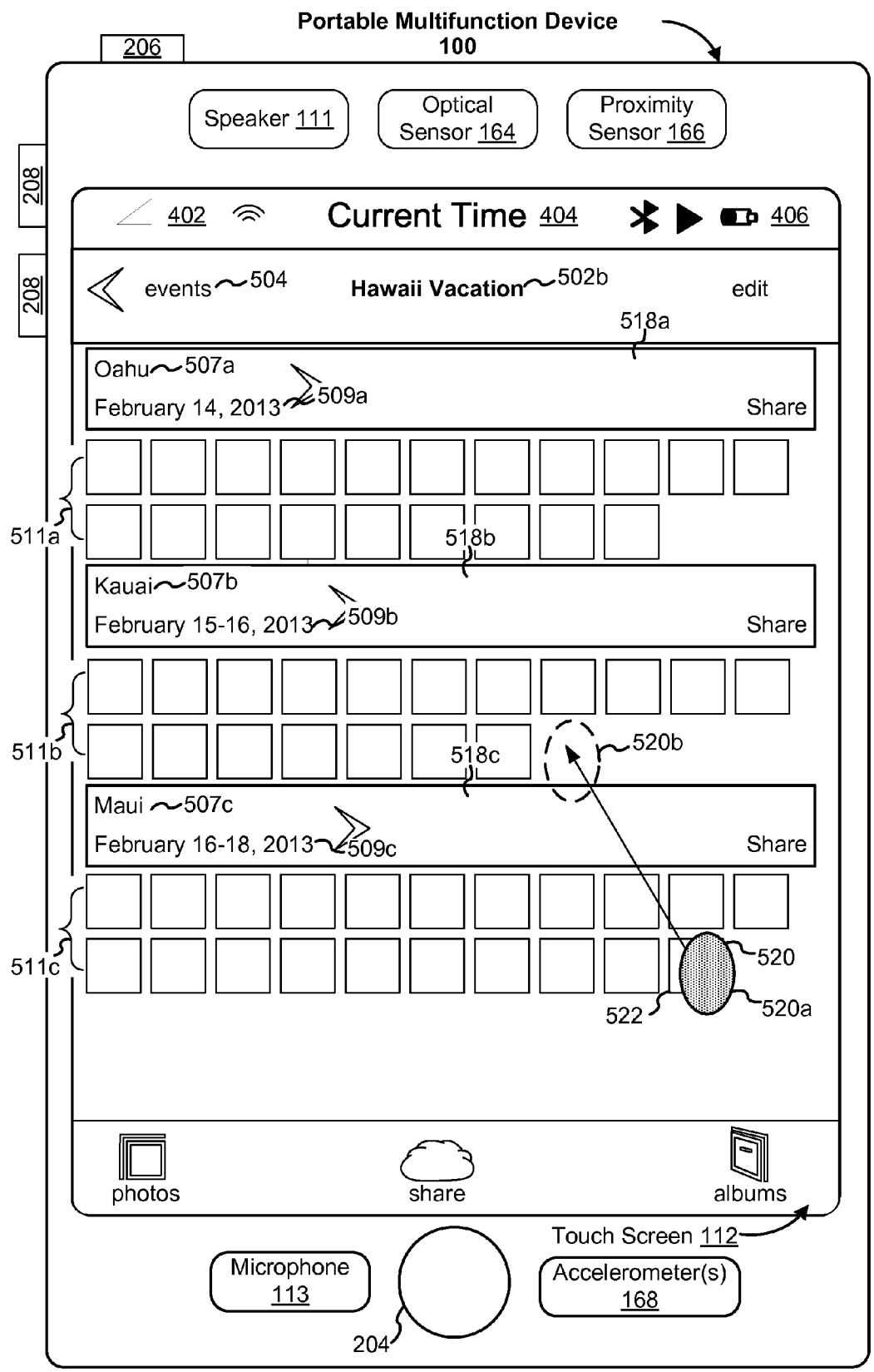

FIG. 5C illustrates displaying event 502b entitled Hawaii Vacation in response to detecting the tap gesture including contact 516 in FIG. 5B. In some embodiments, a tap gesture on a representation of a media item causes the device to display an enlarged representation of the media item, while a tap gesture at a location corresponding to a header of an event (e.g., the white space above the representations 510b) causes a representation of the event (or one or more sub-events) to be displayed. FIG. 5C illustrates a plurality of sub-events 518a, 518b, 518c within event 502b. In some embodiments, the device automatically divides items within an event into sub-events based on metadata associated with the media items in the event. The sub-events correspond to media items captured at different locations (e.g., Oahu 507a, Kauai 507b and Maui 507c) and on different dates (e.g., 509a, 509b, 509c) within the Hawaii Vacation meta-event. FIG. 5C further illustrates detection of contact 520 over respective representation 522 on touch screen 112. In FIG. 5C, the device detects a dragging gesture that includes movement of contact 520 from location 520a to location 520b. In response to detecting the movement of contact 520, the device moves respective representation 522 within the one or more representations of media items 511c associated with sub-event 518c to one or more representations of media items 511b associated with sub-event 518b. FIG. 5C illustrates displaying one or more representations of media items (e.g., 511a, 511b, 511c) within the sub-events at a detailed-granularity level.

Figure 5D:
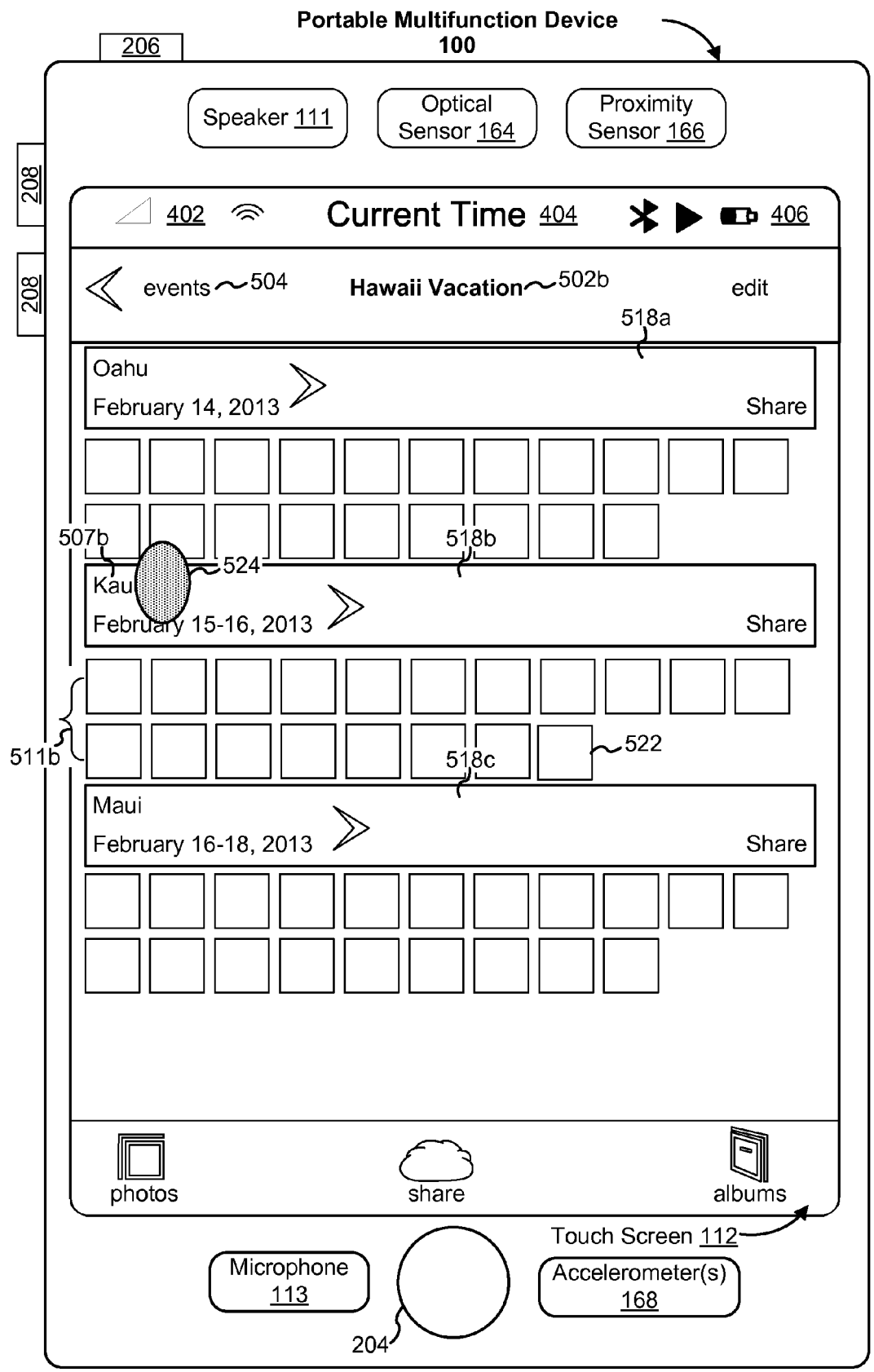

FIG. 5D illustrates respective representation 522 within the one or more representations of media items 511b associated with sub-event 518b in response to detecting the dragging gesture with contact 520 in FIG. 5C. FIG. 5D further illustrates detecting a press and hold gesture with contact 524 over event title 507b (e.g., Kauai) within sub-event 518b on touch screen 112. In some embodiments, in a response to a tap gesture (e.g., a contact detected for less than a predefined time threshold such as 0.05, 0.1, 0.2, 0.5 or 1.0 seconds or some other reasonable amount of time), the device displays an expanded representation of the sub-event, and in response to detecting a press and hold gesture (e.g., a contact detected for more than a predefined time threshold such as 0.05, 0.1, 0.2, 0.5 or 1.0 seconds or some other reasonable amount of time), the device displays a user interface for editing the title of the sub-event.

Figure 5E:
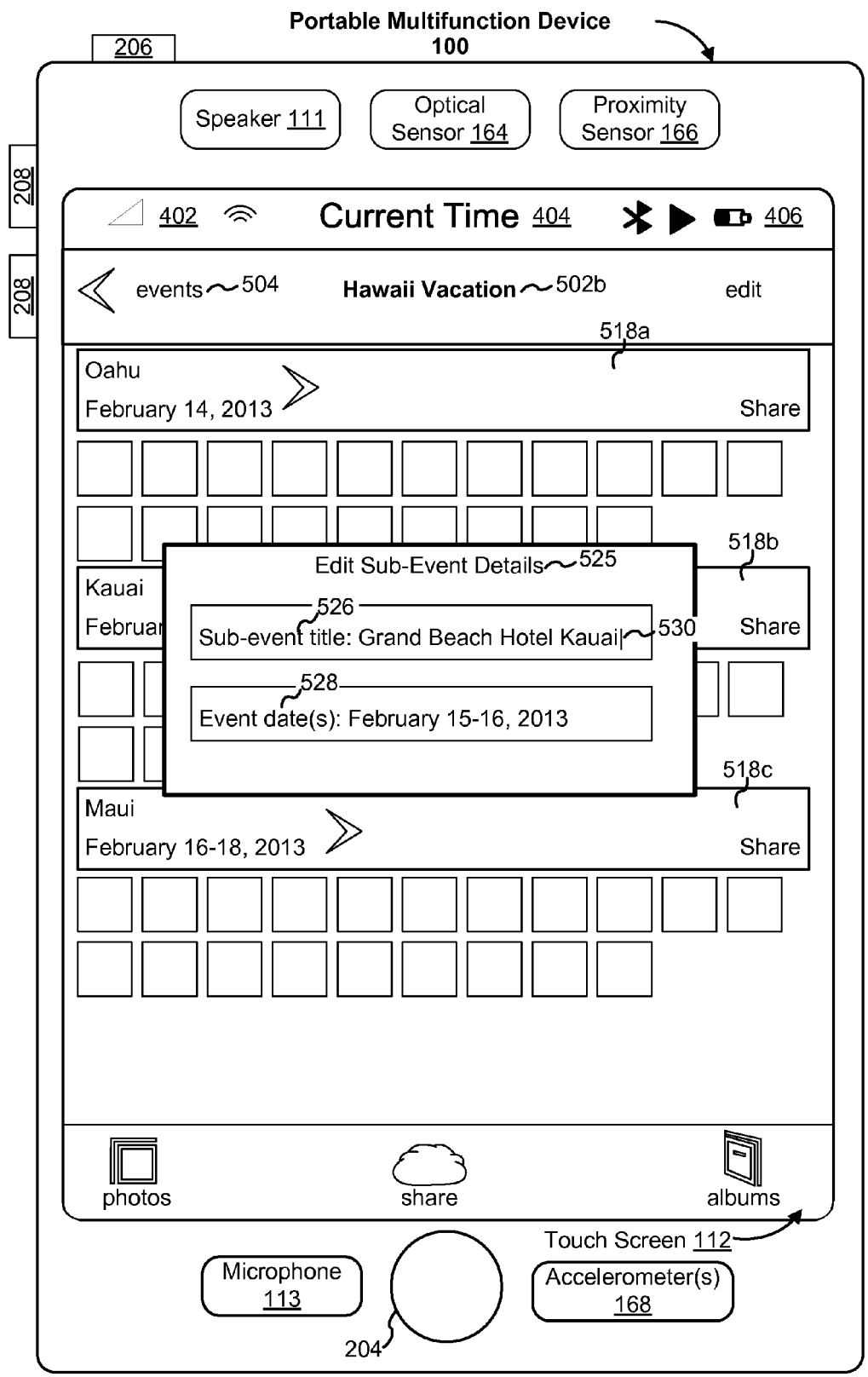

FIG. 5E illustrates displaying an edit sub-event details window 525 in response to detecting the press and hold gesture with contact 524 in FIG. 5D. In some embodiments, the device is configured to automatically populate a sub-event title and sub-event date(s) for a respective sub-event in accordance with metadata associated with the items within the event or sub-event. In FIG. 5E, the edit sub-event details window 525 includes a sub-event title field 526 and a sub-event date(s) field 528 populated with the current sub-event date(s) for sub-event 518b. In some embodiments, a user is enabled to edit the sub-event title field 526 and the sub-event date(s) field 528 with a text or speech input. FIG. 5E further illustrates editing the sub-event title field 526 to rename sub-event title 507b from Kauai to Grand Beach Hotel Kauai via a text input 530.

Figure 5F:
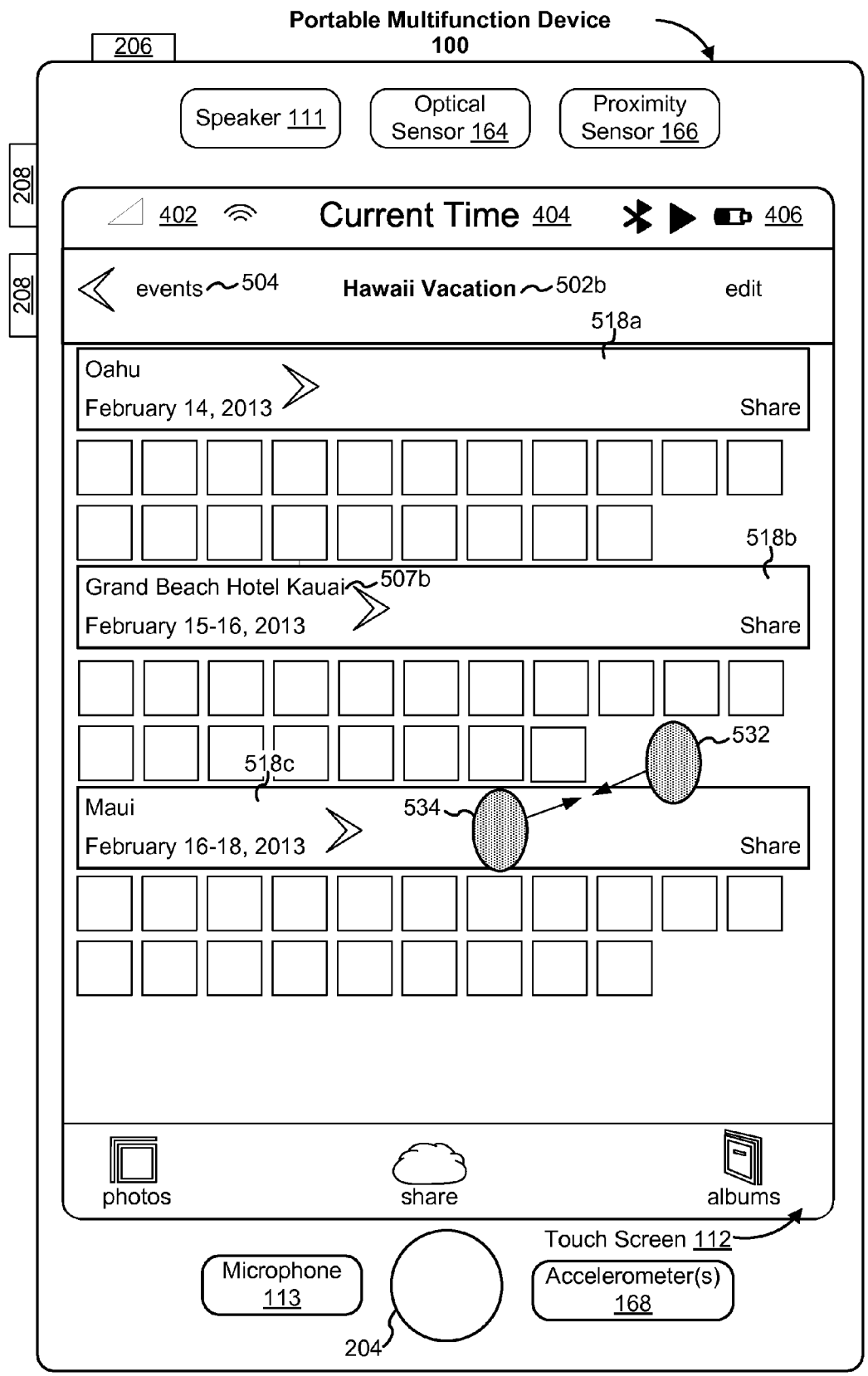

FIG. 5F illustrates displaying Grand Beach Hotel Kauai as the event title 507b for sub-event 518b in response to text input 530 in FIG. 5E. FIG. 5F further illustrates detecting a pinch gesture corresponding to movement of contacts 532 and 534 toward each other on touch screen 112.

Figure 5G:
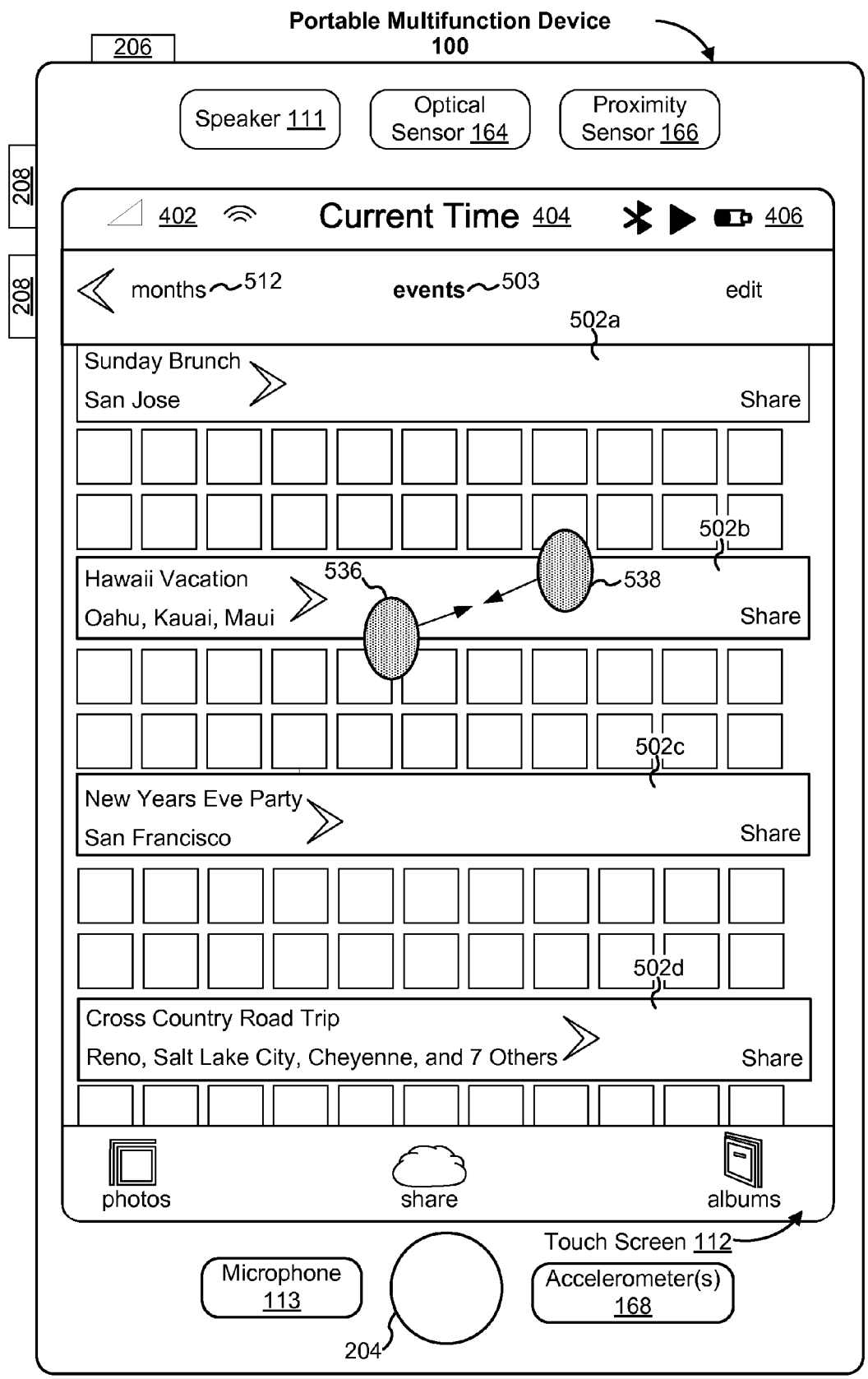

FIG. 5G illustrates displaying an events view 503 in response to detecting the pinch gesture in FIG. 5F. In some embodiments, the device is enabled to switch between views (e.g., event view 503, month view 513 (FIG. 5H), seasons view 551 (FIG. 5I), and year view 561 (FIG. 5J)) by detecting a pinch or depinch gesture (e.g., a pinch gesture corresponding to movement of contacts 532 and 534 in FIG. 5F or a depinch gesture corresponding to movement of contacts 582 and 584 in FIG. 5O) or, optionally, by detecting a horizontal swipe gesture with three or more contacts. In some embodiments, the device is similarly enabled to switch between views by detecting a tap gesture over on an affordance corresponding to a respective view (e.g., events affordance 504 in FIG. 5F, months affordance 512 in FIG. 5G, seasons affordance 550 in FIG. 5H, and years affordance 560 in FIG. 5I). FIG. 5G further illustrates detecting a pinch gesture corresponding to movement of contacts 536 and 538 toward each other on touch screen 112.

Figure 5I:
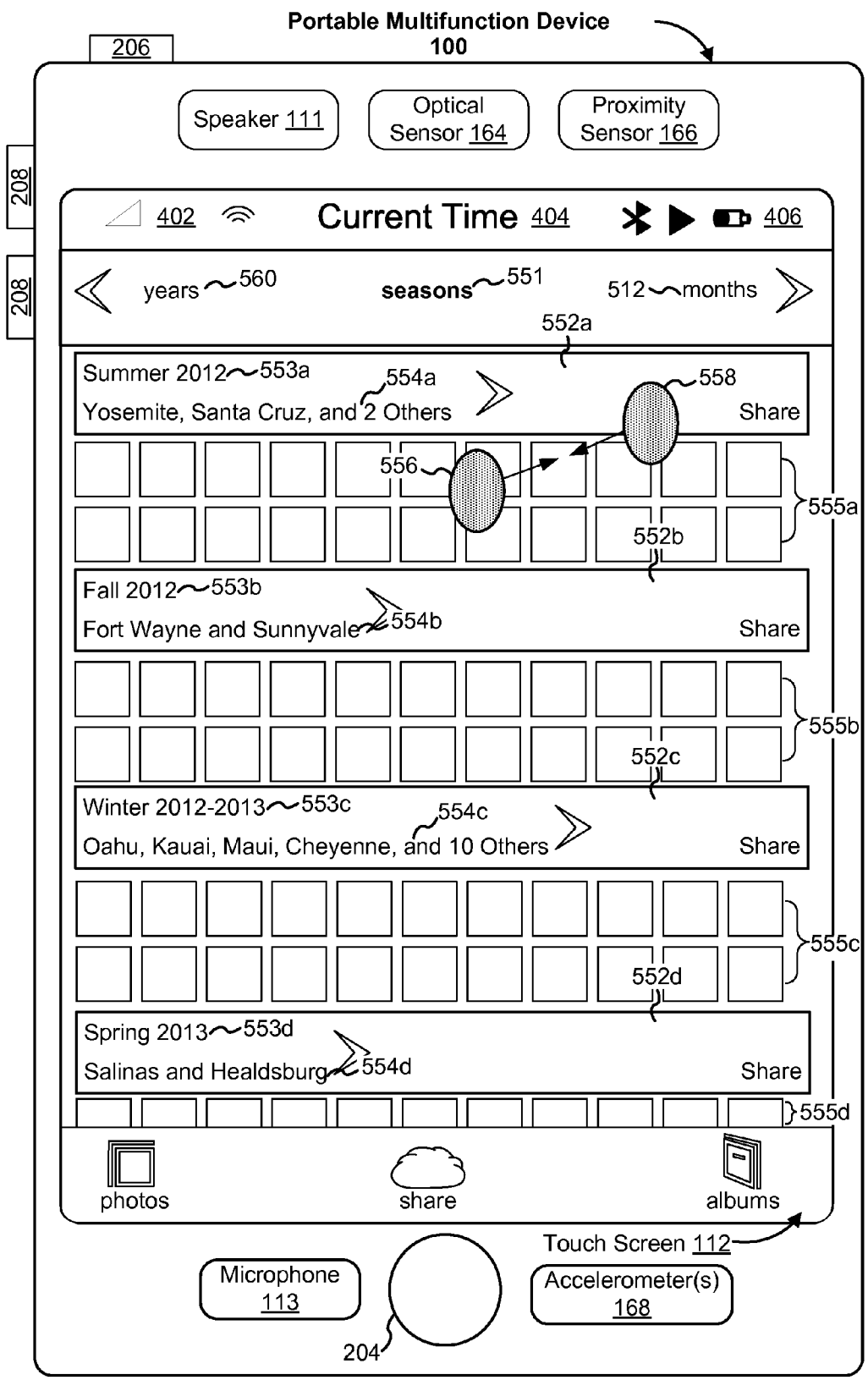
Figure 5H:
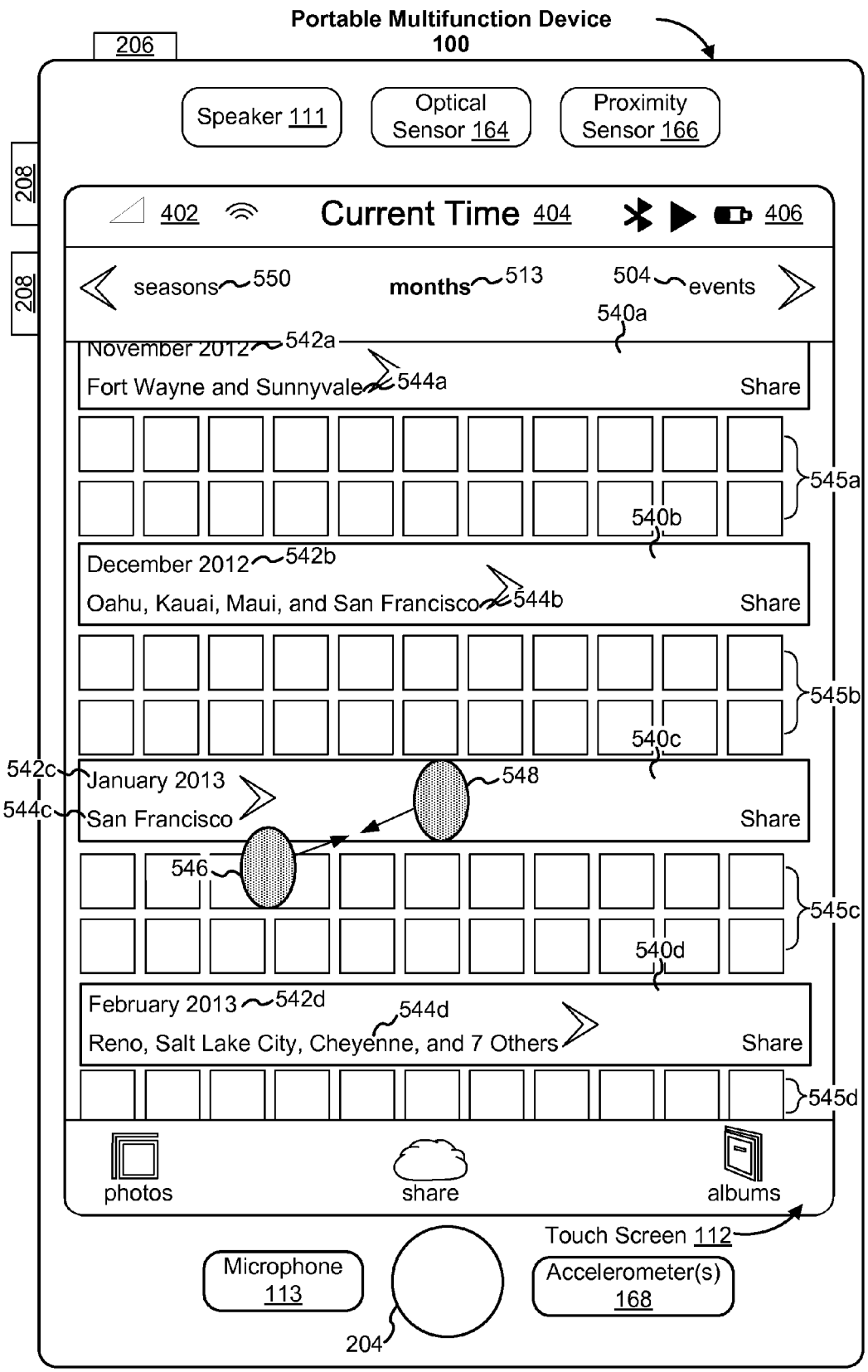

FIG. 5H illustrates displaying a months view 513 in response to detecting the pinch gesture in FIG. 5G. FIG. 5H illustrates a plurality of selectable multi-item months 540a, 540b, 540c, 540d within months view 513. In FIG. 5H, each representation of a month includes a month title (e.g., 542a, 542b, 542c, 542d), location(s) indicator (e.g., 544a, 544b, 544c, 544d), and one or more representations of media items (e.g., 545a, 545b, 545c, 545d) within the respective month. In FIG. 5H, the one or more representations of media items within the months are displayed at a detailed-granularity level. FIG. 5H further illustrates a seasons affordance 550 which enables the device to display a seasons view 551 (described in more detail below with reference to FIG. 5I) in response to a tap gesture on the affordance 550 and an events affordance 504 which enables the device to display an events view 503 (described in more detail above with reference to FIGS. 5A-5B and 5G) in response to a tap gesture on the affordance 504. FIG. 5H further illustrates detecting a pinch gesture corresponding to movement contacts 546 and 548 toward each other on touch screen 112.

FIG. 5I illustrates displaying a seasons view 551 in response to detecting the pinch gesture in FIG. 5H. FIG. 5I illustrates a plurality of selectable multi-item seasons 552a, 552b, 552c, 552d within seasons view 551. In FIG. 5H, each representation of a season includes a season title (e.g., 553a, 553b, 553c, 553d), location(s) indicators (e.g., 554a, 554b, 554c, 554d), and one or more representations of media items (e.g., 555a, 555b, 555c, 555d) within the respective season. In FIG. 5I, the one or more representations of media items within the season are displayed at a detailed-granularity level. FIG. 5I further illustrates a years affordance 560 which enables the device to display a years view 561 (described in more detail below with reference to FIG. 5J) in response to a tap gesture on the affordance 560 and a months affordance 512 which enables the device to display a months view 513 (described in more detail above with reference to FIG. 5H) in response to a tap gesture on the affordance 512. FIG. 5I further illustrates detecting a pinch gesture corresponding to movement of contacts 556 and 558 toward each other on touch screen 112.

Figure 5J:
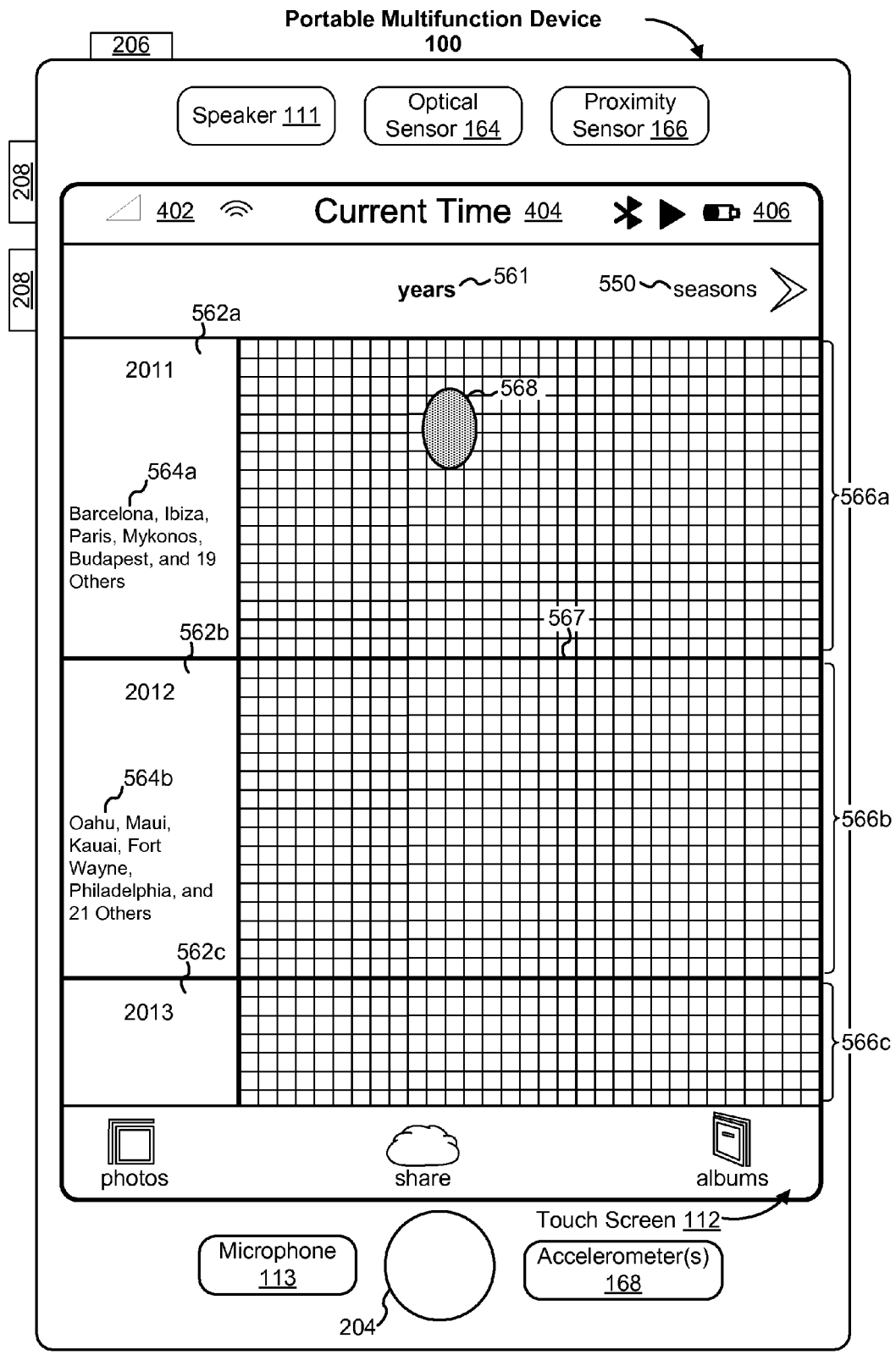

FIG. 5J illustrates displaying a years view 561 in response to detecting the pinch gesture in FIG. 5I. FIG. 5J illustrates a plurality of years 562a, 562b, 562c and a location(s) indicator (e.g., 564a, 564b) for the years. The location(s) indicator include one or more locations associated with items within a corresponding year (e.g., location indicator 564a includes Barcelona, Ibiza, Paris, Mykonos, Budapest, and 19 Others within 2011). In FIG. 5J, the plurality of years further include a plurality of representations of media items (e.g., 566a, 566b, 566c) displayed at an overview-granularity level. FIG. 5J further illustrates detecting a tap gesture with contact 568 over a respective representation of a media item in the plurality of representations of media items 566a on touch screen 112.

Figure 5K:
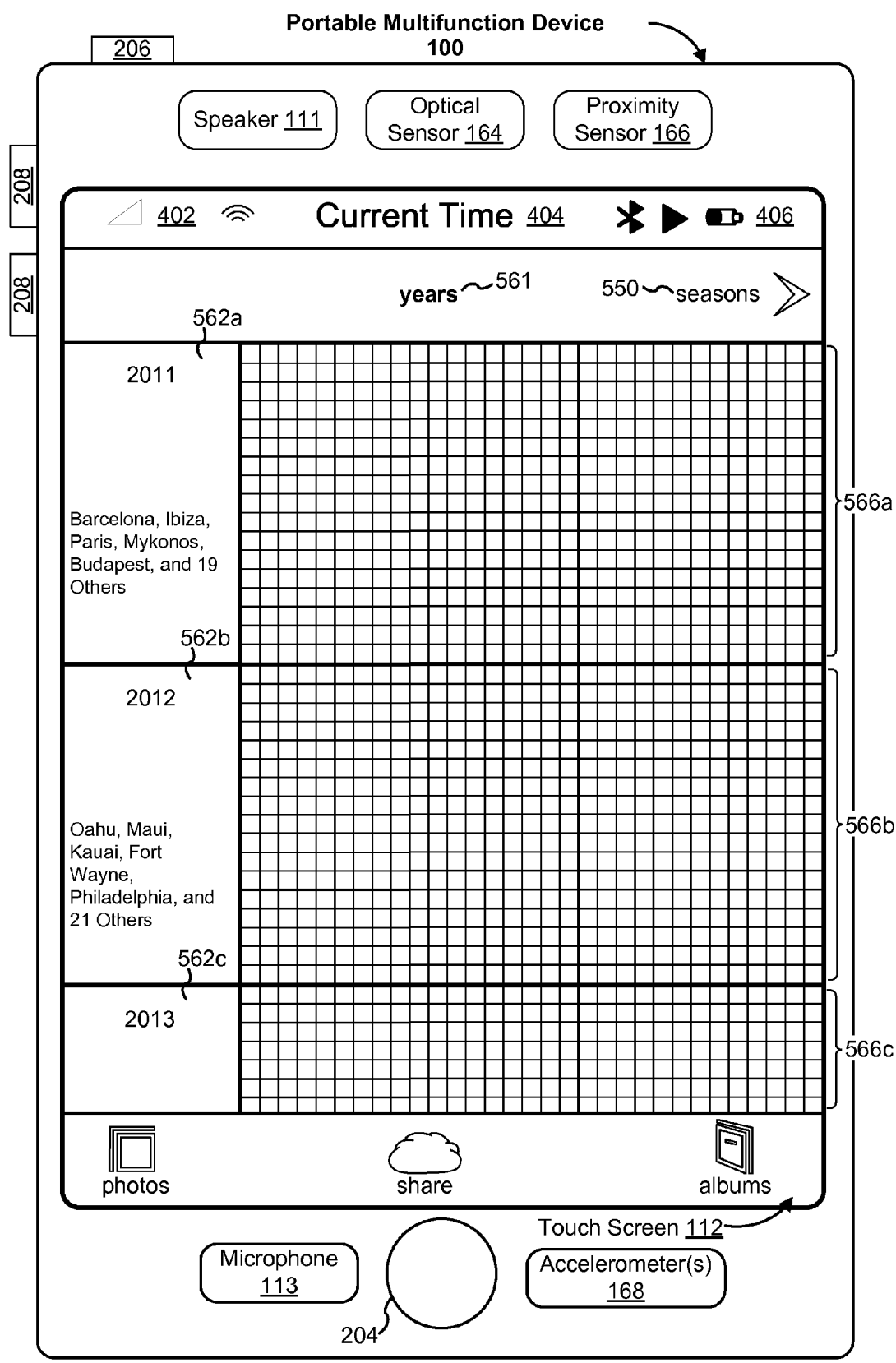

FIG. 5K illustrates continuing to display the plurality of representations of media items 566a in response to detecting the tap gesture with contact 568 in FIG. 5J.

Figure 5L:
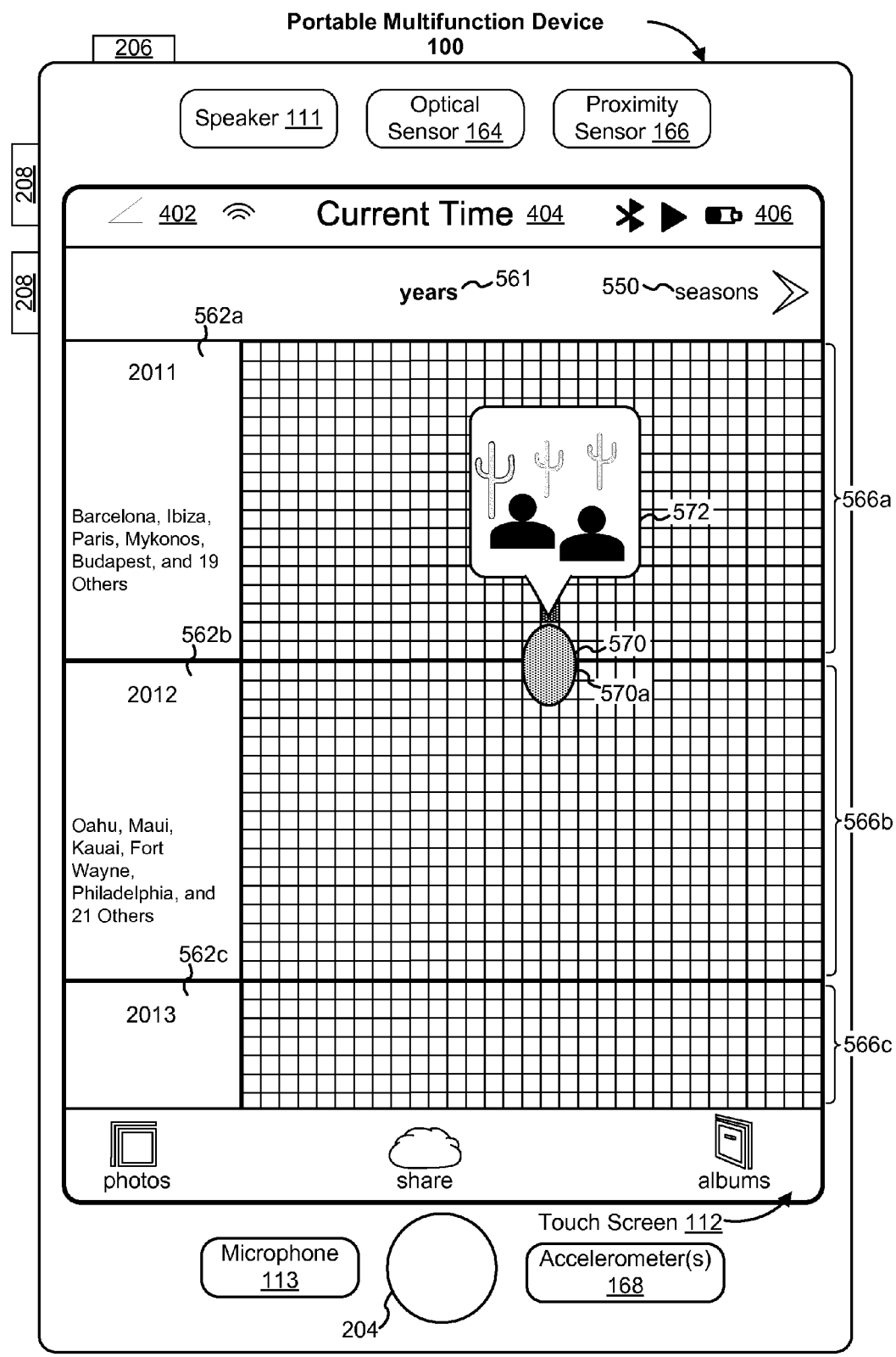

FIG. 5L illustrates detecting a press and hold gesture with contact 570 at position 570a corresponding to (e.g., over or near) a first respective representation of a media item in the plurality of representations of media items 566a on touch screen 112. FIG. 5L further illustrates ceasing to display the first respective representation and displaying an enlarged representation (or a preview) 572 of the media item in response to detecting the press and hold gesture with contact 570 at position 570a corresponding to the respective representation. In some embodiments, the press and hold gesture is detected in accordance with a determination that a contact was held over or near a respective representation in excess of a predetermined amount of time (e.g., 0.05, 0.1, 0.2, 0.5 or 1.0 seconds or some other reasonable amount of time), and the enlarged representation of the respective representation is not displayed until the predetermined amount of time has elapsed. In some embodiments, the aforementioned respective representation is a first respective representation. In some embodiments, in the year view, while performing a press and hold gesture, the device selects a representation of a media item that is slightly offset from the contact (e.g., a focus selector corresponding to the contact is slightly offset from the contact), so that the user can see a location of the representation of the media item in the array of representations of media items that is currently being selected/enlarged (e.g., so that the location is not obscured by the user's finger).

Figure 5M:
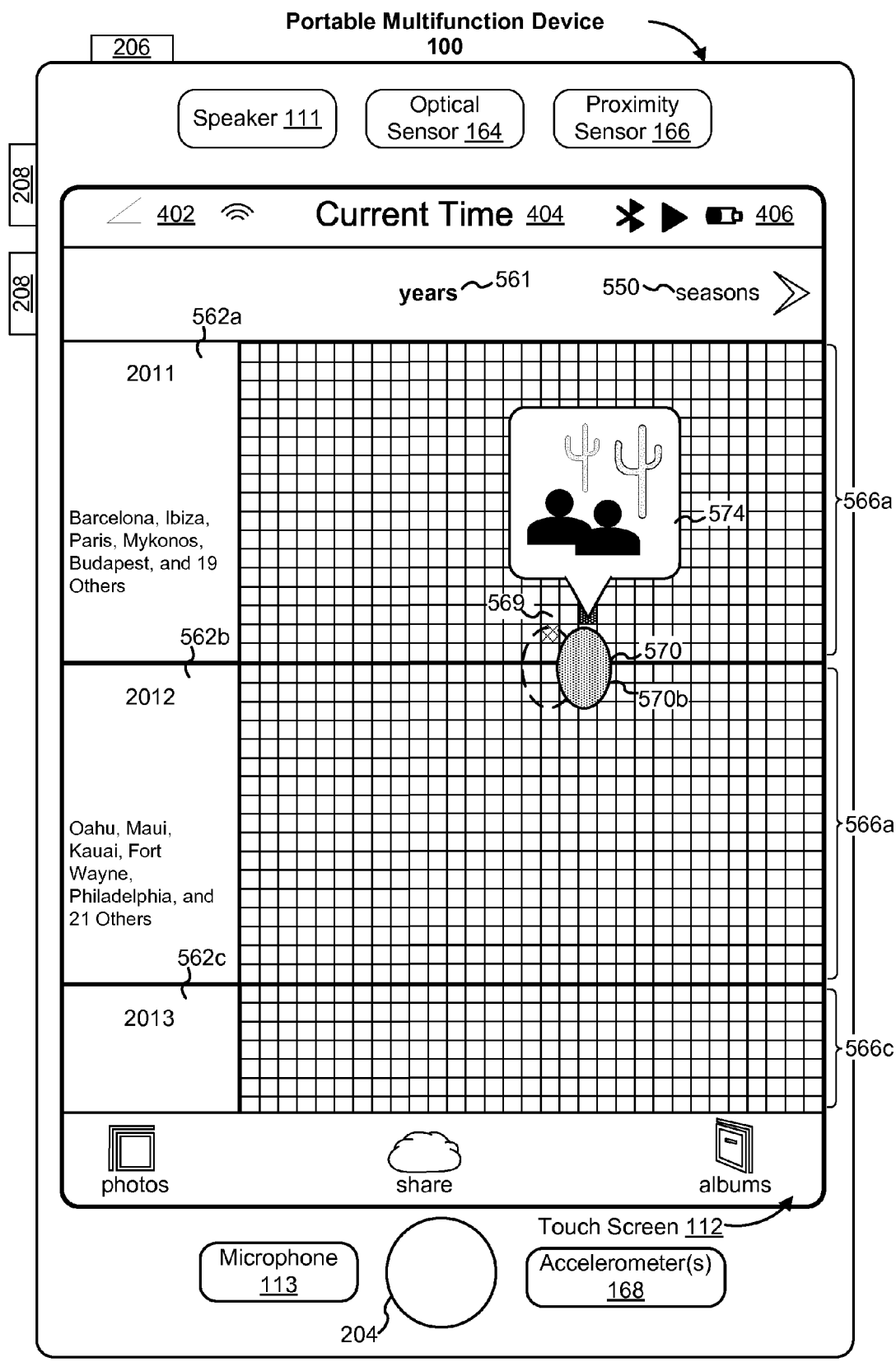

FIG. 5M illustrates ceasing to display enlarged representation 572 corresponding to the first respective representation (e.g., shown in FIG. 5L) and redisplaying the first respective representation 569. FIG. 5M further illustrates displaying enlarged representation 574 corresponding to a second respective representation adjacent to and distinct from the first respective representation and ceasing to display the second respective representation in response to detecting contact 570 at position 570b corresponding to (e.g., over or near) the second respective representation on touch screen 112.

Figure 5N:
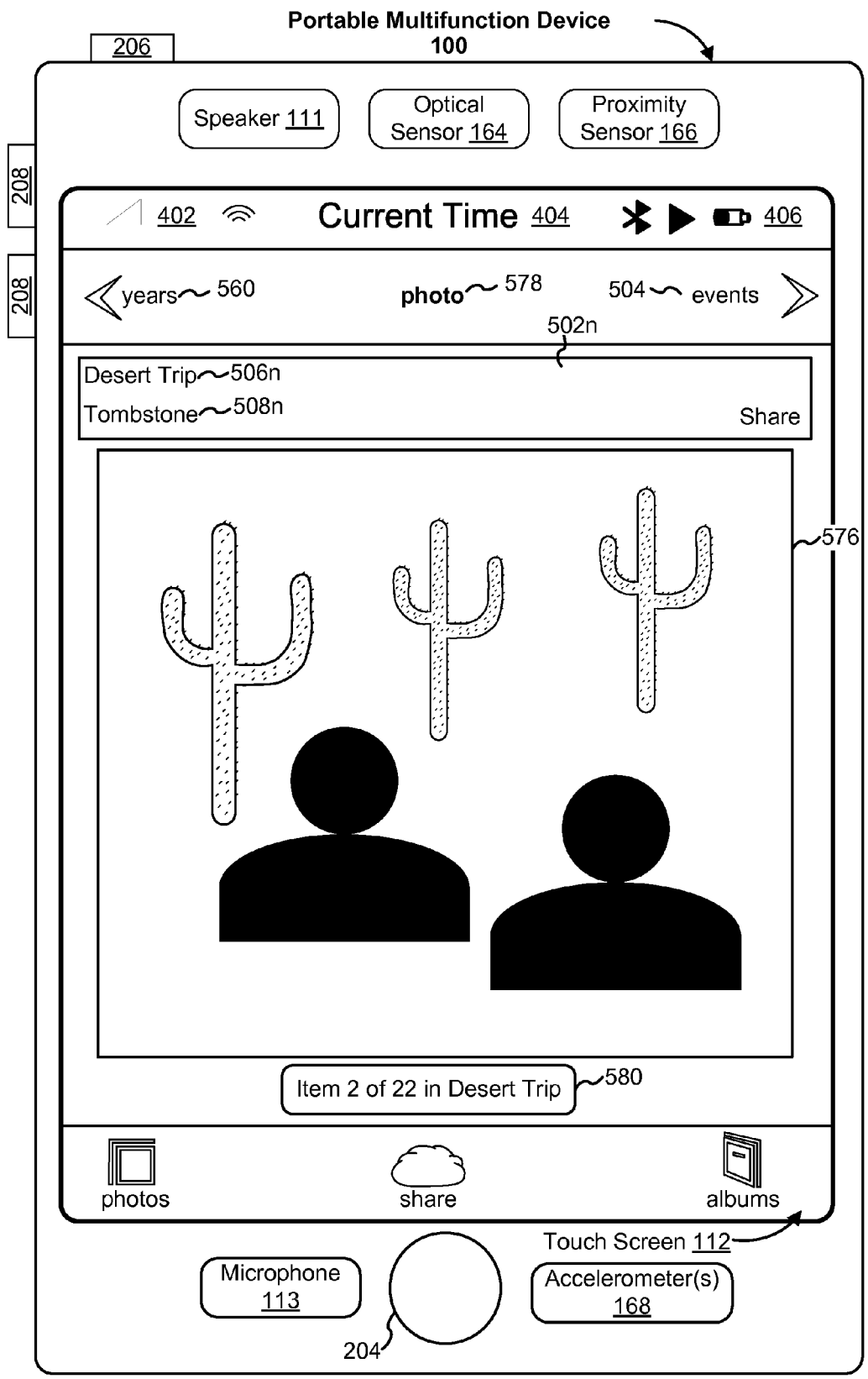

FIG. 5N illustrates displaying a respective media item 576 (e.g., a full-size image) corresponding to the first respective representation in a photo view 578 in response to detecting liftoff of contact 570 from position 570a in FIG. 5L. In FIG. 5N, a multi-item event 502n associated with the respective media item 576 is displayed and an indicator 580 corresponding to the number associated with the respective media item 576 within a sequential number of media items related to event 502n is displayed. The event title 506n (e.g., Desert Trip) and event location 508n (e.g., Tombstone) for event 502n are also displayed in FIG. 5N. FIG. 5N further illustrates a years affordance 560 which enables the device to display the years view 561 (described in more detail above with reference to FIGS. 5J-5L) in response to a tap gesture on the affordance 560 and an events affordance 504 which enables the device to display the events view 503 (described in more detail above with reference to FIGS. 5A-5B and 5G) in response to a tap gesture on the affordance 504.

Figure 5O:
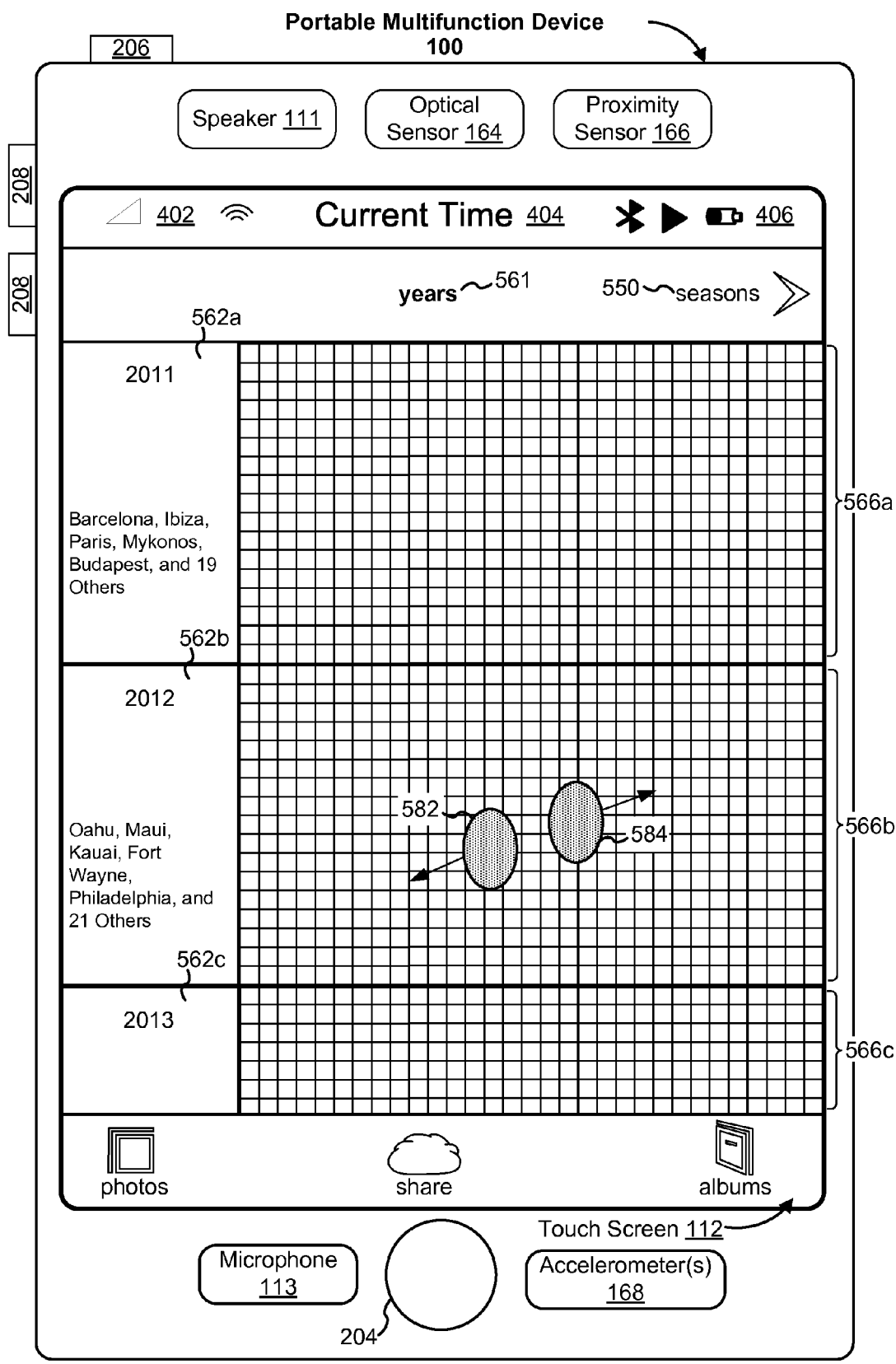

FIG. 5O illustrates detecting a depinch gesture corresponding to movement of contacts 582 and 584 away from each other on touch screen 112 while in years view 561.

Figure 5P:
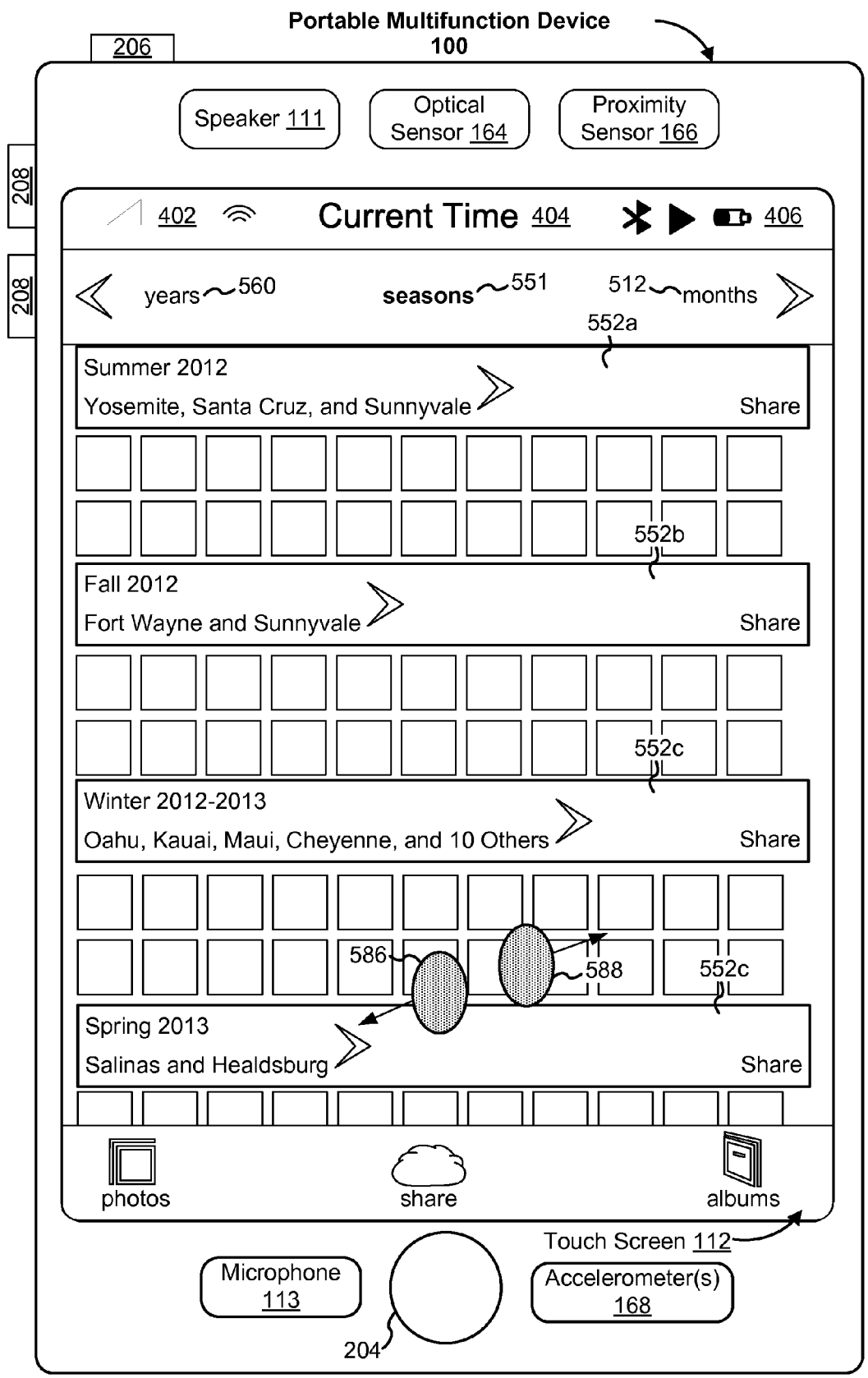

FIG. 5P illustrates displaying a seasons view 551 in response to detecting the depinch gesture in FIG. 5O. FIG. 5N further illustrates detecting a depinch gesture corresponding to movement of contacts 586 and 588 away from each other on touch screen 112.

Figure 5Q:
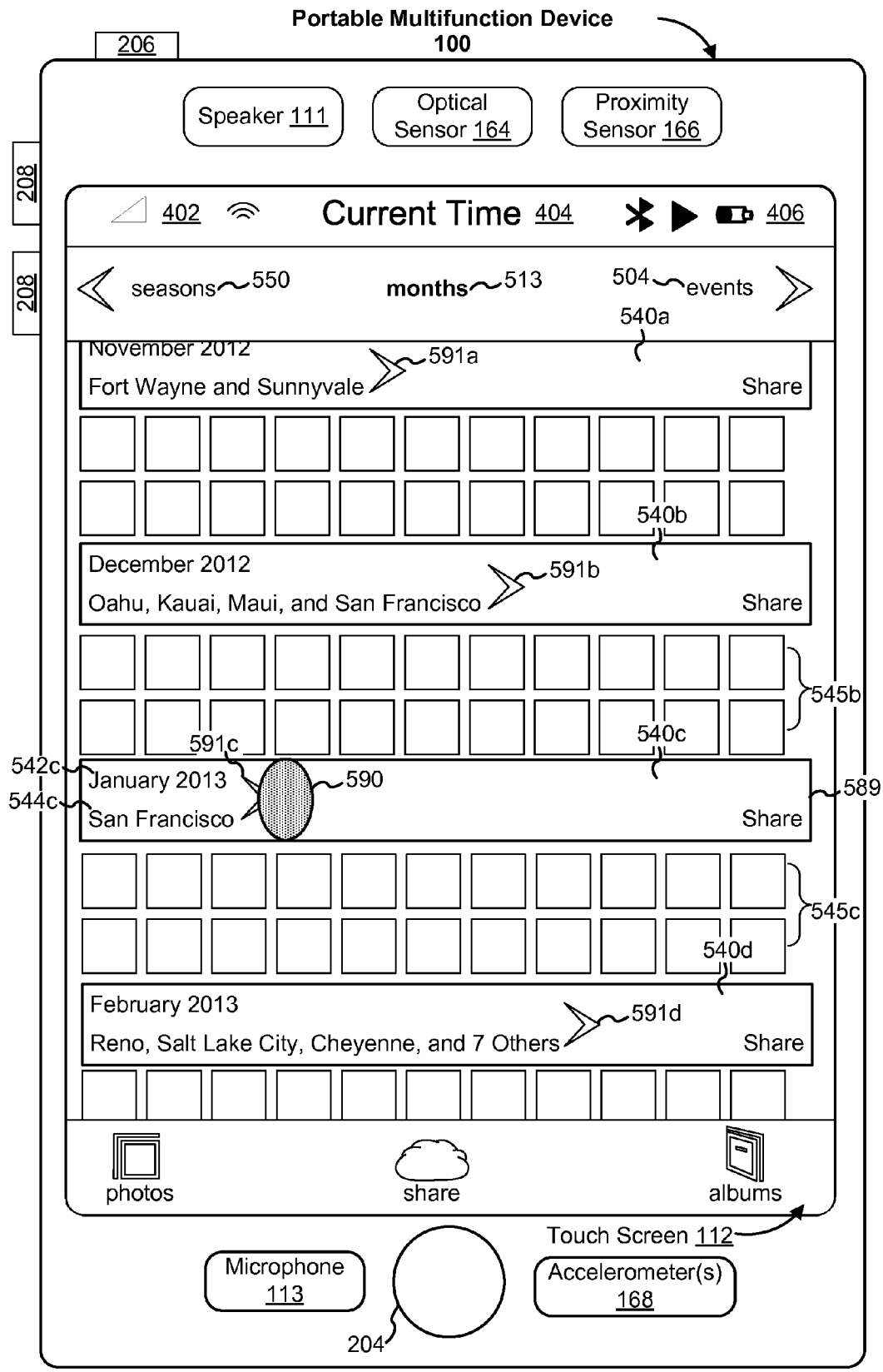

FIG. 5Q illustrates displaying a months view 513 in response to detecting the depinch gesture in FIG. 5N. FIG. 5Q further illustrates detecting a tap gesture with contact 590 over an affordance 591c associated with selectable multi-item month group 540c on touch screen 112. In some embodiments, only the affordance associated with a grouping (e.g., affordances 591a, 591b, 591c, 591d) is selectable. In some other embodiments, the entire description box or area associated with a grouping is selectable. For example, in some embodiments, the entire area within description box 589 corresponding to month 540c is selectable.

Figure 5R:
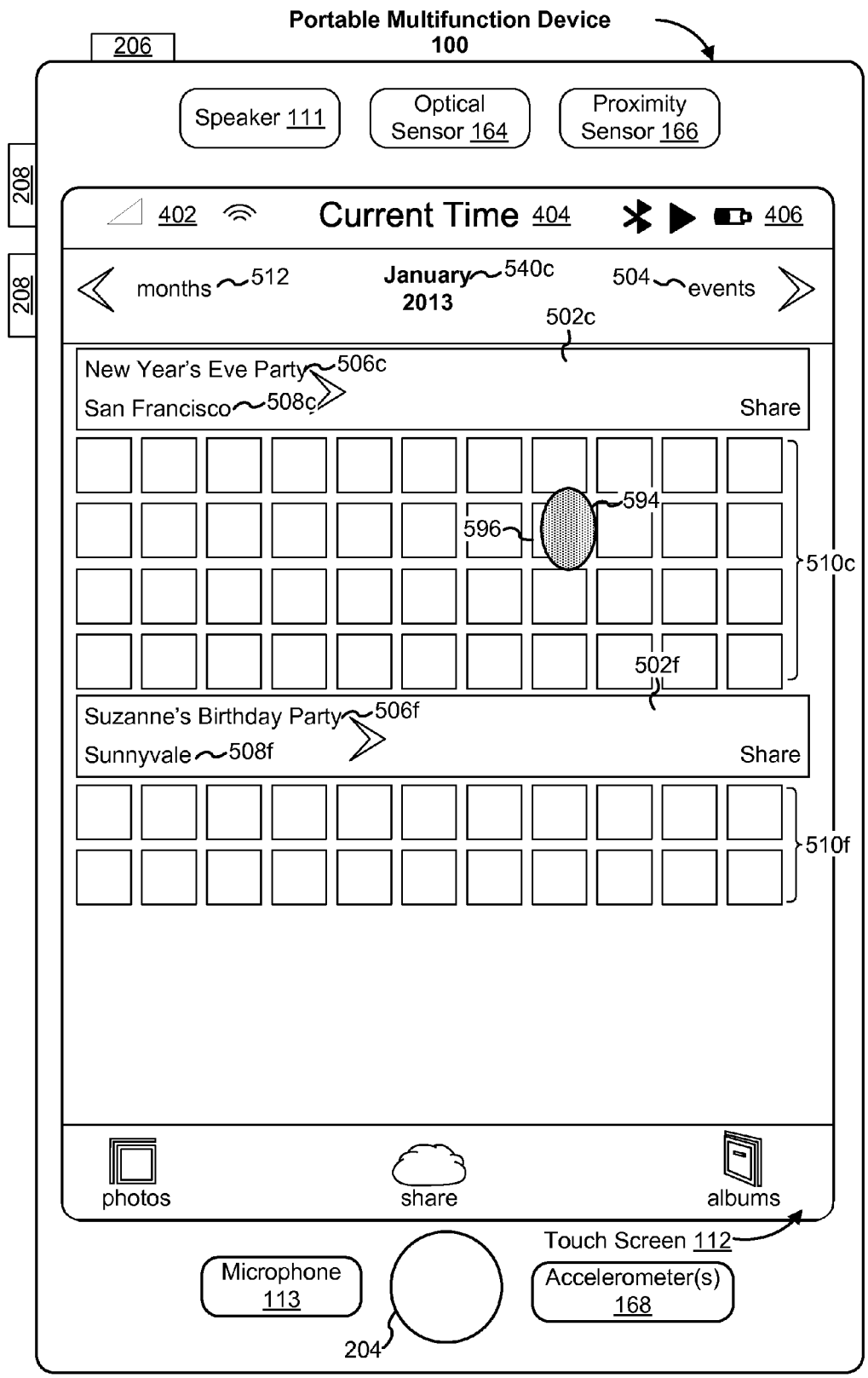
Figure 5S:
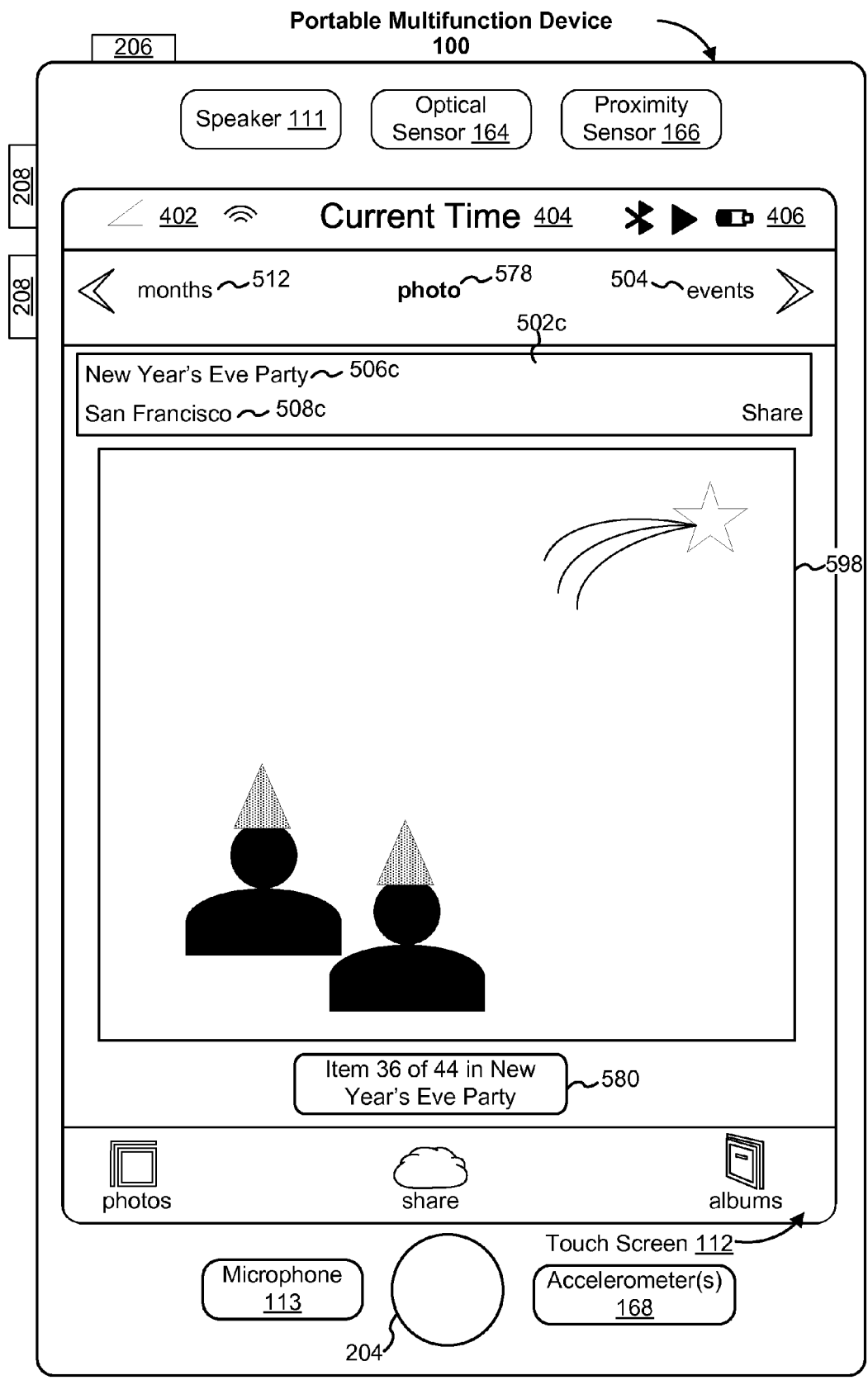
Figure 6A:
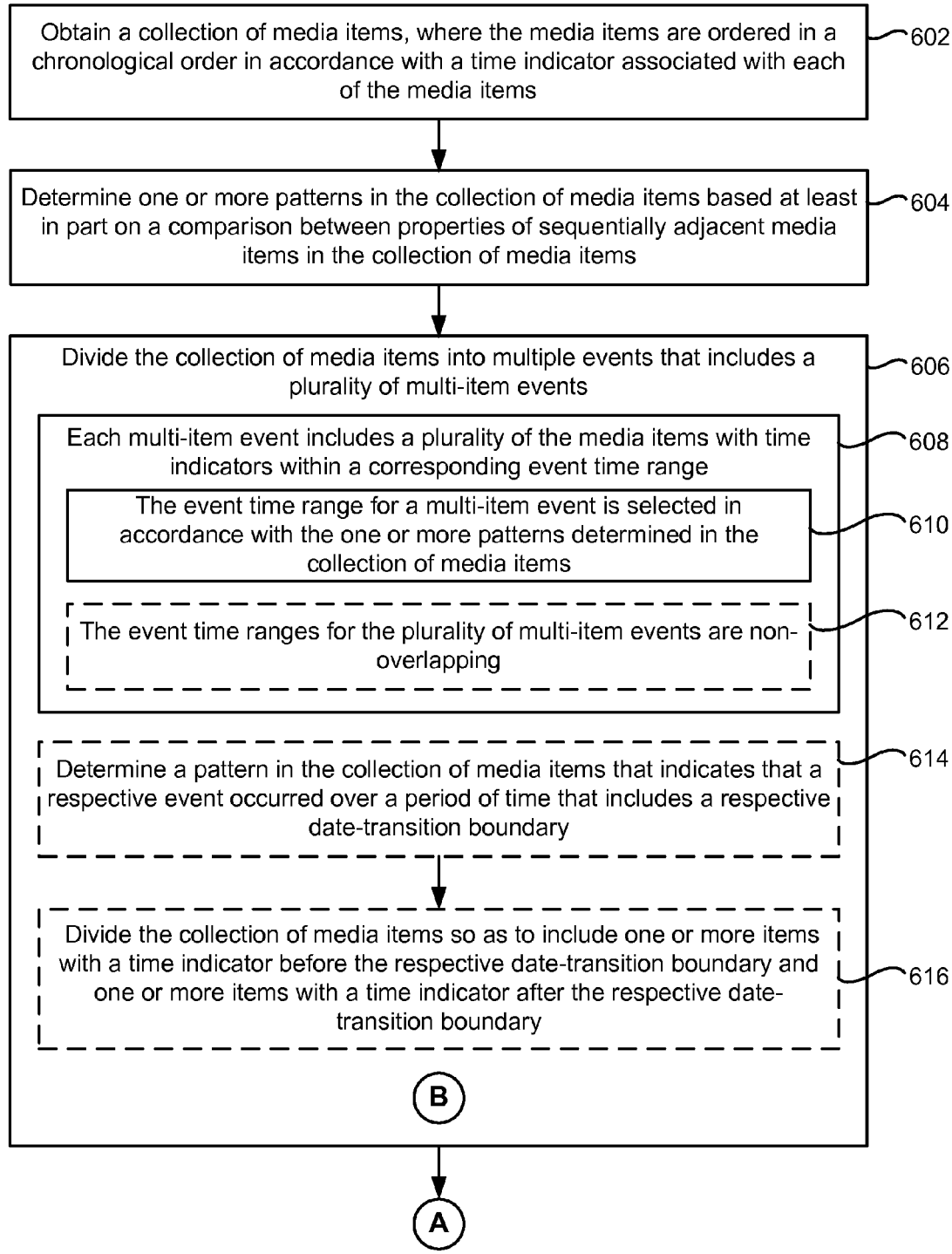
FIGS. 6A-6E are flow diagrams illustrating a method of dividing a collection of media items into a plurality of multi-item events in accordance with some embodiments.
Figure 6B:
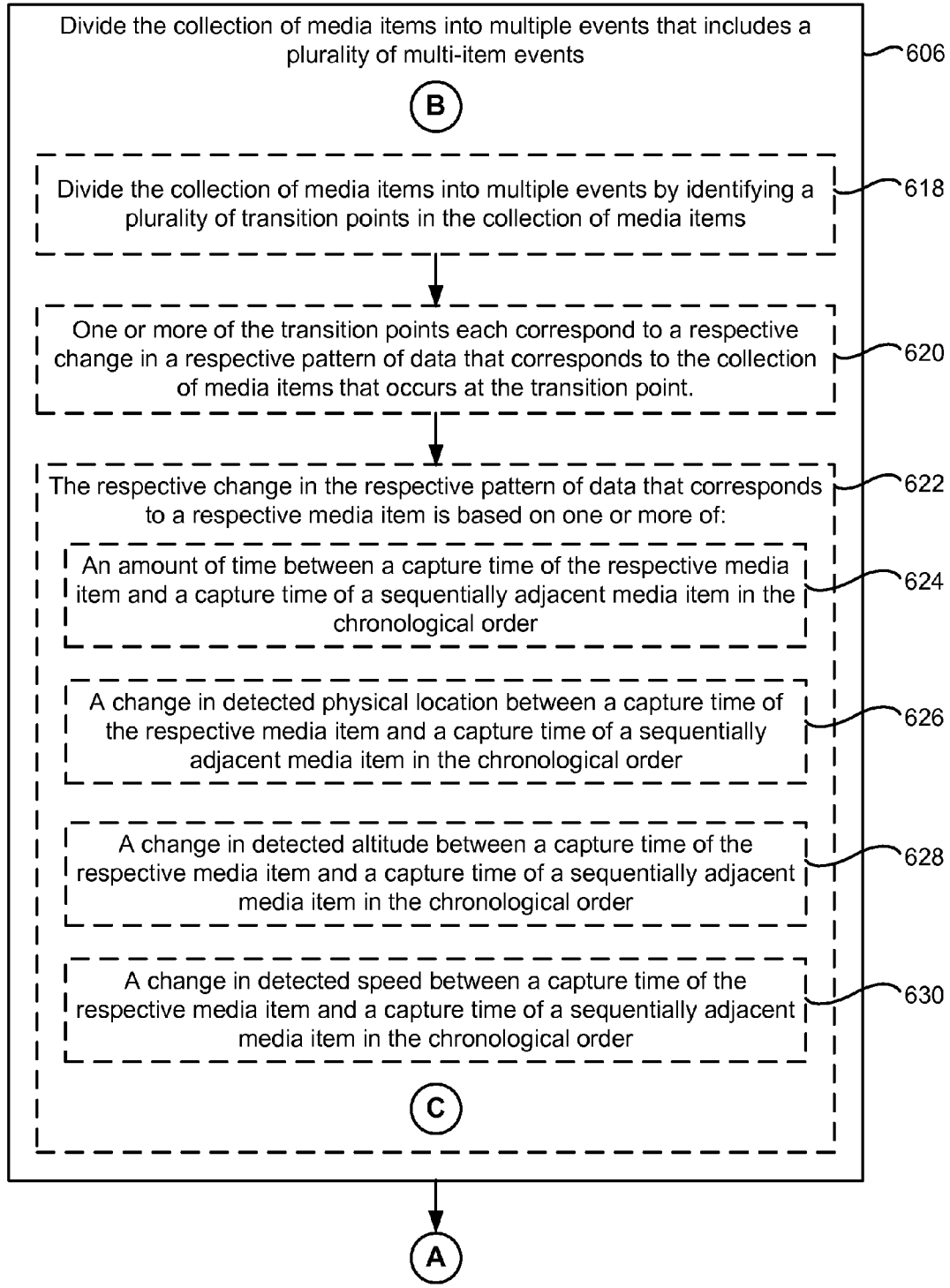
Figure 6C:
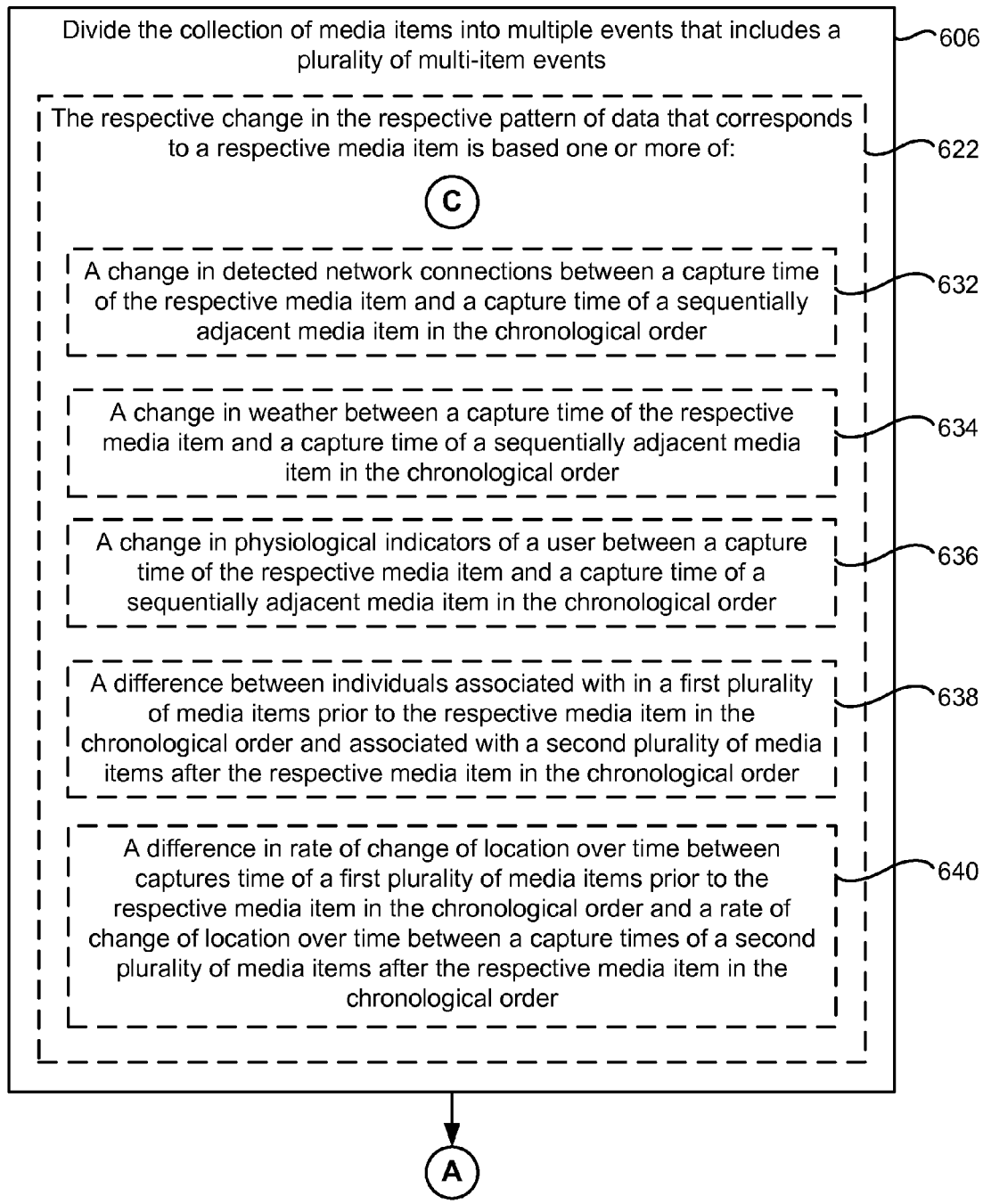
Figure 6D:
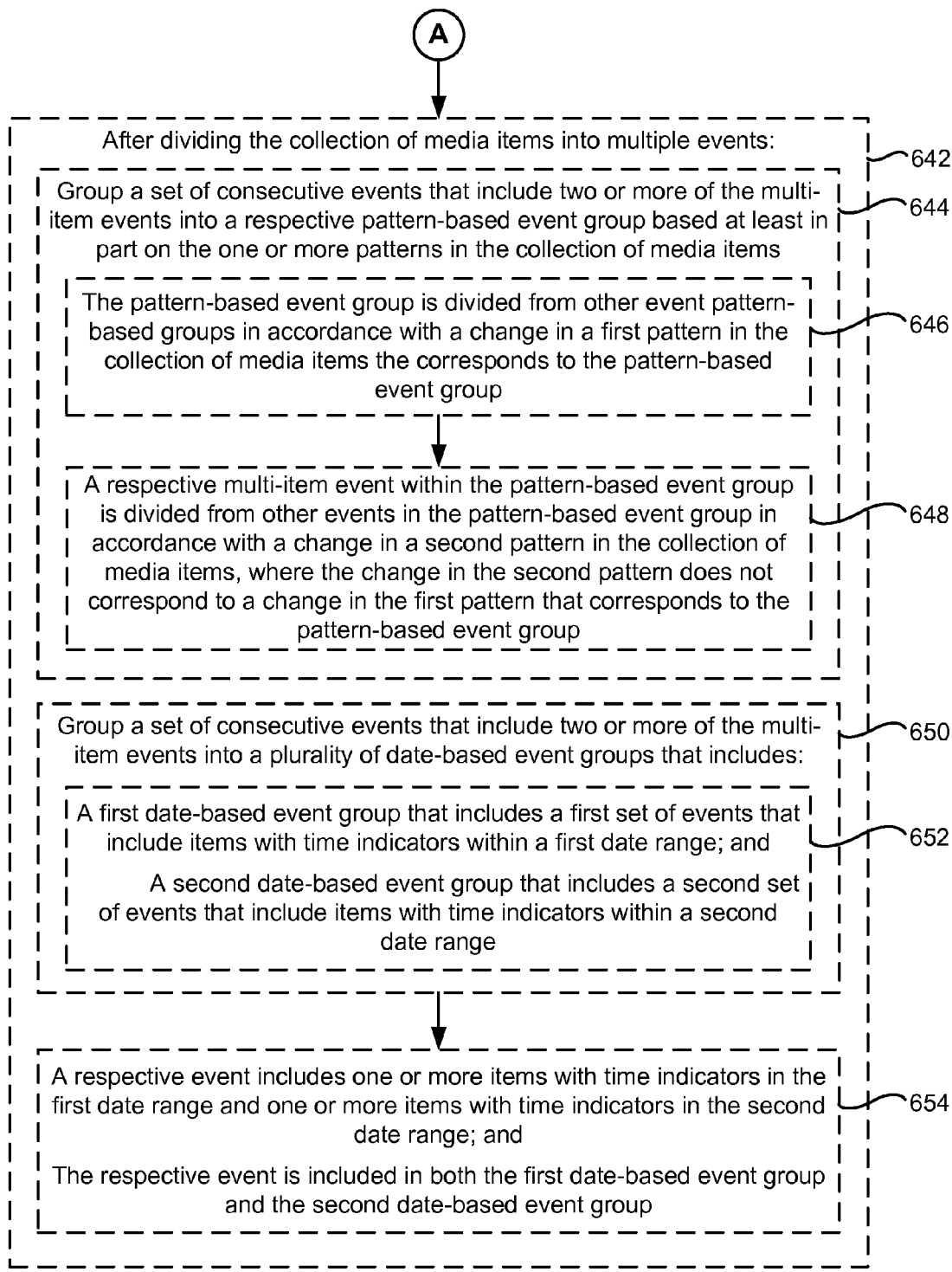
Figure 6E:
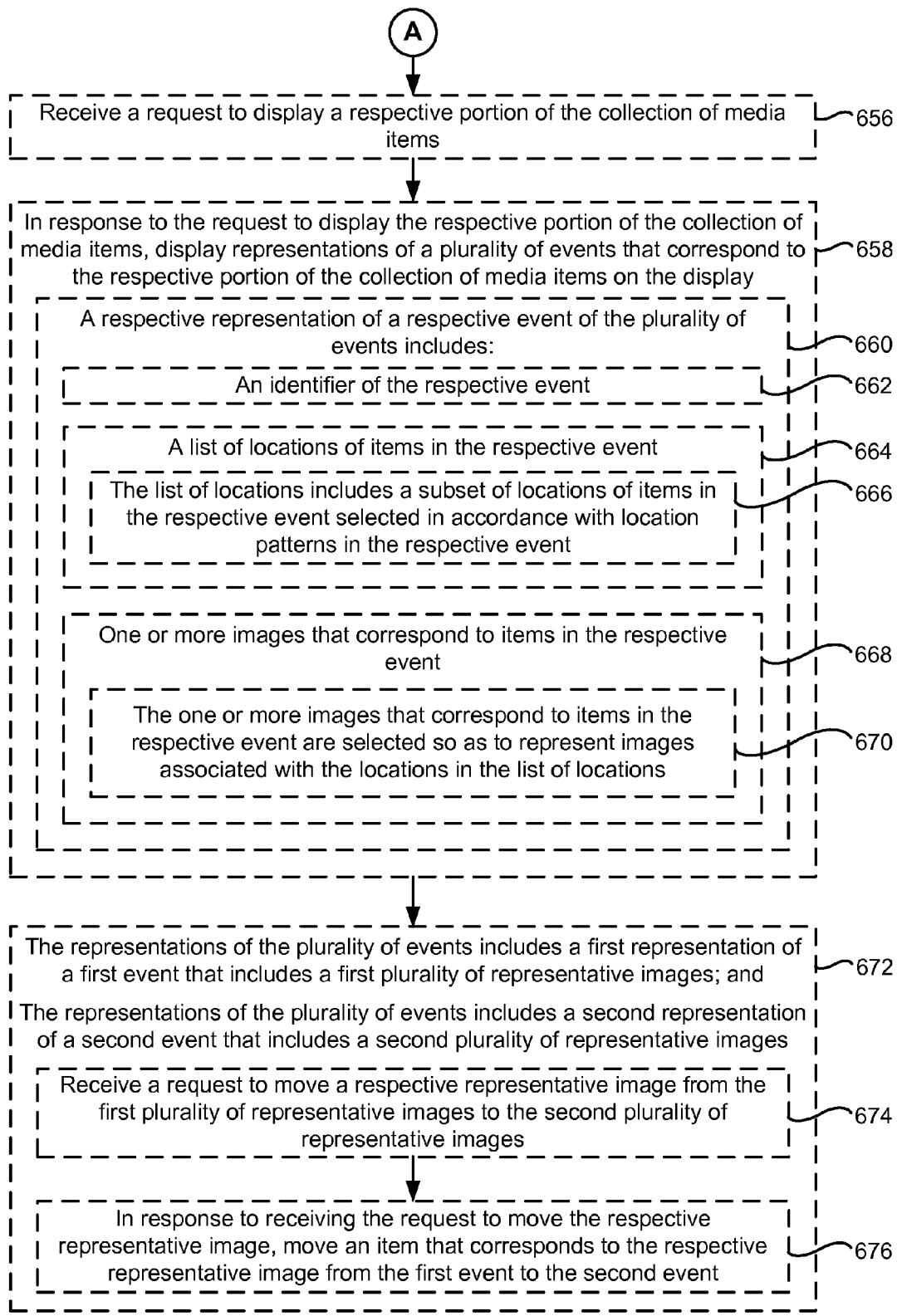
Figure 7A:
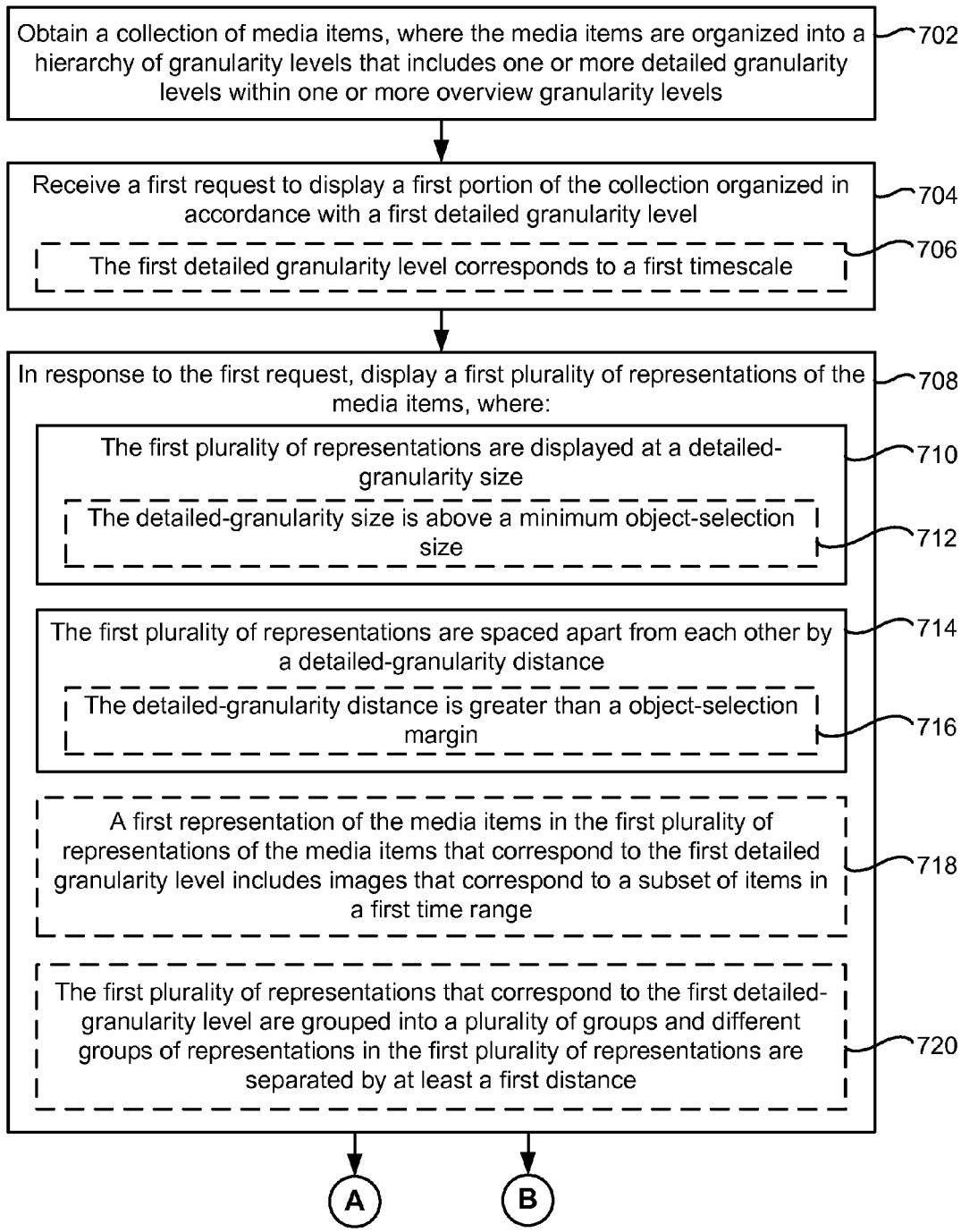
FIGS. 7A-7D are flow diagrams illustrating a method of organizing a collection of media items into a hierarchy of granularity levels in accordance with some embodiments.
Figure 7B:
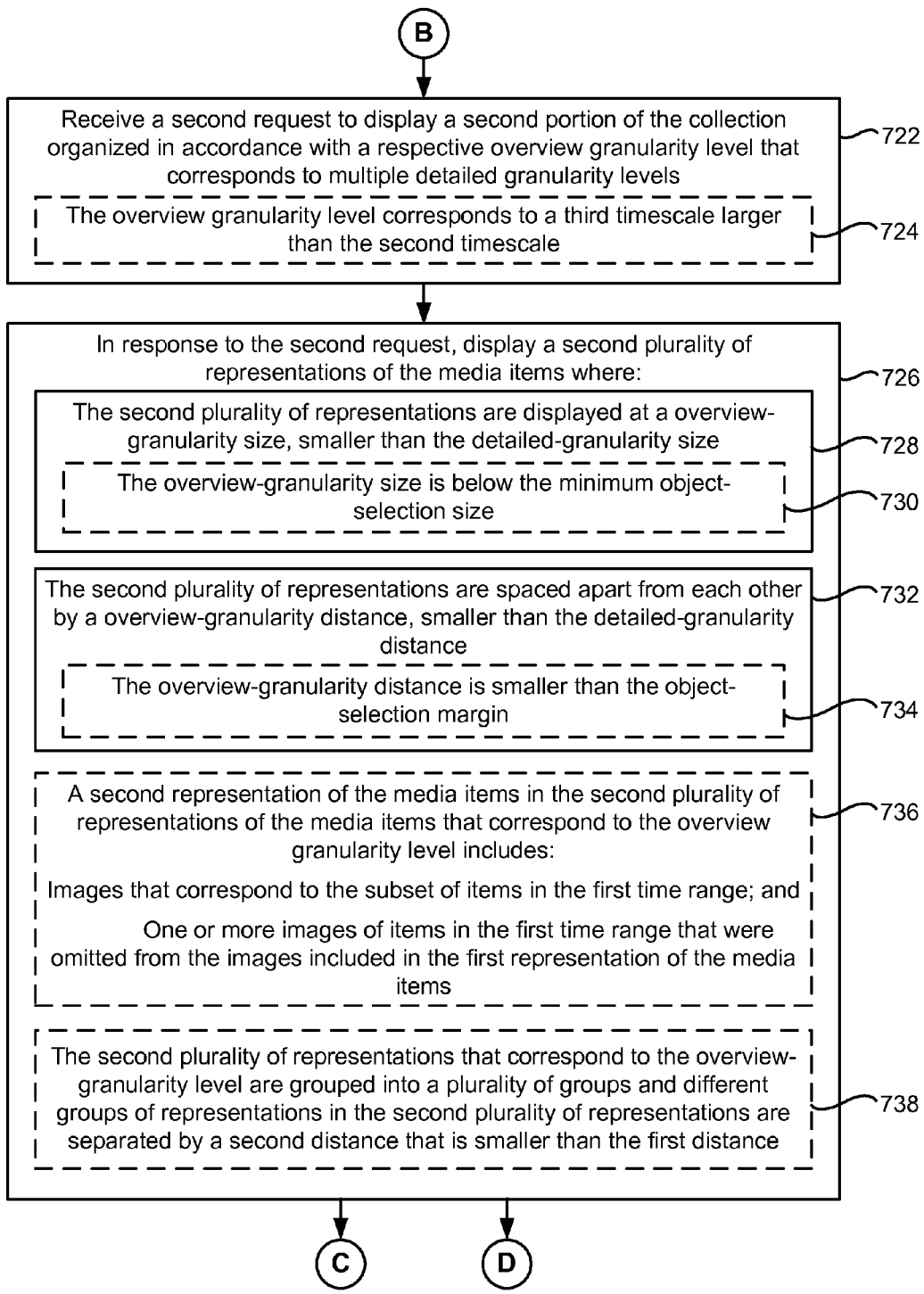
Figure 7C:
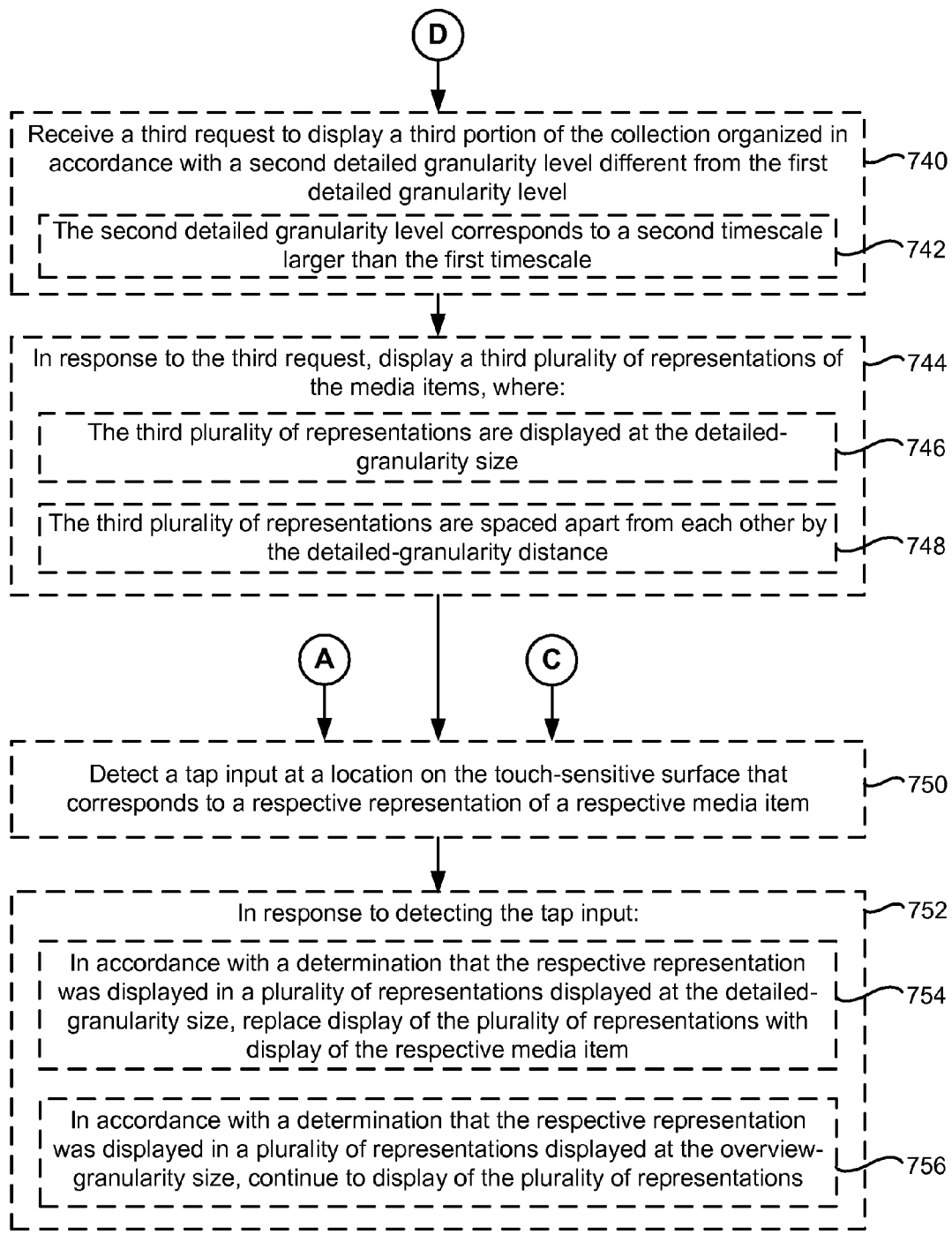
Figure 7D:
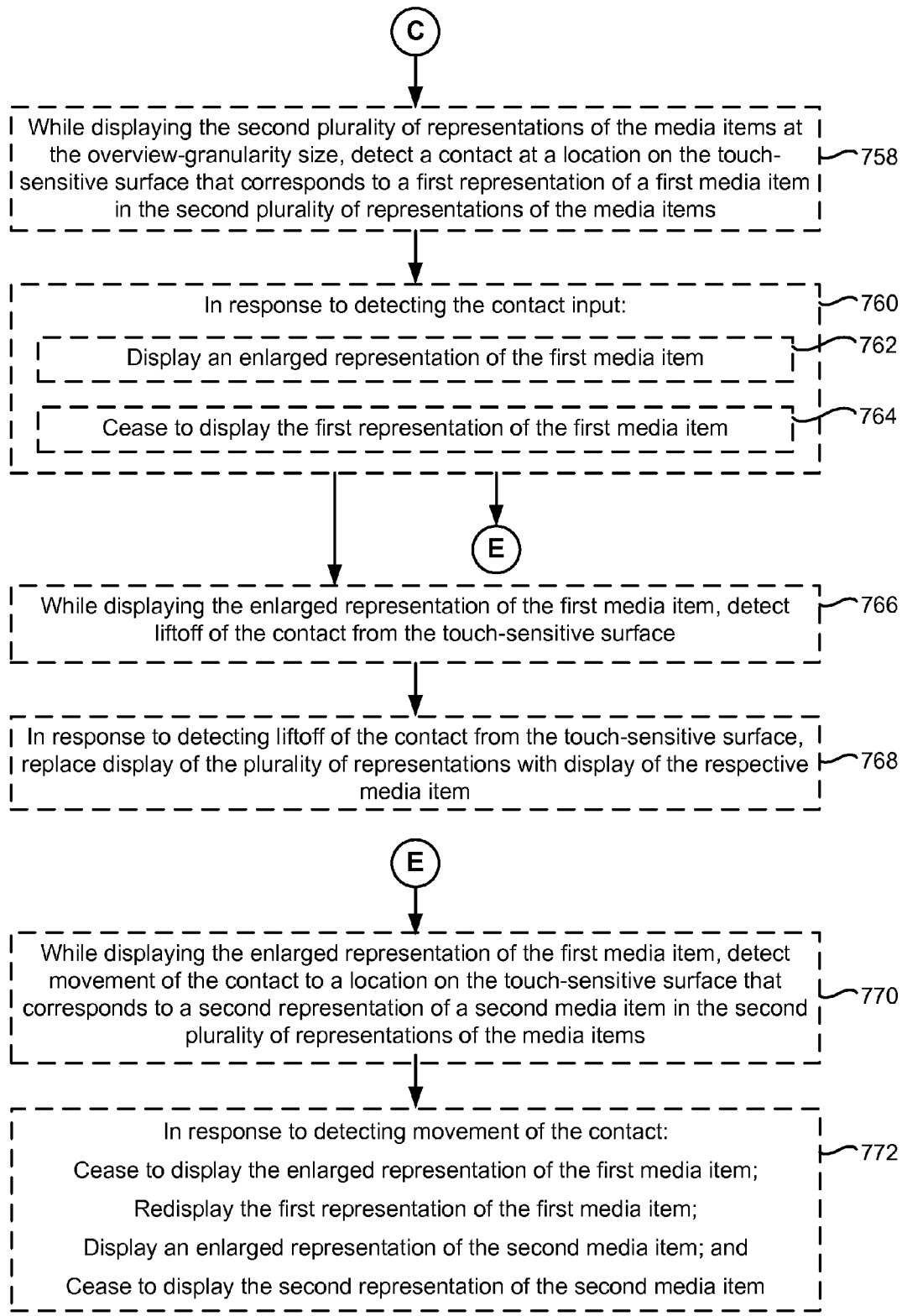

FIG. 5R illustrates displaying month 540c (e.g., January 2013) associated with affordance 591c in response to detecting the tap gesture in FIG. 5Q. In FIG. 5R, a plurality of events 502c, 502f (e.g., entitled New Year's Eve Party 506c and Suzanne's Birthday Party 506f, respectively) occurring in month 540c (e.g., January 2013) are displayed. One or more representations of media items (e.g., 510c and 510f) associated with corresponding events 502c, 502f are also displayed in FIG. 5R. FIG. 5R further illustrates detecting a tap gesture with contact 594 over respective representation 596 within the one or more representations of media items 510c associated with event 502c on touch screen 112.

FIG. 5S illustrates displaying a respective media item 598 (e.g., a full-size image) corresponding to the respective representation 596 in a photo view 578 in response to detecting the tap gesture in FIG. 5R. In FIG. 5S, a multi-item event 502c associated with the respective item 576 is displayed and an indicator 580 corresponding to the number associated with the respective item 598 within event 502c is displayed. The event title 506c (e.g., New Year's Eve Party) and event location 508c (e.g., San Francisco) for event 502c are also displayed in FIG. 5S.

Thus, in some embodiments, an event that spans two months or two years is displayed in event groups for both months and/or both years (e.g., the New Year's Eve Party event is grouped with both the December events and the January events). In some embodiments, even if an event is grouped with multiple different events groups, the images from the event are not repeated in the year view (e.g., the view shown in FIG. 5K). For example, the last row of representations in 2012 in FIG. 5K would include representations that correspond to images from December 31 at the New Year's Eve Party, while the first row of representations of 2013 would include representations that correspond to images from January 1 at the New Year's Eve Party.

FIGS. 6A-6E are flow diagrams illustrating a method 600 of dividing a collection of media items into a plurality of multi-item events in accordance with some embodiments. The method 600 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 600 are, optionally, combined and/or the order of some operations is, optionally, changed.

As described below, the method 600 provides an intuitive way to divide a collection of media items into a plurality of multi-item events. The method reduces the cognitive burden on a user when dividing a collection of media items into a plurality of multi-item events, thereby creating a more efficient human-machine interface. For battery-operated electronic devices, enabling a user to divide a collection of media items into a plurality of multi-item events faster and more efficiently conserves power and increases the time between battery charges.

The device obtains (602) a collection of media items (e.g., a "library" of images and/or videos), where the media items are ordered in a chronological order in accordance with a time indicator associated with each of the media items.

The device determines (604) one or more patterns in the collection of media items based at least in part on a comparison between properties of sequentially adjacent media items in the collection of media items (e.g., in the chronological order). FIG. 5A, for example, shows the device displaying a plurality of respective events (e.g., 502a, 502b, 502c, 502d) related to corresponding groups of media items in a collection of sequentially adjacent media items. The device divides the collection of media items (or a portion of the collection) into groups (or respective events 502) by identifying one or more patterns based on a comparison between properties of sequentially adjacent media items.

The device divides (606) the collection of media items into multiple events (e.g., dividing the collection of media items into multiple events automatically without user intervention) that includes a plurality of multi-item events, where: each multi-item event includes (608) a plurality of the media items with time indicators within a corresponding event time range; and the event time range for a multi-item event is selected (610) in accordance with the one or more patterns determined in the collection of media items. FIG. 5A, for example, shows the device displaying a plurality of multi-item events 502a, 502b, 502c, 502d within an events view 503 on touch screen 112. In FIG. 5A, each of the multi-item events includes a plurality of media items (e.g., one or more representations of media items 510a, 501b, 501c, 510d). Further in this example, time ranges for the multi-item events are selected in accordance with a pattern determined in the collection (e.g., event 506c entitled New Year's Eve Party corresponds to media items captured on an evening between Dec. 31, 2012 and Jan. 1, 2013 and event 506d entitled Cross Country Road Trip corresponds to media items captured during a week long road trip in February 2013 from San Francisco to New York City).

In some embodiments, the event time ranges for the plurality of multi-item events are (612) non-overlapping (e.g., there is a sequence of images that are divided at event transition points, creating a set of non-overlapping events). FIG. 5B, for example, shows a plurality of non-overlapping, multi-item events 502b, 502c, 502d, 502e. In FIG. 5B, each of the events encompasses a distinct sequence of media items and no media item is shared between two events.

In some embodiments, the device divides the collection of media items into multiple events by: determining (614) a pattern in the collection of media items that indicates that a respective event occurred over a period of time that includes a respective date-transition boundary (e.g., an end of day boundary such as midnight, an end of week boundary such as midnight on Saturday, an end of month boundary such as midnight on the last day of the month, or an end of year boundary such as an midnight on December 31); and dividing (616) the collection of media items so as to include one or more items with a time indicator before the respective date-transition boundary and one or more items with a time indicator after the respective date-transition boundary (e.g., a December/January vacation is shown as a single event or a Saturday evening/Sunday morning party is shown as a single event). Thus, in some embodiments, date-transition boundaries are not an absolute indicator of event boundaries and when other patterns indicate that a continuous event continued through a respective date-transition boundary, then the respective date-transition boundary is ignored for the purposes of determining the beginning/end of the event. FIG. 5B, for example, shows event 502c entitled New Year's Eve Party which includes media items from both Dec. 31, 2012 and Jan. 1, 2013.

In some embodiments, the device divides the collection of media items into multiple events by identifying (618) a plurality of transition points in the collection of media items. And, one or more of the transition points each correspond to (620) a respective change in a respective pattern of data that corresponds to the collection of media items (other than a date-transition boundary) that occurs at the transition point.

In some embodiments, the respective change in the respective pattern of data that corresponds to a respective media item is based on (622) one or more of: an amount of time (624) between a capture time of the respective media item and a capture time of a sequentially adjacent media item in the chronological order; a change in detected physical location (626) (e.g., detected via geotagging of photos or video) between a capture time of the respective media item and a capture time of a sequentially adjacent media item in the chronological order; a change in detected altitude (628) (e.g., detected using a barometer integrated into the device) between a capture time of the respective media item and a capture time of a sequentially adjacent media item in the chronological order; a change in detected speed (630) (e.g., detected via accelerometers or location tracking history, such as GPS) between a capture time of the respective media item and a capture time of a sequentially adjacent media item in the chronological order; a change in detected network connections (632) between a capture time of the respective media item and a capture time of a sequentially adjacent media item in the chronological order; a change in weather (634) (e.g., recorded from a weather app) between a capture time of the respective media item and a capture time of a sequentially adjacent media item in the chronological order; a change in physiological indicators (e.g., heart rate, temperature, EKG patterns) of a user (636) between a capture time of the respective media item and a capture time of a sequentially adjacent media item in the chronological order; a difference between individuals (638) associated with (or, identified in (e.g., via face recognition, metadata tags, or network connection identifiers)) a first plurality of media items prior to the respective media item in the chronological order and associated with (or, identified in (e.g., via face recognition, metadata tags, or network connection identifiers)) a second plurality of media items after the respective media item in the chronological order; and a difference in rate of change of location over time (640) between captures time of a first plurality of media items prior to the respective media item in the chronological order and a rate of change of location over time between a capture times of a second plurality of media items after the respective media item in the chronological order.

In a first example, metadata associated with a first plurality of media items indicates capture times on Feb. 14, 2013 and metadata associated with a second plurality of media items (sequentially adjacent to the first plurality) indicates a capture time on Mar. 1, 2013. Thus, in this example, the device identifies a transition point between the first plurality of media items and the second plurality of media items based on an amount of time between capture times and divides the first plurality of media items and the second plurality of media items into separate events.

In another example, metadata associated with a first plurality of media items indicates that the corresponding plurality of media items were captured in Hawaii (e.g., based on GPS data or geotagging) and metadata associated with a second plurality of media items (sequentially adjacent to the first plurality) in event indicates that the corresponding plurality of media items were captured in San Francisco. Thus, in this example, the device identifies a transition point between the first plurality of media items and the second plurality of media items based on a change in detected physical location and divides the first plurality of media items and the second plurality of media items into separate events (e.g., a Hawaii Vacation event and a Bay to Breakers event).

In another example, metadata associated with a first plurality of media items indicates that the corresponding plurality of media items were captured above 10,000 feet (e.g., based on barometer data) and metadata associated with a second plurality of media items (sequentially adjacent to the first plurality) indicates that the corresponding plurality of media items were captured below sea level. Thus, in this example, the device identifies a transition point between the first plurality of media items and the second plurality of media items based on a change in detected altitude and divides the first plurality of media items and the second plurality of media items into separate events (e.g., a Mount Whitney Hiking event and a Salton Sea Drive event).

In another example, metadata associated with a first plurality of media items indicates that the corresponding plurality of media items were captured while moving in excess of 60 miles per hour (e.g., based on accelerometer data) and metadata associated with a second plurality of media items (sequentially adjacent to the first plurality) indicates that the corresponding plurality of media items were captured while moving no faster than 15 miles per hour. Thus, in this example, the device identifies a transition point between the first plurality of media items and the second plurality of media items based on a change in detected speed and divides the first plurality of media items and the second plurality of media items into separate events (e.g., a Performance Driving Road Test event and a Horseback Riding event).

In another example, metadata associated with a first plurality of media items indicates that the corresponding plurality of media items were captured while in Germany (e.g., based on detected telecommunication network connections) and metadata associated with a second plurality of media items (sequentially adjacent to the first plurality) indicates that the corresponding plurality of media items were captured while in Austria (e.g., based on detected telecommunication network connections). Thus, in this example, the device identifies a transition point between the first plurality of media items and the second plurality of media items based on a change in detected network connections and divides the first plurality of media items and the second plurality of media items into separate events (e.g., a Munich Day Photos event and a Salzburg Evening Concert event).

In another example, metadata associated with a first plurality of media items indicates that the corresponding plurality of media items were captured on a sunny day with a high temperature in the upper 70s (e.g., based on data from a weather app) and metadata associated with a second plurality of media items (sequentially adjacent to the first plurality) indicates that the corresponding plurality of media items were captured on a snowy day with a high temperature in the low 20s. Thus, in this example, the device identifies a transition point between the first plurality of media items and the second plurality of media items based on a change in weather and divides the first plurality of media items and the second plurality of media items into separate events (e.g., a Coronado Beach event and a Snowbird Snowboarding event).

In another example, metadata associated with a first plurality of media items indicates that the corresponding plurality of media items were captured while a user's heart rate was under 60 beats per minute (e.g., based on detected heart rate data) and metadata associated with a second plurality of media items (sequentially adjacent to the first plurality) indicates that the corresponding plurality of media items were captured while a user's heart rate was in excess of 100 beats per minute. Thus, in this example, the device identifies a transition point between the first plurality of media items and the second plurality of media items based on a change in physiological indicators of a user and divides the first plurality of media items and the second plurality of media items into separate events (e.g., a Golden Gate Yoga event and a Skydiving event).

With respect to identifying a transition point based on the difference between individuals associated with a first plurality of media items and a second plurality of media items, if, for example, a first set of photos includes many photos with different subsets of a first group of people and a second set of photos includes many photos with different subsets of a second group of people that is substantially different than the first group of people, then the device will determine that the photos of the first group of people (and other photos near in time to those photos) correspond to a first event and the photos of the second group of people (and other photos near in time to those photos) correspond to a second event different from the first event.

With respect to identifying a transition point based on the difference in rate of change of location over time, if, for example, a set of photos indicates that a user is driving 300 miles per day (e.g., photos from consecutive days or the same day have geographical coordinates that are 300 miles or more apart), then the user is probably on a road trip, and if a set of photos subsequently indicates that the user is relatively stationary (e.g., photos from consecutive days have geographical coordinates within a 50 mile radius) then the user has probably ended the road trip and the road trip will be identified as an event with start and stop times indicated by the change in the daily traveling distance of the user as indicated by the geotagging information of the user's photos.

In some embodiments, after dividing (642) the collection of media items into multiple events, the device groups (644) a set of consecutive events that include two or more of the multi-item events into a respective pattern-based event group based at least in part on the one or more patterns in the collection of media items, where: the pattern-based event group is divided (646) from other event pattern-based groups in accordance with a change in a first pattern in the collection of media items the corresponds to the pattern-based event group; and a respective multi-item event within the pattern-based event group is divided (648) from other events in the pattern-based event group in accordance with a change in a second pattern in the collection of media items, where the change in the second pattern does not correspond to a change in (e.g., does not break) the first pattern that corresponds to the pattern-based event group.

With respect to the first pattern, for example, the user's photo library includes a sequence of photos indicating that the user travelled to Hawaii (e.g., based on geotagging information for photos in the user's photo library that include a group of photos at a location other than Hawaii followed by a group of photos in Hawaii). FIG. 5A, for example, shows event 502*b* entitled Hawaii Vacation associated with the first pattern. With respect to the second pattern, for example, the user's photo library includes a sequence of photos indicating that the user travelled from Kauai to Maui while in Hawaii (e.g., based on geotagging information for photos in the user's photo library that include a group of photos in Kauai followed by a group of photos in Maui). FIG. 5C, for example, shows a plurality of sub-events 518 (e.g., sub-event 518*a* related to Oahu, sub-event 518*b* related to Kauai, and sub-event 518*c* related to Maui) within event 502*b* related to the Hawaii Vacation.

In some embodiments, after dividing (642) the collection of media items into multiple events, the device groups (650) a set of consecutive events that include two or more of the multi-item events into a plurality of date-based event groups (e.g., content-based events are grouped into date-based event groups such as grouping the events by "month," "season," and/or "year") that includes: a first date-based event group that includes (652) a first set of events that include items with time indicators within a first date range; and a second date-based event group that includes a second set of events that include items with time indicators within a second date range. In some embodiments, the second date range does not overlap with the first date range. FIG. 5H, for example, shows a months view 513 including a plurality of selectable date-based event groups (e.g., months 540*a*, 540*b*, 540*c*, 540*d*). For example, event 502*b* (shown in FIG. 5A) is grouped into month 540*b*, event 502*c* (shown in FIG. 5A) is grouped into months 540*b* and 540*c*, and event 502*d* (shown in FIG. 5A) is grouped into month 540*d*. FIG. 5I, for example, shows a seasons view 551 including a plurality of selectable date-based event groups (e.g., seasons 552*a*, 552*b*, 552*c*, 552*d*). FIG. 5J, for example, shows a years view 561 including a plurality of date-based event groups (e.g., years 562*a*, 562*b*, 562*c*).

And, in some embodiments, a respective event includes (654) one or more items with time indicators in the first date range and one or more items with time indicators in the second date range; and the respective event is included in both the first date-based event group and the second date-based event group. For example, photos (or media items) from event 502*c* entitled New Year's Eve Party (shown in FIG. 5A) including photos from Dec. 31, 2012 and Jan. 1, 2013 appear in month group 540*b* related to December 2012 and 540*c* related to January 2013 (shown in FIG. 5H), seasons group 552*c* related to Winter 2012-2013 (shown in FIG. 5I), and year group 562*b* related to 2012 and year group 562*c* related to 2013 (shown in FIG. 5J). In some embodiments, a user is provided with options for renaming events and/or renaming pattern-based event groups but is not provided with options for renaming date-based event groups. FIGS. 5D-5E, for example, show a user editing sub-event title 507*b* associated with sub-event 518*b* via text input 530. Similarly, for example, the user is enabled to edit event titles 506 and event locations 508 corresponding to events 502 in FIG. 5A.

In some embodiments, the device: receives (656) a request to display a respective portion of the collection of media items; and in response to the request to display the respective portion of the collection of media items, displays (658) representations of a plurality of events that correspond to the respective portion of the collection of media items on the display. FIG. 5A, for example, shows the device displaying events (e.g., 502a, 502b, 502c, 502d) within a date range (e.g., December 2012-February 2013) specified by a user. FIG. 5Q, for example, shows the device displaying months 540a, 540b, 540c, 540d at a user-selected granularity level (e.g., months view 513) near a date selected by a user (e.g., months within winter 2012-2013) via a depinch gesture in FIG. 5P. For example, a user pinch or depinch gesture (e.g., the pinch gesture corresponding to movement of contacts 532 and 534 while displaying months view 513 in FIG. 5H results in displaying seasons view 551 in FIG. 5I or the depinch gesture corresponding to movement of contacts 582 and 584 while displaying years view 561 in FIG. 5O results in displaying seasons view 551 in FIG. 5P) selects a granularity level for displaying events. For example, a vertical scrolling gesture (e.g., including a vertical dragging or swipe gesture) selects events to display within a granularity level (e.g., the vertical drag gesture of contact 514 in FIG. 5A results in viewing a different plurality of events in FIG. 5B). In some embodiments, the granularity level corresponds to a tier of events or event groups that is displayed (e.g., items grouped by event, items grouped by pattern-based event group, items grouped by date-based event group including month, season or year).

In some embodiments, a respective representation (660) of a respective event of the plurality of events includes: an identifier (662) of the respective event (e.g., a user-selected, device-generated or default generated title for the respective event); a list of locations (664) of items in the respective event; and one or more images (668) that correspond to items in the respective event (e.g., thumbnails of photos in the event). FIG. 5A, for example, shows a plurality of multi-item events 502 (e.g., events 502a, 502b, 502c, 502d) (each sometimes called a respective representation of a respective event) within events view 503. In FIG. 5A, each of the plurality of events includes an associated event title or identifier 506 (e.g., Sunday Brunch 506a, Hawaii Vacation 506b, New Year's Eve Party 506c, and Cross Country Road Trip 506d), a list of event location(s) (sometimes herein called a locations identifier) 508 (e.g., San Jose 508a related to event 502a and Oahu, Kauai, Maui 508b related to event 502b), and one or more representations of media items 510 (e.g., 510a, 510b, 510c, 501d). In some embodiments, a respective representation of a media item includes a thumbnail associated with a photo, or a still or a gif image associated with a video.

In some embodiments, the list of locations includes (666) a subset of locations of items in the respective event selected in accordance with location patterns in the respective event (and, optionally, location patterns in the collection of media). In some embodiments, the locations are selected to be the most unique or interesting locations in the respective event, which includes locations that are infrequently visited by the user (e.g., locations for which there are few photos in the photo library at the location) and/or locations for which there is a large block of temporally contiguous photos in the respective event. FIG. 5I, for example, shows season group 552a with corresponding locations indicator 554a including Yosemite, Santa Cruz, and 2 Others. In this example, infrequently visited locations are displayed (e.g., Yosemite, Santa Cruz) in locations indicator 554a and frequently locations (e.g., Sunnyvale and Palo Alto corresponding to the user's workplace and home) are not displayed or truncated from locations indicator 554a (e.g., included as the '2 Others'), so as to emphasize the locations that are most likely to be distinctive or interesting to the user when navigating through the media.

In some embodiments, the one or more images that correspond to items in the respective event are selected so as to (670) represent images associated with the locations in the list of locations. In some embodiments, the device only displays a subset of locations of items in the event, and the device selects thumbnails of photos to display in the representation of the event so that the thumbnails are thumbnails of photos that are geotagged with one of the locations in the subset of locations (e.g., thumbnails of photos that are not geotagged with one of the locations are not includes or are included less frequently than thumbnails of photos that are geotagged with one of the locations). In some embodiments, the locations in the subset of locations are the locations that were determined to be the most interesting to the user (e.g., photos of infrequently visited locations or photos from large blocks of photos) and thus the photos associated with those locations are more likely be interesting to the user (e.g., photos that are representative of important events in a grouping of events). FIG. 5B, for example, shows one or more images 510d related to event 502d entitled Cross Country Road. In this example, the one or more images 510d include images associated with the locations (e.g., Reno, Salt Lake City and Cheyenne) displayed in the list of locations 508d.

In some embodiments, the representations of the plurality of events includes (672) a first representation of a first event that includes a first plurality of representative images, and the representations of the plurality of events includes a second representation of a second event that includes a second plurality of representative images. For example, in FIG. 5C, each of the respective sub-events 518 includes a plurality of representations of media items (e.g., 511a, 511b, 511c) (sometimes called representative images) corresponding to the respective sub-event.

And, in some embodiments, the device receives (674) a request to move a respective representative image from the first plurality of representative images to the second plurality of representative images (e.g., a touch and drag gesture from the respective image to the second representation of the second event); and in response to receiving the request to move the respective representative image, the device moves (676) an item that corresponds to the respective representative image from the first event to the second event. In some embodiments, the respective representative image is moved from the first representation of the first event to the second representation of the second event in response to receiving the request. In FIG. 5C, for example, the device detects a dragging gesture of contact 520 from location 520a to location 520b, and in response to detecting the dragging gesture, the device moves the respective representation 522 within the plurality of representations of media items 511c associated with sub-event 518c to the respective plurality of representations of media items 511b associated with sub-event 518b. FIG. 5D, for example, shows the device displaying the respective representation 522 within the plurality of representations of media items 511b associated with sub-event 518b in response to the dragging gesture in FIG. 5C.

It should be understood that the particular order in which the operations in FIGS. 6A-6E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 600 described above with respect to FIGS. 6A-6E. For example, the contacts, granularity levels, media items, representations of media items, events, event groups, and other user interface elements described above with reference to method 600 optionally have one or more of the characteristics of the contacts, granularity levels, media items, representations of media items, events, event groups, and other user interface elements described herein with reference to other methods described herein (e.g., method 700). For brevity, these details are not repeated here.

FIGS. 7A-7D are flow diagrams illustrating a method 700 of organizing a collection of media items into a hierarchy of granularity levels in accordance with some embodiments. The method 700 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 700 are, optionally, combined and/or the order of some operations is, optionally, changed.

As described below, the method 700 provides an intuitive way to organize a collection of media items into a hierarchy of granularity levels. The method reduces the cognitive burden on a user when organizing a collection of media items into a hierarchy of granularity levels, thereby creating a more efficient human-machine interface. For battery-operated electronic devices, enabling a user to organize a collection of media items into a hierarchy of granularity levels faster and more efficiently conserves power and increases the time between battery charges.

The device obtains (702) a collection of media items (e.g., a "library" of images and/or video), where the media items are organized into a hierarchy of granularity levels that includes one or more detailed-granularity levels within one or more overview-granularity levels. For example, the hierarchy of granularity levels includes an events view 503 displayed at a detailed-granularity level (shown in FIG. 5A), a months view 513 displayed at a detailed-granularity level (shown in FIG. 5H), a seasons view 551 displayed at a detailed-granularity level (shown in FIG. 5I), and a years view 561 displayed at an overview-granularity level (shown in FIG. 5J).

The device receives (704) a first request to display a first portion of the collection organized in accordance with a first detailed-granularity level. FIG. 5A, for example, shows a first portion of the collection of media items displayed in an events view 503 with a plurality of multi-item events 502 organized in accordance with a first detailed-granularity level.

In some embodiments, the first detailed-granularity level corresponds to (706) a first timescale (e.g., a month). FIG. 5H, for example, shows the device displaying a portion of the collection of media items in a months view 513 with a plurality of month groups 540 corresponding to a month timescale.

In response to the first request, the device displays (708) a first plurality of representations of the media items. FIG. 5H, for example, shows the device displaying a plurality of representations of media items (e.g., 545a, 545b, 545c, 545d) for the month groups 540. In some embodiments, a respective representation is a thumbnail image associated with a photo or a video.

The first plurality of representations is displayed (710) at a detailed-granularity size. For example, in FIG. 5H, the respective pluralities of representations of media items (e.g., 545a, 545b, 545c, 545d) are displayed at a detailed-granularity size. Similarly, in FIG. 5A, for example, the respective pluralities of representations of media items (e.g., 510a, 510b, 510c, 510d) are displayed at a detailed-granularity size. Also, in FIG. 5I, for example, the respective pluralities of representations of media items (e.g., 555a, 555b, 555c, 555d) are displayed at a detailed-granularity size.

In some embodiments, the detailed-granularity size is (712) above a minimum object-selection size (e.g., 44×44 points/pixels). FIG. 5R, for example, shows the device detecting a tap gesture with contact 594 over respective representation 596 within a plurality of representations of media items 510c associated with event 502c. In FIG. 5R, the representations in the respective plurality of representations of media items 510c are displayed at the detailed-granularity size, and the representations in the respective plurality of representations of media items 510c are selectable (e.g., each representation is equal to or greater than 44×44 points/pixels in size).

The first plurality of representations are spaced (714) apart from each other by a detailed-granularity distance. In FIG. 5H, for example, the representations in a respective plurality of representations of media items (e.g., 545a, 545b, 545c, 545d) are spaced apart from an adjacent representation by a detailed-granularity distance. Similarly, in FIG. 5A, for example, the representations in a respective plurality of representations of media items (e.g., 510a, 510b, 510c, 510d) are spaced apart from an adjacent representation by a detailed-granularity distance. Also, in FIG. 5I, for example, the representations in a respective plurality of representations of media items (e.g., 555a, 555b, 555c, 555d) are spaced apart from an adjacent representation by a detailed-granularity distance.

In some embodiments, the detailed-granularity distance is (716) greater than an object-selection margin (e.g., a spacing that enables users to easily distinguish and select between different image thumbnails).

In some embodiments, the first representation of the media items in the first plurality of representations of the media items that correspond to the first detailed-granularity level includes (718) images that correspond to a subset of items in a first time range. FIG. 5I, for example, shows a first plurality of representations of the media items 555a that corresponds to media items related to a first time range designated by season group 552a (e.g., Summer 2012). FIG. 5I, for example, further shows a second plurality of representations of the media items 555b that corresponds to media items related to a second time range designated by season group 552b (e.g., Fall 2012).

In some embodiments, the first plurality of representations that correspond to the first detailed-granularity level is grouped (720) into a plurality of groups and different groups of representations in the first plurality of representations are separated by at least a first distance (e.g., group descriptions or event titles between granularity levels). FIG. 5Q, for example, shows description box 589 corresponding to month group 540c including month title 542c (e.g., January 2013) and location(s) indicator 544c (e.g., San Francisco) between a first group of representations 545c related to month group 540c and a second group of representations 545b related to month group 540b. In this example, the height of description box 589 is the first distance.

The device receives (722) a second request to display a second portion of the collection organized in accordance with a respective overview-granularity level that corresponds to multiple detailed-granularity levels. FIG. 5J, for example, shows a second portion of the of the collection of media items displayed in a years view 661 with a plurality of year groups 562 organized in accordance with an overview-granularity level. FIG. 5J, for example, further shows a respective plurality of representations of media items (e.g., 566a, 566b, 566c) displayed for different years 562, where the respective pluralities of representations of media items include media items corresponding to multiple detailed-granularity levels (e.g., 566b includes media items from the months and seasons in 2012).

In some embodiments, the overview-granularity level corresponds to (724) a third timescale larger than the second timescale (e.g., a year). FIG. 5J, for example, shows the device displaying a portion of the collection of media items in a years view 661 with a plurality of year groups 562 corresponding to year timescales.

In response to the second request, the device displays (726) a second plurality of representations of the media items. FIG. 5J, for example, shows the device displaying a respective plurality of representations of media items (e.g., 566a, 566b, 566c) for corresponding year groups 562.

The second plurality of representations are displayed (728) at an overview-granularity size, smaller than the detailed-granularity size. In FIG. 5J, for example, a respective plurality of representations of media items (e.g., 566a, 566b, 566c) is displayed at an overview-granularity size. For example, the overview-granularity size of a respective representation in a respective plurality of representations of media items 566a (shown in FIG. 5J) is less than the detailed-granularity size of a respective representation in a respective plurality of representations of media items 555a (shown in FIG. 5I) or 545a (shown in FIG. 5H) or 510a (shown in FIG. 5A).

In some embodiments, the overview-granularity size is (730) below the minimum object-selection size. FIG. 5J, for example, shows the device detecting a tap gesture with contact 568 over a respective representation of a media item in the plurality of representations of media items 566a. FIG. 5K, for example, shows the device continuing to display the plurality of representations of media items 566a in response to detecting the tap gesture in FIG. 5J. In FIGS. 5J-5K, the respective representations in the plurality of representations of media items 566a are displayed at the overview-granularity size, and the respective representations in the plurality of representations of media items 566a are not selectable (e.g., each respective representation is less than 44×44 points/pixels). As shown in FIGS. 5J-5K, the respective representation is unaffected by the tap gesture with contact 568 over the respective representation.

The second plurality of representations are spaced (732) apart from each other by a overview-granularity distance, smaller than the detailed-granularity distance. In FIG. 5J, for example, the representation in a respective plurality of representations of media items (e.g., 566a, 566b, 566c) are spaced apart from adjacent representations by an overview-granularity distance. For example, the overview-granularity distance between respective representations in a respective plurality of representations of media items 566a (shown in FIG. 5J) is less than the detailed-granularity distance between respective representations in a respective plurality of representations of media items 555a (shown in FIG. 5I) or 545a (shown in FIG. 5H) or 510a (shown in FIG. 5A). In some embodiments, overview-granularity distance is unperceivable to the human eye or is non-existent.

In some embodiments, the overview-granularity distance is (734) smaller than the object-selection margin. In some embodiments, the overview-granularity spacing is zero and the representations in the overview-granularity are adjacent to each other (e.g., as shown in FIG. 5J).

In some embodiments, a second representation of the media items in the second plurality of representations of the media items that correspond to the overview-granularity level includes (736): images that correspond to the subset of items in the first time range; and one or more images of items in the first time range that were omitted from the images included in the first representation of the media items. Thus, in some embodiments, the device omit thumbnails of photos when displaying a representation of an event (e.g., in events view 503) or event group (e.g., in months view 513 or seasons 551) but then displays thumbnails of the omitted photos when displaying an overview of photos taken over the course of a year (e.g., in years view 661) that includes the event.

In some embodiments, the second plurality of representations that correspond to the overview-granularity level are grouped (738) into a plurality of groups and different groups of representations in the second plurality of representations are separated by a second distance that is smaller than the first distance (e.g., no white space between different years). FIG. 5J, for example, shows a first group of representations 566a corresponding to year group 562a separated from a second group of representations 566b corresponding to year group 562b separated by a second distance (e.g., line or border 567) smaller than the first distance (e.g., description box 589 in FIG. 5Q).

In some embodiments, the device receives (740) a third request to display a third portion of the collection organized in accordance with a second detailed-granularity level different from the first detailed-granularity level (e.g., an event group granularity level rather than an event granularity level, a month granularity level instead of an event group granularity level, or a season granularity level rather than a month granularity level). FIG. 5I, for example, shows the device displaying a seasons view 541 in accordance with a second detailed-granularity level (e.g., a season granularity level) in response to detecting a pinch gesture in FIG. 5H, where the device displayed a months view 513 in accordance with a first detailed-granularity level (e.g., a month granularity level) in FIG. 5H.

In some embodiments, the second detailed-granularity level corresponds (742) to a second timescale larger than the first timescale (e.g., a multi-month timescale such as a three month "season"). FIG. 5I, for example, shows the device displaying a seasons view 541 at the second detailed-granularity level corresponding to a multi-month or seasons timescale. In contrast, FIG. 5H, for example, shows the device displaying a months view 513 at the first detailed-granularity level corresponding to single month timescale.

In some embodiments, in response to the third request, the device displays (744) a third plurality of representations of the media items. FIG. 5I, for example, shows the device displaying a seasons view 551 with a plurality of seasons 552a, 552b, 552c, 552d, where a corresponding plurality of representations of the media items 555a, 555b, 555c, 555d is displayed for the corresponding season.

In some embodiments, the third plurality of representations are displayed (746) at the detailed-granularity size. As noted above, FIG. 5I, for example, shows a plurality of representations of media items (e.g., 555*a*, 555*b*, 555*c*, 555*d*) for corresponding seasons 552 displayed at a detailed-granularity size. In some embodiments, the third plurality of representations are spaced apart (748) from each other by the detailed-granularity distance. As noted above, in FIG. 5I, for example, the representations in a respective plurality of representations of media items (e.g., 555*a*, 555*b*, 555*c*, 555*d*) are spaced apart from an adjacent representation by a detailed-granularity distance.

In some embodiments, the device detects (750) a tap input at a location on the touch-sensitive surface that corresponds to a respective representation of a respective media item. FIG. 5R, for example, shows the device detecting a tap gesture with contact 594 over respective representation 596 within the plurality of representations of media items 510*c* associated with event 502*c*. FIG. 5J, for example, also shows the device detecting a tap gesture with contact 568 over a respective representation of a media item in the plurality of representations of media items 566*a*.

In some embodiments, in response (752) to detecting the tap input, the device replaces (754) display of the plurality of representations with display of the respective media item in accordance with a determination that the respective representation was displayed in a plurality of representations displayed at the detailed-granularity size. In accordance with a determination that the respective representation 596 in the plurality of representations of media items 510*c* in FIG. 5R was displayed at the detailed-granularity size, FIG. 5S, for example, shows the device displaying a respective media item 598 (e.g., a full-size image) corresponding to the respective representation 596 in a photo view 578 in response to detecting the tap gesture with contact 594 in FIG. 5R.

In some embodiments, in response to detecting the tap input, the device continues (756) to display of the plurality of representations in accordance with a determination that the respective representation was displayed in a plurality of representations displayed at the overview-granularity size (e.g., without displaying the respective media item). In accordance with a determination that the respective representation of a media item in the plurality of representations of media items 566*a* in FIG. 5J was displayed at the overview-granularity size, FIG. 5K, for example, shows the device continuing display of the plurality of representations 566*a* (and forgoing display of a respective media item corresponding to the respective representation) in response to detecting the tap gesture with contact 568 in FIG. 5J.

In some embodiments, while displaying the second plurality of representations of the media items at the overview-granularity size, the device detects (758) a contact (e.g., for more than a predetermined amount of time such as 0.05, 0.1, 0.2, 0.5 seconds or some other reasonable period of time) at a location on the touch-sensitive surface that corresponds to a first representation of a first media item in the second plurality of representations of the media item. FIG. 5L, for example, shows the device detecting a press and hold gesture with contact 570 over a first respective representation of a media item in the plurality of representations of media items 566*a* displayed at the overview-granularity size.

In some embodiments, in response to detecting (760) the contact, the device displays (762) an enlarged representation of the first media item (e.g., while continuing to display other representations in the second plurality of representations of the media items). FIG. 5L, for example, shows the device displaying an enlarged representation (or a preview) 572 of the first respective representation in response to detecting contact 570 over the first respective representation for more than a predetermined amount of time (e.g., 0.05, 0.1, 0.2, 0.5 seconds or some other reasonable period of time).

In some embodiments, in response to detecting (760) the contact, the device also ceases (764) to display the first representation of the first media item. FIG. 5L, for example, further shows the device ceasing display of the first respective representation in the plurality of representations of media items 566*a* in response to detecting contact 570 over the first respective representation for more than a predetermined amount of time.

In some embodiments, while displaying the enlarged representation of the first media item, the device: detects (766) liftoff of the contact from the touch-sensitive surface; and in response to detecting liftoff of the contact from the touch-sensitive surface, replaces (768) display of the plurality of representations with display of the respective media item. FIG. 5N, for example, shows the device displaying a respective media item 576 (e.g., a full-size image) corresponding to the first respective representation in a photo view 578 in response to detecting liftoff of contact 570 from position 570*a* in FIG. 5L. FIG. 5N, for example, further shows the device displaying the respective media item 576 in the photo view 578 in place of the years view 661 in FIG. 5L.

In some embodiments, while displaying the enlarged representation of the first media item, the device detects (770) movement of the contact to a location on the touch-sensitive surface that corresponds to a second representation of a second media item in the second plurality of representations of the media items. FIG. 5M, for example, shows the device detecting movement of contact 570 to position 570*b* (from position 570*a* in FIG. 5L) over a second respective representation of a media item in the plurality of representations of media items 566*a*. In some embodiments, in response to detecting movement of the contact, the device: ceases (772) to display the enlarged representation of the first media item; redisplays the first representation of the first media item; displays an enlarged representation of the second media item (e.g., while continuing to display other representations in the second plurality of representations of the media items); and ceases to display the second representation of the second media item. In response to detecting the movement of contact 570 from position 570*a* to 570*b*, FIG. 5M, for example, shows the device ceasing display of the enlarged representation 572 and redisplaying the first representations 569 in the plurality of representations of media items 566*a*. In response to detecting the movement of contact 570 from position 570*a* to 570*b*, FIG. 5M, for example, also shows the device displaying an enlarged representation 574 corresponding to the second respective representation and ceasing display of the second respective representation in the plurality of representations of media items 566*a*. In some embodiments, the second respective representation is adjacent to the first respective representation in the plurality of representations of media items 566*a* and distinct from the first respective representation. In this example, the first and second representations are sequentially adjacent images in a sequence of images related to an event entitled Desert Trip (as shown in FIG. 5N).

It should be understood that the particular order in which the operations in FIGS. 7A-7D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 600) are also applicable in an analogous manner to method 700 described above with respect to FIGS. 7A-7D. For example, the contacts, granularity levels, media items, representations of media items, events, event groups, and other user interface elements described above with reference to method 700 optionally have one or more of the characteristics of the contacts, granularity levels, media items, representations of media items, events, event groups, and other user interface elements described herein with reference to other methods described herein (e.g., method 600). For brevity, these details are not repeated here.

Figure 8:
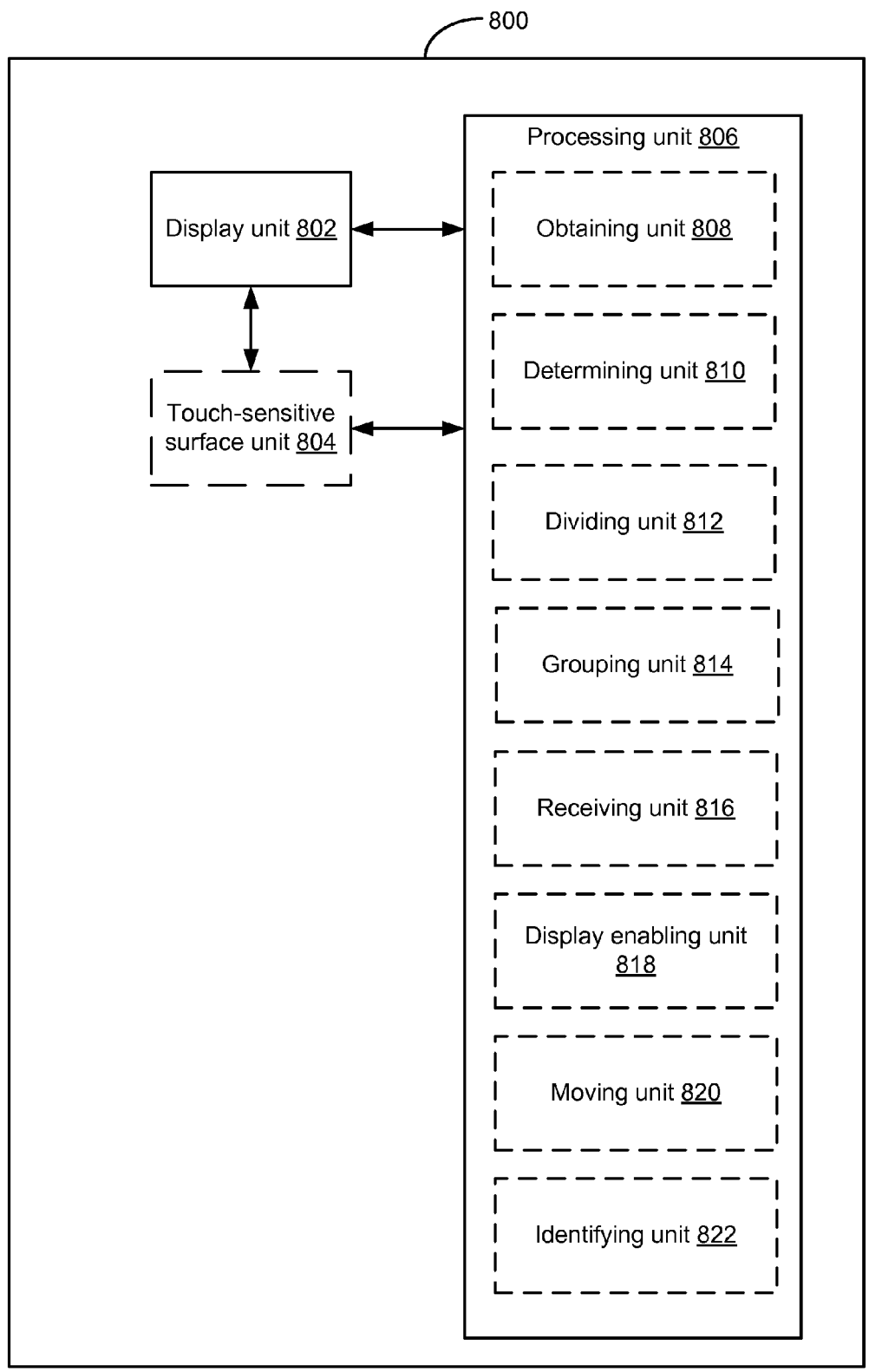
FIG. 8 is a functional block diagram of an electronic device in accordance with some embodiments.

In accordance with some embodiments, FIG. 8 shows a functional block diagram of an electronic device 800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 8 are, optionally, combined or separated into sub-blocks to implement the principles of the various described embodiments. Therefore, the description herein optionally supports any possible combination or separation or further definition of the functional blocks described herein.

As shown in FIG. 8, an electronic device 800 includes a display unit 802 configured to display a graphic user interface, optionally, a touch-sensitive surface unit 804 configured to receive contacts, and a processing unit 806 coupled to the display unit 802 and, optionally, the touch-sensitive surface unit 804. In some embodiments, the processing unit 806 includes an obtaining unit 808, a determining unit 810, a dividing unit 812, a grouping unit 814, a receiving unit 816, a display enabling unit 818, a moving unit 820, and an identifying unit 822.

The processing unit 806 is configured to: obtain (e.g., with obtaining unit 808) a collection of media items, where the media items are ordered in a chronological order in accordance with a time indicator associated with each of the media items; and determine (e.g., with the determining unit 810) one or more patterns in the collection of media items based at least in part on a comparison between properties of sequentially adjacent media items in the collection of media items. The processing unit 806 is further configured to divide (e.g., with the dividing unit 812) the collection of media items into multiple events that includes a plurality of multi-item events, where: each multi-item event includes a plurality of the media items with time indicators within a corresponding event time range; and the event time range for a multi-item event is selected in accordance with the one or more patterns determined in the collection of media items.

In some embodiments, the event time ranges for the plurality of multi-item events are non-overlapping.

In some embodiments, dividing the collection of media items into multiple events includes: determining (e.g., with the determining unit 810) a pattern in the collection of media items that indicates that a respective event occurred over a period of time that includes a respective date-transition boundary; and dividing (e.g., with the dividing unit 812) the collection of media items so as to include one or more items with a time indicator before the respective date-transition boundary and one or more items with a time indicator after the respective date-transition boundary.

In some embodiments, dividing the collection of media items into multiple events includes identifying (e.g., with the identifying unit 822) a plurality of transition points in the collection of media items; and one or more of the transition points each correspond to a respective change in a respective pattern of data that corresponds to the collection of media items that occurs at the transition point.

In some embodiments, the respective change in the respective pattern of data that corresponds to a respective media item is based one or more of: an amount of time between a capture time of the respective media item and a capture time of a sequentially adjacent media item in the chronological order; a change in detected physical location between a capture time of the respective media item and a capture time of a sequentially adjacent media item in the chronological order; a change in detected altitude between a capture time of the respective media item and a capture time of a sequentially adjacent media item in the chronological order; a change in detected between a capture time of the respective media item and a capture time of a sequentially adjacent media item in the chronological order; a change in detected network connections between a capture time of the respective media item and a capture time of a sequentially adjacent media item in the chronological order; a change in weather between a capture time of the respective media item and a capture time of a sequentially adjacent media item in the chronological order; a change in physiological indicators of a user between a capture time of the respective media item and a capture time of a sequentially adjacent media item in the chronological order; a difference between individuals associated with in a first plurality of media items prior to the respective media item in the chronological order and associated with a second plurality of media items after the respective media item in the chronological order; and a difference in rate of change of location over time between captures time of a first plurality of media items prior to the respective media item in the chronological order and a rate of change of location over time between a capture times of a second plurality of media items after the respective media item in the chronological order.

In some embodiments, the processing unit 806 is further configured to: after dividing the collection of media items into multiple events, group (e.g., with the grouping unit 814) a set of consecutive events that include two or more of the multi-item events into a respective pattern-based event group based at least in part on the one or more patterns in the collection of media items, where: the pattern-based event group is divided from other event pattern-based groups in accordance with a change in a first pattern in the collection of media items the corresponds to the pattern-based event group; and a respective multi-item event within the pattern-based event group is divided from other events in the pattern-based event group in accordance with a change in a second pattern in the collection of media items, where the change in the second pattern does not correspond to a change in the first pattern that corresponds to the pattern-based event group.

In some embodiments, the processing unit 806 is further configured to: after dividing the collection of media items into multiple events, group (e.g., with the grouping unit 814) a set of consecutive events that include two or more of the multi-item events into a plurality of date-based event groups that includes: a first date-based event group that includes a first set of events that include items with time indicators within a first date range; and a second date-based event group that includes a second set of events that include items with time indicators within a second date range; and a respective event includes one or more items with time indicators in the first date range and one or more items with time indicators in the second date range; and the respective event is included in both the first date-based event group and the second date-based event group.

In some embodiments, the processing unit 806 is further configured to: receive (e.g., with the receiving unit 816) a request to enable display of a respective portion of the collection of media items; and in response to the request to display the respective portion of the collection of media items, enable display of (e.g., with the display enabling unit 818) representations of a plurality of events that correspond to the respective portion of the collection of media items on the display unit 802.

In some embodiments, a respective representation of a respective event of the plurality of events includes: an identifier of the respective event; a list of locations of items in the respective event; and one or more images that correspond to items in the respective event.

In some embodiments, the list of locations includes a subset of locations of items in the respective event selected in accordance with location patterns in the respective event.

In some embodiments, the one or more images that correspond to items in the respective event are selected so as to represent images associated with the locations in the list of locations.

In some embodiments, the representations of the plurality of events includes a first representation of a first event that includes a first plurality of representative images; the representations of the plurality of events includes a second representation of a second event that includes a second plurality of representative images; and the processing unit 806 is further configured to: receive (e.g., with the receiving unit 816) a request to move a respective representative image from the first plurality of representative images to the second plurality of representative images; and in response to receiving the request to move the respective representative image, move (e.g., with the moving unit 820) an item that corresponds to the respective representative image from the first event to the second event.

The operations described above with reference to FIGS. 6A-6E are, optionally, implemented by components depicted in FIGS. 1A-1B or FIG. 8. For example, obtaining operation 602, determining operation 604, dividing operation 606, determining operations 644 and 650 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 9:
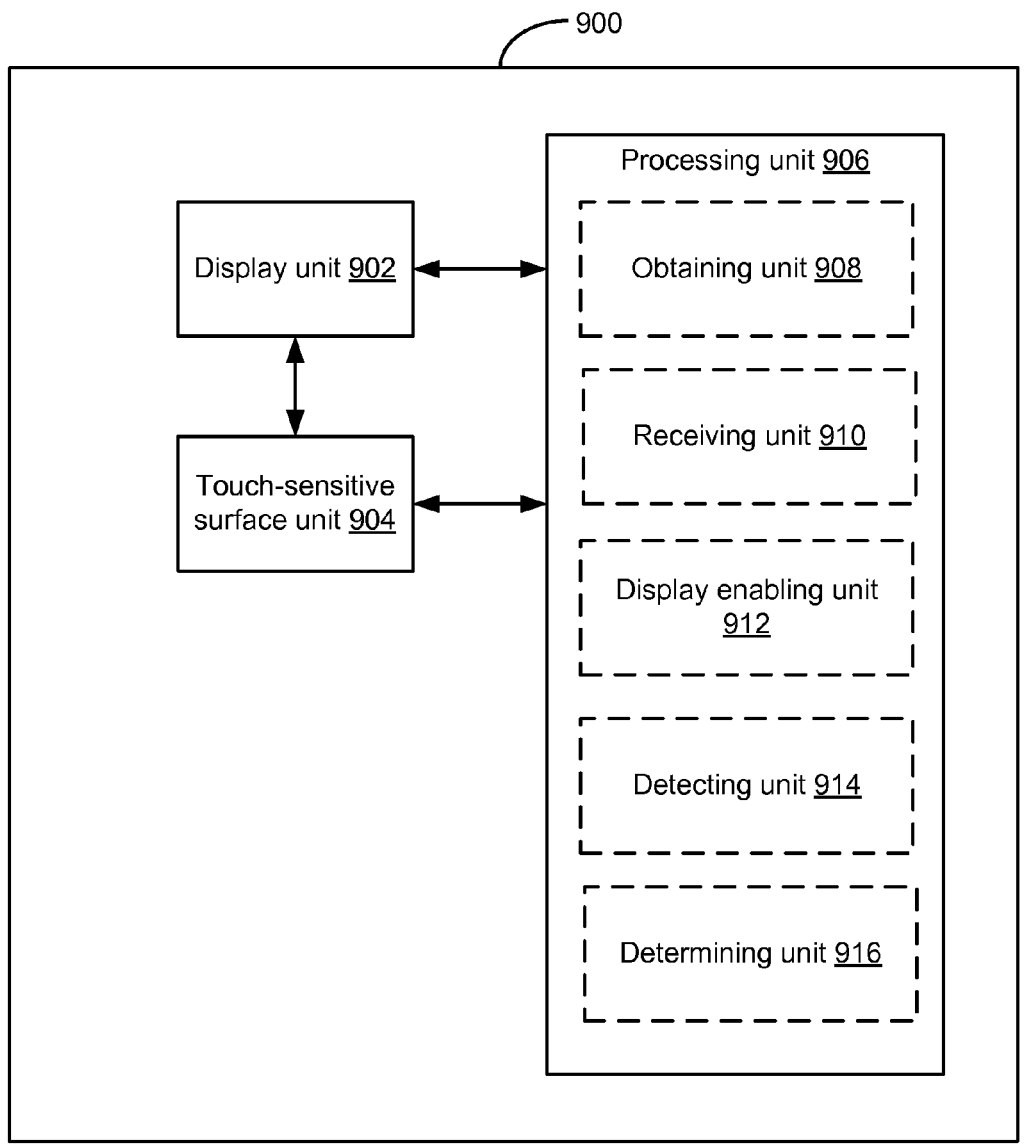
FIG. 9 is a functional block diagram of an electronic device in accordance with some embodiments.

In accordance with some embodiments, FIG. 9 shows a functional block diagram of an electronic device 900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 9 are, optionally, combined or separated into sub-blocks to implement the principles of the various described embodiments. Therefore, the description herein optionally supports any possible combination or separation or further definition of the functional blocks described herein.

As shown in FIG. 9, an electronic device 900 includes a display unit 902 configured to display a graphic user interface, a touch-sensitive surface unit 904 configured to receive contacts, and a processing unit 906 coupled to the display unit 902 and the touch-sensitive surface unit 904. In some embodiments, the processing unit 906 includes an obtaining unit 908, a receiving unit 910, a displaying enabling unit 912, a detecting unit 914, and a determining unit 916.

The processing unit 906 is configured to obtain (e.g., with the obtaining unit 908) a collection of media items, where the media items are organized into a hierarchy of granularity levels that includes one or more detailed-granularity levels within one or more overview-granularity levels. The processing unit 906 is further configured to: receive (e.g., with the receiving unit 910) a first request to enable display of a first portion of the collection organized in accordance with a first detailed-granularity level; and in response to the first request, enable display of (e.g., with the display enabling unit 912) a first plurality of representations of the media items, where: the first plurality of representations are displayed on the display unit 902 at a detailed-granularity size; and the first plurality of representations are spaced apart from each other by a detailed-granularity distance. The processing unit 906 is further configured to: receive (e.g., with the receiving unit 910) a second request to enable display of a second portion of the collection organized in accordance with a respective overview-granularity level that corresponds to multiple detailed-granularity levels; and in response to the second request, enable display of (e.g., with the display enabling unit 912) a second plurality of representations of the media items, where: the second plurality of representations are displayed on the display unit 902 at a overview-granularity size, smaller than the detailed-granularity size; and the second plurality of representations are spaced apart from each other by a overview-granularity distance, smaller than the detailed-granularity distance.

In some embodiments, the processing unit 906 is further configured to: receive (e.g., with the receiving unit 910) a third request enable display of a third portion of the collection organized in accordance with a second detailed-granularity level different from the first detailed-granularity level; and in response to the third request, enable display of (e.g., with the display enabling unit 912) a third plurality of representations of the media items, where: the third plurality of representations are displayed on the display unit 902 at the detailed-granularity size; and the third plurality of representations are spaced apart from each other by the detailed-granularity distance.

In some embodiments, the first detailed-granularity level corresponds to a first timescale; the second detailed-granularity level corresponds to a second timescale larger than the first timescale; and the overview-granularity level corresponds to a third timescale larger than the second timescale.

In some embodiments, a first representation of the media items in the first plurality of representations of the media items that correspond to the first detailed-granularity level includes images that correspond to a subset of items in a first time range; and a second representation of the media items in the second plurality of representations of the media items that correspond to the overview-granularity level includes: images that correspond to the subset of items in the first time range; and one or more images of items in the first time range that were omitted from the images included in the first representation of the media items.

In some embodiments, the detailed-granularity distance is greater than a object-selection margin; and the overview-granularity distance is smaller than the object-selection margin.

In some embodiments, the detailed-granularity size is above a minimum object-selection size; and the overview-granularity size is below the minimum object-selection size.

In some embodiments, the processing unit 906 is further configured to: detect (e.g., with the detecting unit 914) a tap input at a location on the touch-sensitive surface unit 904 that corresponds to a respective representation of a respective media item; and in response to detecting the tap input: in accordance with a determination (e.g., with the determining unit 916) that the respective representation was displayed in a plurality of representations displayed at the detailed-granularity size, replace display of (e.g., with the display enabling unit 912) the plurality of representations with display of the respective media item; and in accordance with a determination (e.g., with the determining unit 916) that the respective representation was displayed in a plurality of representations displayed at the overview-granularity size, continue display of (e.g., with the display enabling unit 912) the plurality of representations.

In some embodiments, the processing unit 906 is further configured to: while displaying the second plurality of representations of the media items at the overview-granularity size, detect (e.g., with the detecting unit 914) a contact at a location on the touch-sensitive surface unit 904 that corresponds to a first representation of a first media item in the second plurality of representations of the media items; and in response to detecting the contact, enable display of (e.g., with the display enabling unit 912) an enlarged representation of the first media item.

In some embodiments, the processing unit 906 is further configured to cease display of (e.g., with the display enabling unit 912) the first representation of the first media item in response to detecting the contact.

In some embodiments, the processing unit 906 is further configured to: while displaying the enlarged representation of the first media item, detect (e.g., with the detecting unit 914) liftoff of the contact from the touch-sensitive surface unit 904; and in response to detecting liftoff of the contact from the touch-sensitive surface unit 904, replace display of (e.g., with the display enabling unit 912) the plurality of representations with display of the respective media item.

In some embodiments, the processing unit 906 is further configured to: while displaying the enlarged representation of the first media item, detect (e.g., with the detecting unit 914) movement of the contact to a location on the touch-sensitive surface unit 904 that corresponds to a second representation of a second media item in the second plurality of representations of the media items; and in response to detecting movement of the contact: cease display of (e.g., with the display enabling unit 912) the enlarged representation of the first media item; enable redisplay of (e.g., with the display enabling unit 912) the first representation of the first media item; enable display of (e.g., with the display enabling unit 912) an enlarged representation of the second media item; and cease display of (e.g., with the display enabling unit 912) the second representation of the second media item.

In some embodiments, the first plurality of representations that correspond to the first detailed-granularity level are grouped into a plurality of groups and different groups of representations in the first plurality of representations are separated by at least a first distance; and the second plurality of representations that correspond to the overview-granularity level are grouped into a plurality of groups and different groups of representations in the second plurality of representations are separated by a second distance that is smaller than the first distance.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 7A-7D are, optionally, implemented by components depicted in FIGS. 1A-1B or FIG. 9. For example, obtaining operation 702; receiving operations 704, 722, and 740; display enabling operations 708, 726, and 744; and detecting operations 750 and 758 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:
1. An electronic device, comprising:
a display;
one or more processors;
a memory; and
one or more programs, wherein the one or more programs are stored in the memory and configured to be executed by the one or more processors, the one or more programs including instructions for:
obtaining a collection of media items, wherein the media items are ordered in a chronological order in accordance with a time indicator associated with each of the media items;
determining one or more patterns in the collection of media items based at least in part on a comparison between properties of sequentially adjacent media items in the collection of media items;
dividing the collection of media items into multiple events that includes a plurality of multi-item events wherein:
each multi-item event includes a plurality of the media items with time indicators within a corresponding event time range; and
the event time range for a multi-item event is selected in accordance with the one or more patterns determined in the collection of media items;
receiving a request to display a first portion of the collection of media items; and,
in response to receiving the request to display the first portion of the collection of media items, displaying representations of a plurality of events that correspond to the first portion of the collection of media items on the display, wherein a displayed first representation of a first event of the plurality of events includes:
an identifier of the first event;
a plurality of locations of items in the first event, wherein the plurality of locations is an automatically generated subset, less than all, of the locations of items in the first event; and
one or more images that correspond to items in the first event.

2. The device of claim 1, wherein the event time ranges for the plurality of multi-item events are non-overlapping.

3. The device of claim 1, wherein dividing the collection of media items into multiple events includes:
determining a pattern in the collection of media items that indicates that a respective event occurred over a period of time that includes a respective date-transition boundary; and
dividing the collection of media items so as to include one or more items with a time indicator before the respective date-transition boundary and one or more items with a time indicator after the respective date-transition boundary.

4. The device of claim 1, wherein:
dividing the collection of media items into multiple events includes identifying a plurality of transition points in the collection of media items; and
one or more of the transition points each correspond to a respective change in a respective pattern of data that corresponds to the collection of media items that occurs at the transition point.

5. The device of claim 4, wherein the respective change in the respective pattern of data that corresponds to a respective media item is based on one or more of:
an amount of time between a capture time of the respective media item and a capture time of a sequentially adjacent media item in the chronological order;
a change in detected physical location between a capture time of the respective media item and a capture time of a sequentially adjacent media item in the chronological order;
a change in detected altitude between a capture time of the respective media item and a capture time of a sequentially adjacent media item in the chronological order;
a change in detected speed between a capture time of the respective media item and a capture time of a sequentially adjacent media item in the chronological order;
a change in detected network connections between a capture time of the respective media item and a capture time of a sequentially adjacent media item in the chronological order;
a change in weather between a capture time of the respective media item and a capture time of a sequentially adjacent media item in the chronological order;
a change in physiological indicators of a user between a capture time of the respective media item and a capture time of a sequentially adjacent media item in the chronological order;
a difference between individuals associated with in a first plurality of media items prior to the respective media item in the chronological order and associated with a second plurality of media items after the respective media item in the chronological order; and
a difference in rate of change of location over time between captures time of a first plurality of media items prior to the respective media item in the chronological order and a rate of change of location over time between a capture times of a second plurality of media items after the respective media item in the chronological order.

6. The device of claim 1, wherein the one or more programs include instructions for, after dividing the collection of media items into multiple events:
grouping a set of consecutive events that include two or more of the multi-item events into a respective pattern-based event group based at least in part on the one or more patterns in the collection of media items, wherein:
the pattern-based event group is divided from other pattern-based event groups in accordance with a change in a first pattern in the collection of media items that corresponds to the pattern-based event group; and
a respective multi-item event within the pattern-based event group is divided from other events in the pattern-based event group in accordance with a change in a second pattern in the collection of media items, wherein the change in the second pattern does not correspond to a change in the first pattern that corresponds to the pattern-based event group.

7. The device of claim 1, wherein the one or more programs include instructions for:
after dividing the collection of media items into multiple events, grouping a set of consecutive events that include two or more of the multi-item events into a plurality of date-based event groups that includes:
a first date-based event group that includes a first set of events that include items with time indicators within a first date range; and
a second date-based event group that includes a second set of events that include items with time indicators within a second date range; wherein:
a second event includes one or more items with time indicators in the first date range and one or more items with time indicators in the second date range; and
the second event is included in both the first date-based event group and the second date-based event group.

8. The device of claim 1, wherein the one or more images that correspond to items in the first event are selected so as to represent images associated with the plurality of locations.

9. The device of claim 1, wherein:
the representations of the plurality of events include the first representation of the first event that includes a first plurality of representative images;
the representations of the plurality of events include a second representation of a second event that includes a second plurality of representative images; and
the one or more programs include instructions for:
receiving a request to move a respective representative image from the first plurality of representative images to the second plurality of representative images; and
in response to receiving the request to move the respective representative image, moving an item that corresponds to the respective representative image from the first event to the second event.

10. The device of claim 1, wherein:
the locations of items in the first event includes frequently visited locations and infrequently visited locations;
the plurality of locations include at least some of the infrequently visited locations; and
the plurality of locations does not include the frequently visited locations.

11. A method, comprising:
at an electronic device with a display, one or more processors and memory:
obtaining a collection of media items, wherein the media items are ordered in a chronological order in accordance with a time indicator associated with each of the media items;
determining one or more patterns in the collection of media items based at least in part on a comparison between properties of sequentially adjacent media items in the collection of media items;
dividing the collection of media items into multiple events that includes a plurality of multi-item events, wherein:
each multi-item event includes a plurality of the media items with time indicators within a corresponding event time range; and
the event time range for a multi-item event is selected in accordance with the one or more patterns determined in the collection of media items;
receiving a request to display a first portion of the collection of media items; and,
in response to receiving the request to display the first portion of the collection of media items, displaying representations of a plurality of events that correspond to the first portion of the collection of media items on the display, wherein a displayed first representation of a first event of the plurality of events includes:
an identifier of the first event;
a plurality of locations of items in the first event, wherein the plurality of locations is an automatically generated subset, less than all, of the locations of items in the first event; and
one or more images that correspond to items in the first event.

12. The method of claim 11, wherein the event time ranges for the plurality of multi-item events are non-overlapping.

13. The method of claim 11, wherein dividing the collection of media items into multiple events includes:
determining a pattern in the collection of media items that indicates that a respective event occurred over a period of time that includes a respective date-transition boundary; and
dividing the collection of media items so as to include one or more items with a time indicator before the respective date-transition boundary and one or more items with a time indicator after the respective date-transition boundary.

14. The method of claim 11, wherein:
dividing the collection of media items into multiple events includes identifying a plurality of transition points in the collection of media items; and
one or more of the transition points each correspond to a respective change in a respective pattern of data that corresponds to the collection of media items that occurs at the transition point.

15. The method of claim 14, wherein the respective change in the respective pattern of data that corresponds to a respective media item is based on one or more of:
an amount of time between a capture time of the respective media item and a capture time of a sequentially adjacent media item in the chronological order;
a change in detected physical location between a capture time of the respective media item and a capture time of a sequentially adjacent media item in the chronological order;
a change in detected altitude between a capture time of the respective media item and a capture time of a sequentially adjacent media item in the chronological order;
a change in detected speed between a capture time of the respective media item and a capture time of a sequentially adjacent media item in the chronological order;
a change in detected network connections between a capture time of the respective media item and a capture time of a sequentially adjacent media item in the chronological order;
a change in weather between a capture time of the respective media item and a capture time of a sequentially adjacent media item in the chronological order;
a change in physiological indicators of a user between a capture time of the respective media item and a capture time of a sequentially adjacent media item in the chronological order;
a difference between individuals associated with in a first plurality of media items prior to the respective media item in the chronological order and associated with a second plurality of media items after the respective media item in the chronological order; and
a difference in rate of change of location over time between captures time of a first plurality of media items prior to the respective media item in the chronological order and a rate of change of location over time between a capture times of a second plurality of media items after the respective media item in the chronological order.

16. The method of claim 11, including, after dividing the collection of media items into multiple events:
grouping a set of consecutive events that include two or more of the multi-item events into a respective pattern-based event group based at least in part on the one or more patterns in the collection of media items, wherein:
the pattern-based event group is divided from other pattern-based event groups in accordance with a change in a first pattern in the collection of media items that corresponds to the pattern-based event group; and
a respective multi-item event within the pattern-based event group is divided from other events in the pattern-based event group in accordance with a change in a second pattern in the collection of media items, wherein the change in the second pattern does not correspond to a change in the first pattern that corresponds to the pattern-based event group.

17. The method of claim 11, including:
after dividing the collection of media items into multiple events, grouping a set of consecutive events that include two or more of the multi-item events into a plurality of date-based event groups that includes:
a first date-based event group that includes a first set of events that include items with time indicators within a first date range; and
a second date-based event group that includes a second set of events that include items with time indicators within a second date range; wherein:
a second event includes one or more items with time indicators in the first date range and one or more items with time indicators in the second date range; and
the second event is included in both the first date-based event group and the second date-based event group.

18. The method of claim 11, wherein the one or more images that correspond to items in the first event are selected so as to represent images associated with the plurality of locations.

19. The method of claim 11, wherein:
the representations of the plurality of events include the first representation of the first event that includes a first plurality of representative images;
the representations of the plurality of events include a second representation of a second event that includes a second plurality of representative images; and
the method includes:
receiving a request to move a respective representative image from the first plurality of representative images to the second plurality of representative images; and,
in response to receiving the request to move the respective representative image, moving an item that corresponds to the respective representative image from the first event to the second event.

20. The method of claim 11, wherein:
the locations of items in the first event includes frequently visited locations and infrequently visited locations;
the plurality of locations include at least some of the infrequently visited locations; and
the plurality of locations does not include the frequently visited locations.

21. A non-transitory computer readable storage medium storing one or more programs, the one or more programs comprising instructions, which when executed by one or more processors of an electronic device with a display, cause the electronic device to:
obtain a collection of media items, wherein the media items are ordered in a chronological order in accordance with a time indicator associated with each of the media items;
determine one or more patterns in the collection of media items based at least in part on a comparison between properties of sequentially adjacent media items in the collection of media items;
divide the collection of media items into multiple events that includes a plurality of multi-item events wherein:
each multi-item event includes a plurality of the media items with time indicators within a corresponding event time range; and
the event time range for a multi-item event is selected in accordance with the one or more patterns determined in the collection of media items;
receive a request to display a first portion of the collection of media items; and,
in response to receiving the request to display the first portion of the collection of media items, display representations of a plurality of events that correspond to the first portion of the collection of media items on the display, wherein a displayed first representation of a first event of the plurality of events includes:
an identifier of the first event;
a plurality of locations of items in the first event, wherein the plurality of locations is an automatically generated subset, less than all, of the locations of items in the first event; and
one or more images that correspond to items in the first event.

22. The non-transitory computer readable storage medium of claim 21, wherein the event time ranges for the plurality of multi-item events are non-overlapping.

23. The non-transitory computer readable storage medium of claim 21, wherein dividing the collection of media items into multiple events includes:
determining a pattern in the collection of media items that indicates that a respective event occurred over a period of time that includes a respective date-transition boundary; and
dividing the collection of media items so as to include one or more items with a time indicator before the respective date-transition boundary and one or more items with a time indicator after the respective date-transition boundary.

24. The non-transitory computer readable storage medium of claim 21, wherein:
dividing the collection of media items into multiple events includes identifying a plurality of transition points in the collection of media items; and
one or more of the transition points each correspond to a respective change in a respective pattern of data that corresponds to the collection of media items that occurs at the transition point.

25. The computer readable storage medium of claim 24, wherein the respective change in the respective pattern of data that corresponds to a respective media item is based on one or more of:
an amount of time between a capture time of the respective media item and a capture time of a sequentially adjacent media item in the chronological order;
a change in detected physical location between a capture time of the respective media item and a capture time of a sequentially adjacent media item in the chronological order;
a change in detected altitude between a capture time of the respective media item and a capture time of a sequentially adjacent media item in the chronological order;

a change in detected speed between a capture time of the respective media item and a capture time of a sequentially adjacent media item in the chronological order;

a change in detected network connections between a capture time of the respective media item and a capture time of a sequentially adjacent media item in the chronological order;

a change in weather between a capture time of the respective media item and a capture time of a sequentially adjacent media item in the chronological order;

a change in physiological indicators of a user between a capture time of the respective media item and a capture time of a sequentially adjacent media item in the chronological order;

a difference between individuals associated with in a first plurality of media items prior to the respective media item in the chronological order and associated with a second plurality of media items after the respective media item in the chronological order; and a difference in rate of change of location over time between captures time of a first plurality of media items prior to the respective media item in the chronological order and a rate of change of location over time between a capture times of a second plurality of media items after the respective media item in the chronological order.

26. The computer readable storage medium of claim 21, including instructions, which when executed by one or more processors of the electronic device with the display, cause the electronic device to, after dividing the collection of media items into multiple events:

group a set of consecutive events that include two or more of the multi-item events into a respective pattern-based event group based at least in part on the one or more patterns in the collection of media items, wherein:

the pattern-based event group is divided from other pattern-based event groups in accordance with a change in a first pattern in the collection of media items that corresponds to the pattern-based event group; and a respective multi-item event within the pattern-based event group is divided from other events in the pattern-based event group in accordance with a change in a second pattern in the collection of media items, wherein the change in the second pattern does not correspond to a change in the first pattern that corresponds to the pattern-based event group.

27. The computer readable storage medium of claim 21, including instructions, which when executed by one or more processors of the electronic device with the display, cause the electronic device to:

after dividing the collection of media items into multiple events, group a set of consecutive events that include two or more of the multi-item events into a plurality of date-based event groups that includes:

a first date-based event group that includes a first set of events that include items with time indicators within a first date range; and a second date-based event group that includes a second set of events that include items with time indicators within a second date range; wherein:

a second event includes one or more items with time indicators in the first date range and one or more items with time indicators in the second date range; and the second event is included in both the first date-based event group and the second date-based event group.

28. The computer readable storage medium of claim 21, wherein the one or more images that correspond to items in the first event are selected so as to represent images associated with the plurality of locations.

29. The computer readable storage medium of claim 21, wherein:

the representations of the plurality of events include the first representation of the first event that includes a first plurality of representative images;

the representations of the plurality of events include a second representation of a second event that includes a second plurality of representative images; and the computer readable storage medium includes instructions, which when executed by one or more processors of the electronic device with the display, cause the electronic device to:

receive a request to move a respective representative image from the first plurality of representative images to the second plurality of representative images; and, in response to receiving the request to move the respective representative image, move an item that corresponds to the respective representative image from the first event to the second event.

30. The computer readable storage medium of claim 21, wherein:

the locations of items in the first event includes frequently visited locations and infrequently visited locations;

the plurality of locations include at least some of the infrequently visited locations; and the plurality of locations does not include the frequently visited locations.

* * * * *